US006141378A

United States Patent [19]
d'Oreye de Lantremange

[11] Patent Number: 6,141,378
[45] Date of Patent: Oct. 31, 2000

[54] FRACTIONALLY-SPACED ADAPTIVELY-EQUALIZED SELF-RECOVERING DIGITAL RECEIVER FOR AMPLITUDE-PHASE MODULATED SIGNALS

[75] Inventor: Maximilien d'Oreye de Lantremange, Kraainem, Belgium

[73] Assignee: Tiernan Communications, Inc., San Diego, Calif.

[21] Appl. No.: 09/340,621

[22] Filed: Jun. 28, 1999

Related U.S. Application Data

[62] Division of application No. 08/784,607, Jan. 21, 1997.
[60] Provisional application No. 60/011,131, Jan. 23, 1996.

[51] Int. Cl.[7] .............................. H04B 3/46; H04B 17/00; H04Q 1/20; H04H 7/40
[52] U.S. Cl. ...................... 375/232; 375/355; 364/724.2
[58] Field of Search ..................................... 375/229, 232, 375/234, 316, 324, 354, 355, 340, 362, 371; 370/503, 516; 364/724.19, 724.2; 327/58, 62

[56] References Cited

U.S. PATENT DOCUMENTS

| | | | |
|---|---|---|---|
| 4,227,152 | 10/1980 | Godard et al. | 375/13 |
| 4,309,770 | 1/1982 | Godard | 375/14 |
| 4,679,208 | 7/1987 | Tanaka | 375/13 |
| 4,815,103 | 3/1989 | Cupo et al. | 375/229 |
| 5,311,546 | 5/1994 | Paik et al. | 375/14 |
| 5,471,508 | 11/1995 | Koslov | 375/344 |
| 5,475,710 | 12/1995 | Ishizu et al. | 375/232 |
| 5,500,879 | 3/1996 | Webster et al. | 375/353 |
| 5,793,807 | 8/1989 | Werner et al. | 375/233 |
| 5,812,336 | 9/1998 | Spurbeck et al. | 360/51 |
| 5,835,731 | 11/1998 | Werner et al. | 375/235 |
| 5,940,440 | 8/1999 | Werner et al. | 375/231 |
| 6,000,052 | 12/1999 | Fredrickson | 714/736 |

OTHER PUBLICATIONS

Proakis, J. G., "Digital Communications," 2nd, McGraw–Hill, pp. 554–598.

Godard, D. N., "Passband Timing Recovery in an All–Digital Modem Receiver," *IEEE Transactions on Communications 26*, pp.517–523 (May 1978).

Ungerboeck, G., "Fractional Tap–Spacing Equalizer and Consequences for Clock Recovery in Data Modems," *IEEE Transactions on Communications*, pp. 856–864 (Aug. 1976).

Jablon, N. K., et al., "Timing Recovery for Blind Equalization," 22nd Asilomar Conference on Signals, Systems & Computers, vol. 1, pp. 112–118, papers presented Oct. 31–Nov. 2, 1988.

Gitlin, R. D. and Meadors, H. C., Jr., "Center–Tap Tracking Algorithms for Timing Recovery," *AT&T Technical Journal*, pp. 63–78 (Nov./Dec. 1987).

Godard, D. N., "Self–Recovering Equalization and Carrier Tracking in Two–Dimensional Data Communication Systems," *IEEE Transactions on Communications 28*, pp. 1867–1875 (Nov. 1980).

(List continued on next page.)

*Primary Examiner*—Chi H. Pham
*Assistant Examiner*—Bryan Webster
*Attorney, Agent, or Firm*—Hamilton, Brook, Smith & Reynolds, P.C.

[57] ABSTRACT

A fractionally-spaced adaptively-equalized self-recovering digital receiver includes a fractionally-spaced adaptive filter for equalizing channel distortion which includes means for adaptively adjusting the coefficients of the fractionally-spaced filter with a self-recovering (blind) algorithm or a decision directed algorithm; means for changing the timing at which the data is sampled; means for estimating the sampling frequency offset in order to derive the optimal timing; means for synchronizing the signal resampling at the symbol rate using the statistics of the received data samples; means for evaluating the profile of the equalizer coefficients; and means for tracking carrier frequency offset.

24 Claims, 35 Drawing Sheets

OTHER PUBLICATIONS

Ding, Z. and Kennedy, R. A., "On the Whereabouts of Local Minima for Blind Adaptive Equalizers," *IEEE Transactions on Circuits and Systems –II: Analog and Digital Signal Processing 39*, pp. 119–123 (Feb. 1992).

Wang, J. D. and Werner, J. J., "On the Transfer Function of Adaptive T/4 Equalizers ," 22nd Asilomar Conference on Signals, Systems & Computers, vol. 1, pp. 260–264, papers presented Oct. 31–Nov. 2, 1988.

Picchi, G. and Prati, G., "Blind Equalization and Carrier Recovery Using a 'Stop–and–Go' Decision–Directed Algorithm," *IEEE Transaction on Communications 35*, pp. 877–887 (Sep. 1987).

Jablon, N. K., "Joint Blind Equalization, Carrier Recovery, and Timing Recovery for High–Order QAM Signal Constellations," *IEEE Transactions on Signal Processing 40*, pp. 1383–1398 (Jun. 1992).

Peloso, R. A., "Adaptive Equalization for Advanced Television," *IEEE Transactions on Consumer Electronics 38*, pp. 119–126 (Aug. 1992).

Widrow, B. and Hoff, M. E., "Adaptive Switching Circuits," IRE WESCON Conc. Rec., pt. 4, pp. 96–104 (1960).

Gitlin, R. D., et al., "The Tap–Leakage Algorithm: An Algorithm for the Stable Operation of a Digitally Implemented, Fractionally Spaced Adaptive Equalizer," *The Bell System Technical Journal 61*, pp. 1817–1839 (Oct. 1982).

harris, f. and McKnight, B., "Modified Polyphase Filter Structure For Computing Interpolated Data As Successive Differential Corrections," 1991 International Symposium on Circuits and Systems, Singapore, 11–14 1991.

harris, fred, "On the Relationship Between Multirate Polyphase FIR Filters and Windowed, Overlapped, FFT Processing," 23rd Asilomar Conference on Signals, Systems & Computers, pp. 485–488, papers presented Oct. 30–Nov. 1, 1989.

Austin, M.E., "Decision–Feedback Equalization for Digital Communication Over Dispersive Channels," MIT Lincoln Laboratory, Tech. Report No. 437 (Aug. 1967).

harris, f., "Design Considerations and Design Tricks for Digital Receivers", 9th Kobe International Symposium on Electronics and Information Sciences, Kobe Japan, Jun. 18–19, 1991.

harris, f. and Smith, G., "On the Design, Implementation, and Performance of a Microprocessor Controlled Fast AGC System for a Digital Receiver", Milcom–88, 1988, IEEE Military Communications Conference, pp. 1–5, Oct. 23–26, 1988.

Frerking, M. E., "Digital Signal Processing in Communication Systems", Van Nostrand Reinhold, pp. 292–297.

Chen S., et al., "Multi–Stage Blind Clustering Equaliser", IEEE Transactions on Communications, vol. 43, Part II, pp. 701–705; Feb. 1, 1995.

Eye Diagram

Eye Diagram

Eye Diagram

Eye Diagram

Eye Diagram

Eye Diagram

Eye Diagram

FRACTIONALLY-SPACED ADAPTIVELY-EQUALIZED SELF-RECOVERING DIGITAL RECEIVER FOR AMPLITUDE-PHASE MODULATED SIGNALS

RELATED APPLICATIONS

This application is a divisional of U.S. application Ser. No. 08/784,607 filed Jan. 21, 1997 which claims priority to U.S. Provisional Application No. 60/011, 131, filed Jan. 23, 1996, the content of which are incorporated herein by reference in their entirety.

BACKGROUND OF THE INVENTION

The present invention relates to an automatic adaptive digital receiver for the reception of digital signals transmitted over time-varying distorted channels such as cable systems used for the distribution of TV signals.

The purpose of a transmission channel between a transmitter and a receiver is to deliver to the receiver a signal relatively similar to the transmitted signal. However, impairments to the channel, including amplitude and phase distortions, make it difficult to correctly detect the transmitted data at the receiver. To correct for these channel impairments, the receiver usually includes an automatic adaptive equalizer.

A receiver coupled to a time-varying transmission channel generally has no a priori information about the content of the transmitted signal, i.e., about the sequence of transmitted channel symbols other than a probability distribution reflecting the receiver's knowledge of the channel noise and distortion statistics.

Equalization techniques are said to be self-recovering or "blind" when initial adjustment of the equalizer coefficients is made on the basis of a priori statistical information available on the channel.

SUMMARY OF THE INVENTION

It is an object of the present invention to provide a digital demodulator system capable of operating over a large variety of cable TV systems.

It is another object of the invention to provide reception of high speed digital data at signal-to-noise ratios lower than those at which such systems presently operate.

It is another object of this invention to provide for high performance over channels having distortions and impairments in phase and frequency and having time-varying characteristics.

It is another object of the present invention to provide a digital receiver system having automatic equalization in order to compensate for such time varying effects.

It is another purpose of the present invention to provide for reception of high speed digital data signals at very low bit error rates.

It is yet another object of the present invention to provide all the above advantages with minimum computation load to achieve faster signal rates than present systems.

These and other objects, purposes and advantages are provided in a fractionally-spaced adaptively-equalized self-recovering digital receiver having means for resampling the data at twice the symbol rate; means for adjusting the signal gain; means for equalizing the channel distortion and to match the modulator shaping filter with a fractionally-spaced adaptive filter which includes means for adaptively adjusting the coefficients of the fractionally-spaced filter with a self-recovering (blind) algorithm or a decision directed algorithm; means for an adaptive cancellation of the intersymbol interference with a feedback adaptive filter; means for changing the timing at which the data is sampled; means for estimating the sampling frequency offset in order to derive the optimal timing; means for synchronizing the signal resampling at the symbol rate using the statistics of the received data samples; means for evaluating the profile of the equalizer coefficients; means for tracking the carrier frequency offset; means for slicing the signal space into decision regions and demodulating the received digital data and means for controlling the entire receiver functioning.

The present invention is directed to a set of innovative techniques that combine to provide an effective method and apparatus for demodulating digital amplitude and phase shift keyed signals.

According to one aspect of the invention, a blind multiple constellation partition-based equalization method computes the coefficients of an equalizer filter without prior knowledge of the value of the transmitted symbols. The method comprises the steps of partitioning the data constellation into similar sub-constellations having same pattern modulo rotation and translation, centering each sub-constellation to the origin, and adjusting the filter coefficients with a scaled function of the weighted sum of the quadratic distance between the phase corrected data and the center of the subconstellations.

According to another aspect of the invention, a preconvergence sampling or resampling control method allows a receiver to acquire the exact symbol frequency (or one of its multiple) before the signal equalization has converged. This method comprises the steps of correcting the sampling frequency by an amount calculated with the time occurrence of a variance inversion of the input signal and detecting the tendency to drift of the equalizer filter coefficients.

According to another aspect of the invention, a down-sampling method allows a receiver to decimate an over-sampled signal and retrieve the samples that are the most likely to be the symbols in the oversampled sequence. The symbol retrieval is based on a comparison of variance estimations at different sampling times.

In another aspect of the invention, a postconvergence sampling or resampling control method allows a receiver to maintain the exact symbol frequency(or one of its multiple) after the signal equalization has converged. This method comprises correcting the sampling frequency or the sampling phase by an amount calculated with the evaluated drift speed of equalizer filter coefficients. By a controlled feedback effect, this method maintains the largest coefficient in the center of the equalizer filter.

According to yet another aspect of the invention, a wide pulling range acquisition method for the signal carrier frequency is provided based on a evaluation of the rotation speed of the corners of the signal constellation.

According to still another aspect of the invention, a method for controlling the five techniques mentioned above and other techniques such as LMS algorithm, tap leakage algorithm, classical carrier recovery algorithm and automatic gain control mechanisms is provided. The control of these different techniques is based on the evaluation of the average error on the demodulated signal, the variance of the output signal, and the value of an internal timer. The control method performs automatic acquisition and guarantees the long term stability of the following parameters: exact sampling of the signal at a multiple of the symbol rate and exact resampling on the symbol occurrence; exact signal gain;

exact carrier frequency; maximum channel equalization; maximum out-of-band noise rejection; minimum intersymbol interference and optimum symbol detection.

In a preferred embodiment of the invention, a self-recovering fractionally-spaced adaptive filter operates at the sampling rate with adaptive adjustment of the tap coefficients at the symbol rate. Coefficients are adaptively adjusted to equalize the time varying channel distortion and to match the shaping filter of the signal modulator. Therefore, the adaptive filter suppresses most of the intersymbol interference caused by the modulator and the channel and rejects the noise outside of the signal bandwidth, including adjacent channel interferences. The tap adjustment is performed with a self-recovering algorithm during transient states or the LMS algorithm at steady state.

According to another aspect of the invention, a digital receiver includes timing control means for compensating for mismatches between emitter and receiver sampling clocks which includes two processes to compensate both large and small sampling offsets. The first process provides means to evaluate large frequency offsets by analyzing the stochastic content of the signal. The second process provides means to evaluate small offsets by computing the drifting speed of the equalizer coefficients. Both processes also provide means to convert the evaluated offset into the corresponding sampling frequency correction, means to change the phase in the polyphase downsampler and means to prevent the feedforward equalizer peak from reaching the end of the tap line.

According to another aspect of the invention, a stochastic synchronizer includes signal variance estimation at different sampling times and continuous comparison of these variances. The first function of this device is to control the synchronization of the resampling at the output of the equalizer. It makes sure that both resampling and coefficient updating are performed exactly when a symbol is present at the output of the equalizer and not in the middle of the transition between two symbols. The second function of the synchronizer is to provide stochastic information to the timing controller. The synchronizer is frozen once the equalizer has converged.

According to still another aspect of the invention, a receiver includes a coefficient profiler for profiling the feedforward equalizer coefficients including evaluation of the central peak position and evaluation of the drifting direction. Both data are used by the timing controller to evaluate the sampling frequency offset by computing the equalizer coefficient drifting speed.

According to another aspect of the invention, a carrier tracking system includes means for estimating the phase error and the phase rotation velocity at the input of a signal-space slicer resulting from an incidental mismatch or offset between transmitter and receiver carrier frequencies. It also includes means for tracking these phase variations and means for rotating the signal by the appropriate complex correction in order to stop the phase rotation and to set the phase to the correct angle.

According to another aspect of the invention, a receiver includes a signal-space slicer which maps the equalized signal space into the desired signal constellation realizing either a complete mapping in which every received signal is mapped to the desired signal space, or a partial mapping in which received signals falling in some areas of the plane are ignored. The decisions made in the quantizer are used at three different levels: phase tracking, coefficient updating and further processing of the received signal.

According to another aspect of the invention, a receiver includes a receiver controller which comprises a state machine controlled by estimating the error at the output of the equalizer. This machine provides means for ensuring convergence of the equalizer at power-up or when divergence is detected by deciding which adaptive algorithm and quantizer to use. It also provides means for controlling the use of a tap leakage algorithm for preventing coefficient buildup and forcing the equalizer feedforward filter to converge to the optimum solution. It also provides means for adjusting the speed of the automatic gain controller and means for choosing the appropriate timing recovery method. Finally, it provides means for controlling the reset of the entire receiver by detecting divergence of the equalizer and generating the appropriate reset commands.

BRIEF DESCRIPTION OF THE DRAWINGS

The novel features of the present invention may be better understood from the accompanying description when taken in conjunction with the accompanying drawings in which like characters refer to like parts. It will be understood that the particular embodiment is shown by way of illustration only and not as a limitation of the invention. The principles and features of this invention may be employed in varied and numerous embodiments without departing from the scope of the invention.

DETAILED DESCRIPTION OF THE PREFERRED EMBODIMENTS

Figure 1A:
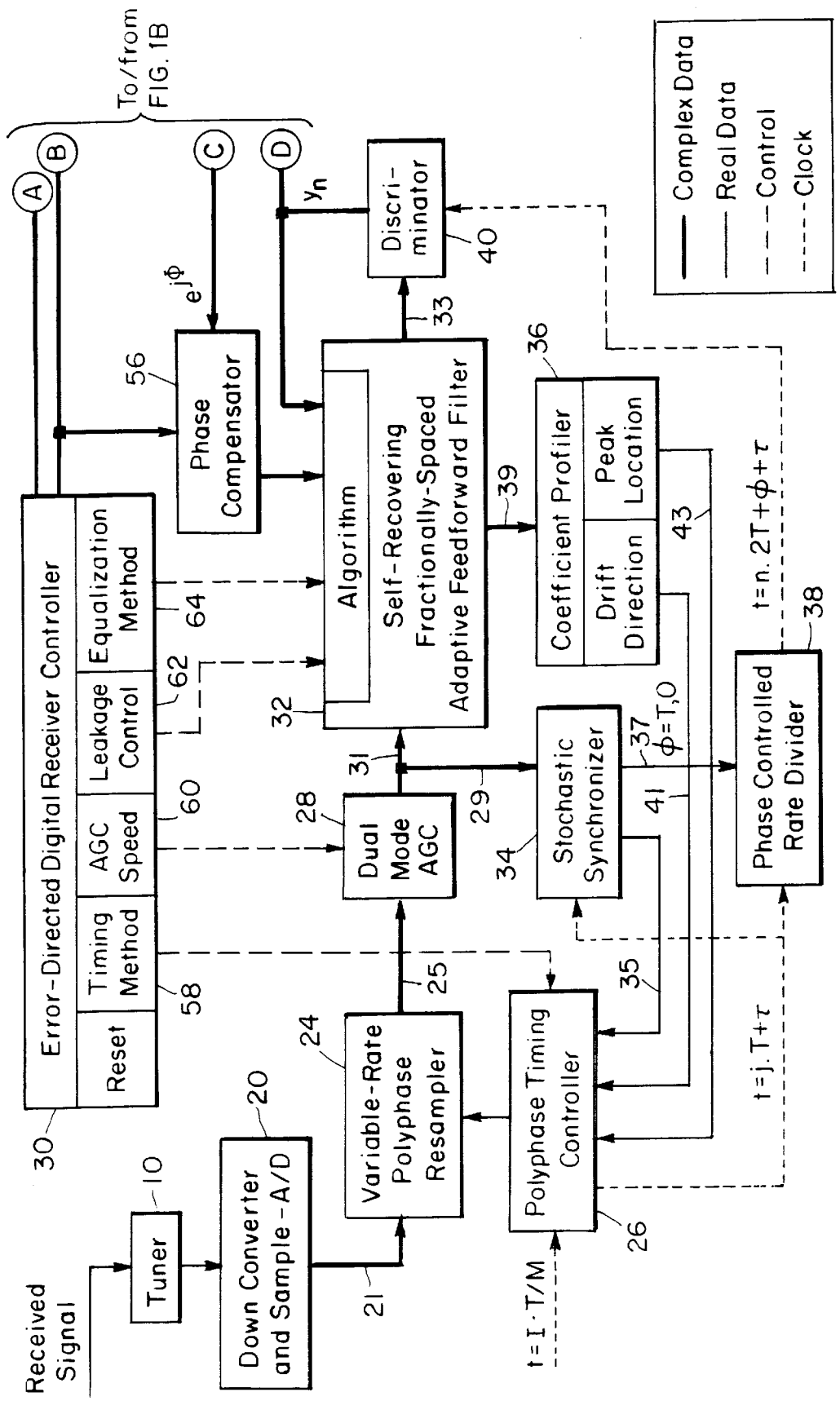
FIGS. 1A and 1B are schematic diagram of the digital receiver of the present invention showing the received signal entering the receiver on the left side and the demodulated information available on the right hand side.
Figure 1B:
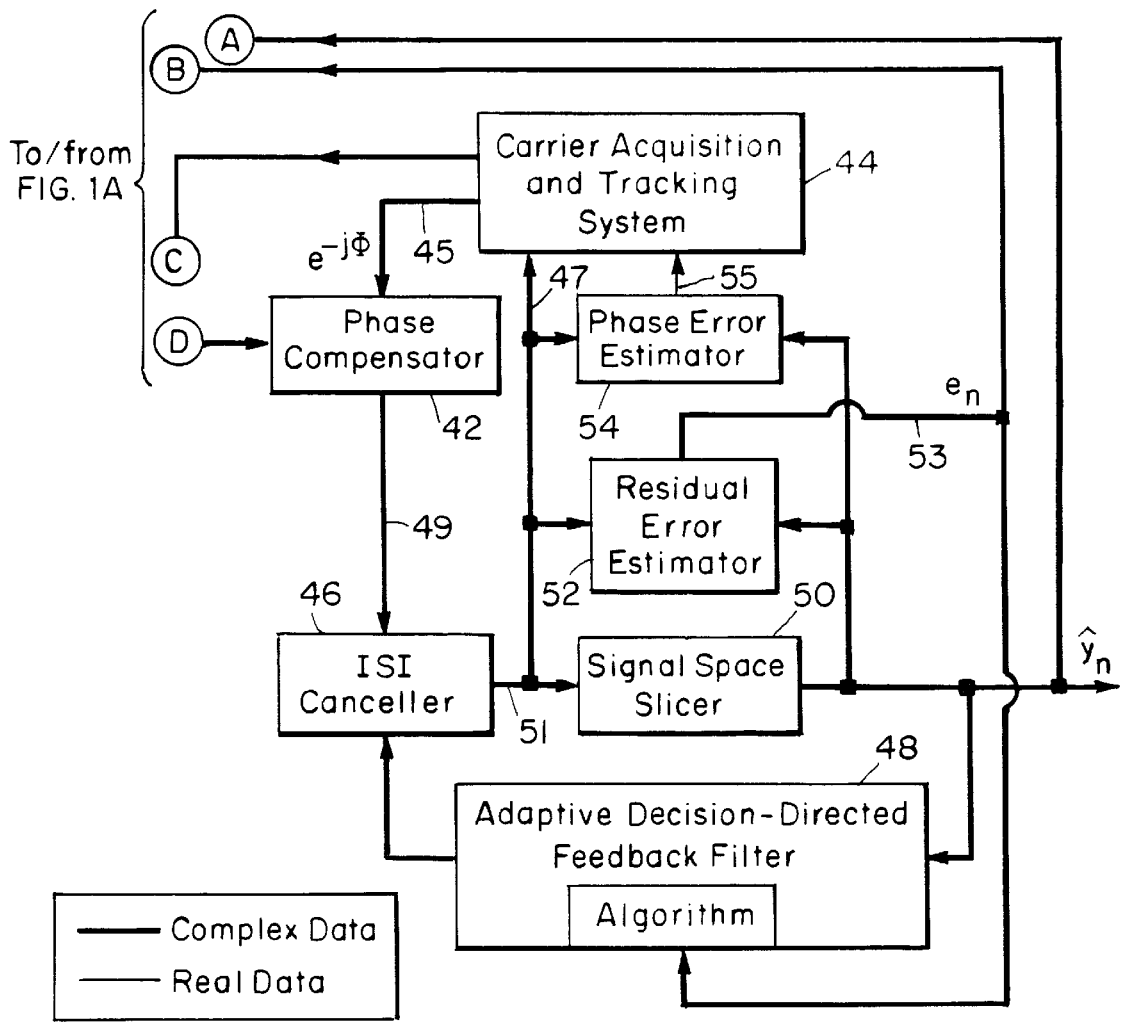

FIG. 1 illustrates the overall architecture and the fundamental subsystems of a digital receiver that incorporates the principles of the present invention.

The present invention provides very good performance in the demodulation of digital data transmitted over distorted channels such as cable systems used for the transmission of television signals by providing a receiver having a fractionally-spaced filter 32 which implements an equalizer with a blind mode and a conscious mode for adapting its coefficients; a polyphase resampler 24 to select the appropriate data samples; a probabilistic synchronizer 34 and a coefficient drift estimator 36 to control the timing of the sampling mechanism; a carrier tracking system 44 to correct for phase offset and rotation; a decision-directed adaptive intersymbol interference canceler 46; a signal space slicer 50 to extract the demodulated data and an error directed state machine 30 to control the different functions of the receiver.

In FIG. 1, a tuner/downconverter 10 tunes the receiver to the frequency band occupied by the desired signal and changes the frequency of the received communications signal to a lower intermediate frequency using techniques and apparatus well known in the art. The desired signal is an amplitude-phase carrier modulated signal which carries digital information transmitted as complex data symbols. An intermediate IF frequency such as, but not limited to, about 70 Mhz is generally employed for communication systems, although this frequency is determined by the demands of the specific application considered. The technology of tuners and downconverters is a well established discipline and very familiar to those who are skilled in the art of communication systems.

The IF signal is then downconverted to baseband by an analog baseband converter 20 in which the IF signal is mixed with a predetermined carrier frequency to yield a lower frequency analog communications signal. The output of this mixing process is passed through a band pass filter to remove unwanted mixer products and out of band frequency components that may be present after the downconversion and mixing processes.

While at baseband, the signal is then divided into an in-phase (I) component and a quadrature (Q) component by a phase shifter divider. The I and Q signals are also referred to in the art as the 0 degree and the 90 degree components, respectively.

The techniques of designing a tuner, downconverter and analog baseband converter are well known to those skilled in the art of communication electronics.

The two analog I and Q signals are sampled and then transferred to two separate Sampler/Analog-to-Digital (A/D) converters, respectively. That is, the I or 0 degree component from the divider is presented to the first Sample-A/D converter, and the Q component, which is 90 degrees out of phase with the I component, is presented to the second Sample-A/D converter. This configuration of dividing the analog signal into two orthogonal components, I and Q, and then sampling and digitization is a technique used in the art to provide an efficient conversion of the analog signal into digital form while preserving the amplitude and phase information contained in the original analog communications signal.

In the preferred embodiment of the present invention, the digitized samples I and Q output from the Sampler-A/D converters are sampled at a fixed but arbitrary rate at least twice the nominal symbol rate of the incoming signal. The number of bits of resolution per sample required depends on the specific application considered. For example, eight bits of resolution per sample are adequate for 64-QAM (Quadrature Amplitude Modulation) modulation and 8 to 10 bits per sample are adequate for 256-QAM.

The I and Q digital samples are then transferred to a variable-rate polyphase resampler 24 which processes both in-phase and quadrature components simultaneously. The variable-rate polyphase resampler 24 resamples the signal at exactly twice the inherent symbol rate on the basis of an estimate of the actual offset between the transmitter and the receiver clocks. In the embodiment of the present invention, the timing offset between the transmitter and the receiver is estimated by the polyphase timing controller 26 which will be discussed later.

Figure 2A:
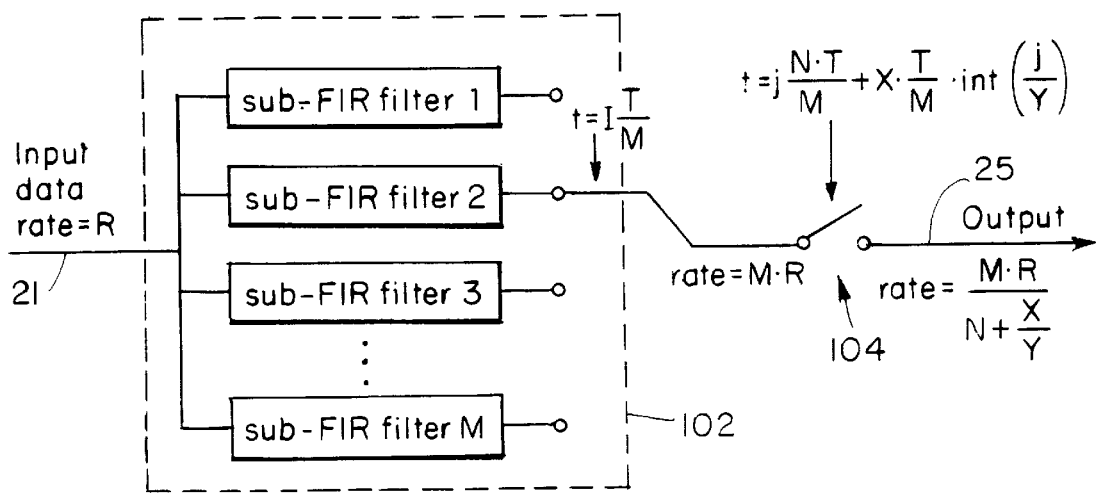
FIG. 2A is a schematic diagram of one embodiment of a variable rate polyphase resampler in accordance with the present invention.

A functional block diagram of a variable-rate polyphase resampler 24 is illustrated in FIG. 2A. The resampler 24 comprises a fixed-rate polyphase 1:M up-sampler 102 followed by a fixed-rate N:1 decimator 104 with adjustable sampling phase. The technique of polyphase filters is well known to those experienced in the art of digital signal processing. An FIR filter comprising M subfilters is designed to avoid the aliasing effects due to the resampling. See f. Harris, "Design Considerations and Design Tricks For Digital Receivers", 9th Kobe 592 International Symposium on Electronics and Information Sciences, Kobe Japan, Jun. 18–19, 1991; f. Harris, B. McKnight, "Modified Polyphase Filter Structure For Computing Intrepolated Data As Successive Differential Correction", 1991 International Symposium on Circuits and Systems, Singapore, 11–14 1991; and f. Harris, "On The Relationship Between Multirate Polyphase FIR Filters and Windowed, Overlapped, FFT Processing", 23rd Annual ASILOMAR Conference on Signals, Systems and Computers, Oct. 30–Nov 1, 1989.

It is possible to periodically adjust the decimator phase so the result of the decimation gives the desired sampling rate on average. To be more explicit, if the sampling phase of the decimator is corrected by X input samples (of the decimator) every Y output samples, the rate of the variable-rate polyphase filter is on average:

$$\overline{\text{output rate}} = \text{input rate} \cdot \frac{M}{N + \frac{X}{Y}} \quad (1)$$

where M and N are fixed in hardware and should be chosen to provide sampling rates over the required range of sampling rates. M is the number of phases of the polyphase resampler and should be chosen large enough so the decimator phase jumps have no significant effects on the other parts of the system. X and Y are software variables chosen to allow the variable-rate polyphase resampler to have an adjustable rate. In a communication system with fairly accurate clocks, the resampling only needs small adjustments. This will result if X and Y satisfy the following inequality $$\text{abs}\left(\frac{X}{Y}\right) \ll 1 \qquad (2)$$

This condition is met if X is chosen to be 1 or −1 while Y is large compared to 1. The choice of X and Y is determined by the polyphase timing controller 26 and will be discussed in the section below.

Figure 2B:
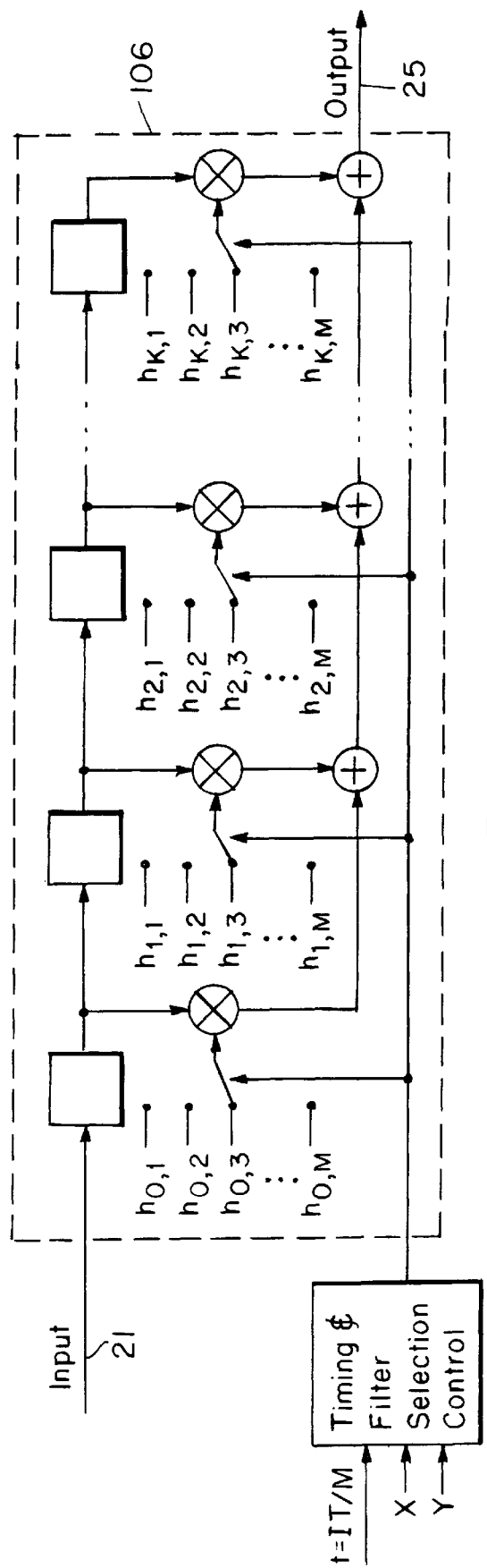
FIG. 2B is a schematic diagram of an alternate embodiment of a variable rate polyphase resampler.

Implementation of the variable-rate polyphase resampler 24 can be simplified by noticing that only one phase of the up-sampler is used for each down-sampling time. In a specific embodiment, a lot of hardware is saved by replacing the subfilters 1 through M shown in FIG. 2A with one unique filter 106 for which the coefficients ($h_{o,1}$ to $h_{k,m}$) to are changed according to the current phase of the down-sampler as illustrated in FIG. 2B. In this alternate embodiment of the variable-rate polyphase resampler 24, M sets of coefficients have to be stored in read only memory. For instance, a minimum of 10 phases are typically required with 64-QAM modulation, and 30 are typically required for 256-QAM.

Figure 2C:
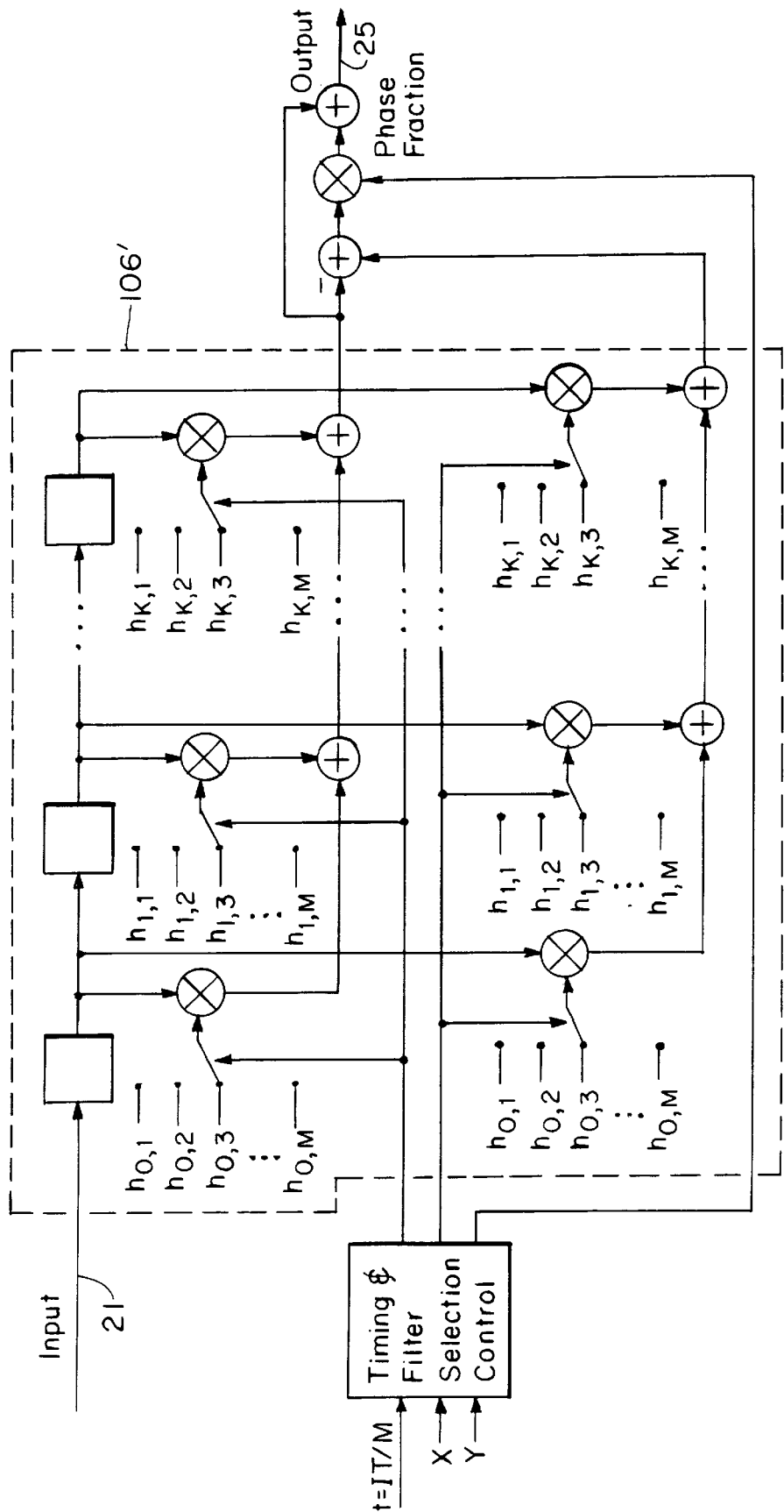
FIG. 2C is a schematic diagram of another embodiment of a variable rate polyphase resampler.

To reduce the number M of phases of the polyphase filter 106, i.e., to reduce the number of coefficient sets to be stored in read-only memory, it is also possible to compute simultaneously the output of two adjacent phases and linearly interpolate the desired phase between the adjacent phases. This alternate embodiment of the variable-rate polyphase resampler 24 is illustrated in FIG. 2C. This particular embodiment which includes filter 106' requires a more complicated control logic but it produces a reduction of the phase jumps at the output of the variable-rate polyphase sampler 24, thereby providing better performance for high order constellations.

A dual-mode automatic gain control (AGC) circuit 28 accepts as input the complex samples produced by the variable-rate polyphase resampler 24. The dynamic range of the received signal can be significantly different from the dynamic range available at the input of signal space slicer 50. The purpose of the dual-mode AGC 28 is to adjust the magnitude of the samples so as to match the dynamic range of the signal samples to that at the input of the signal space slicer 50. The AGC 28 provides a variable gain control function over the input samples which maintains the magnitude of the signal samples at a constant desired level, such as would be known to those skilled in the art. The term "dual-mode" indicates that the AGC 28 can operate at two speeds which are controlled by error-directed digital receiver controller 30. The importance of the AGC 28 stems from the following:

(1) if the dynamic range of the signal is too small, the algorithm of the self-recovering fractionally-spaced adaptive feedforward filter 32 will take too much time to converge because the input signal has almost no energy.

(2) if the dynamic range of the signal is too large, the algorithm of the self-recovering fractionally-spaced adaptive feedforward filter 32 will be unstable because the signal has too much energy. (3) if the input gain can be arbitrarily small, the coefficients of the adaptive filter 32 must be designed with a large dynamic range to prevent overflow. Not only is it a waste of hardware resources, but it will also link the performance of the equalizer to the actual gain of the signal.

As indicated above, the AGC 28 has two modes of operation, a mode for power-up or reset events, and a mode for steady-state operation:

At power-up or immediately after a reset, the AGC 28 operates alone while the taps of the self-recovering fractionally-spaced adaptive feedforward filter 32 are frozen. The convergence speed of the AGC 28 is maximum so the correct gain is roughly reached in a minimum amount of time.

Once the AGC 28 has practically reached a steady state and the gain has roughly stabilized, the self-recovering fractionally-spaced adaptive feedforward filter 32 is turned on. At that point in time, the speed of the AGC 28 is slowed down (its time constant is increased) and the rest of the gain adaptation is provided by the self-recovering fractionally-spaced adaptive feedforward filter 32. This slow mode of operation prevents oscillation effects between the AGC 28 and the adaptive feedforward filter 32.

Techniques to implement the AGC function are well known to those skilled in the art. See f. Harris and G. Smith, "On the Design, Implementation, and Performance of a Microprocessor Controlled Fast AGC System for a Digital Receiver", presented at MILCOM-88, 1988 IEEE Military Communications Conference, Oct. 23–26, 1988 San Diego, Calif. and M. E. Frerking, "Digital Signal Processing in Communication Systems", Van Nostrand Reinhold, pp. 292–297. Any of these implementations can be chosen as long as the time constant of the AGC 28 can be adjusted in real time, and it has the appropriate dynamic range. If the analog part of the receiver is well balanced, the same AGC can be used for both phases of the signal. If not, using different AGCs for the two phases will automatically compensate for the gain mismatch.

The signal output from the dual-speed AGC 28 is transferred to the self-recovering fractionally-spaced adaptive feedforward filter 32. This filter is a key subsystem of the digital receiver because of the central role it occupies in the digital receiver architecture and because of the subtleties of its design.

The signal processing functions of the adaptive feedforward filter 32 include the following:

(1) equalizing most of the channel distortions, i.e., removing most of the intersymbol interference due to the fact that the channel impulse response spreads over more than one channel symbol;

(2) shaping the spectrum of the signal to reject the noise outside of the desired signal bandwidth; and (3) adjusting the sampling phase so the output of the filter is sampled exactly at each symbol occurrence.

Figure 3:
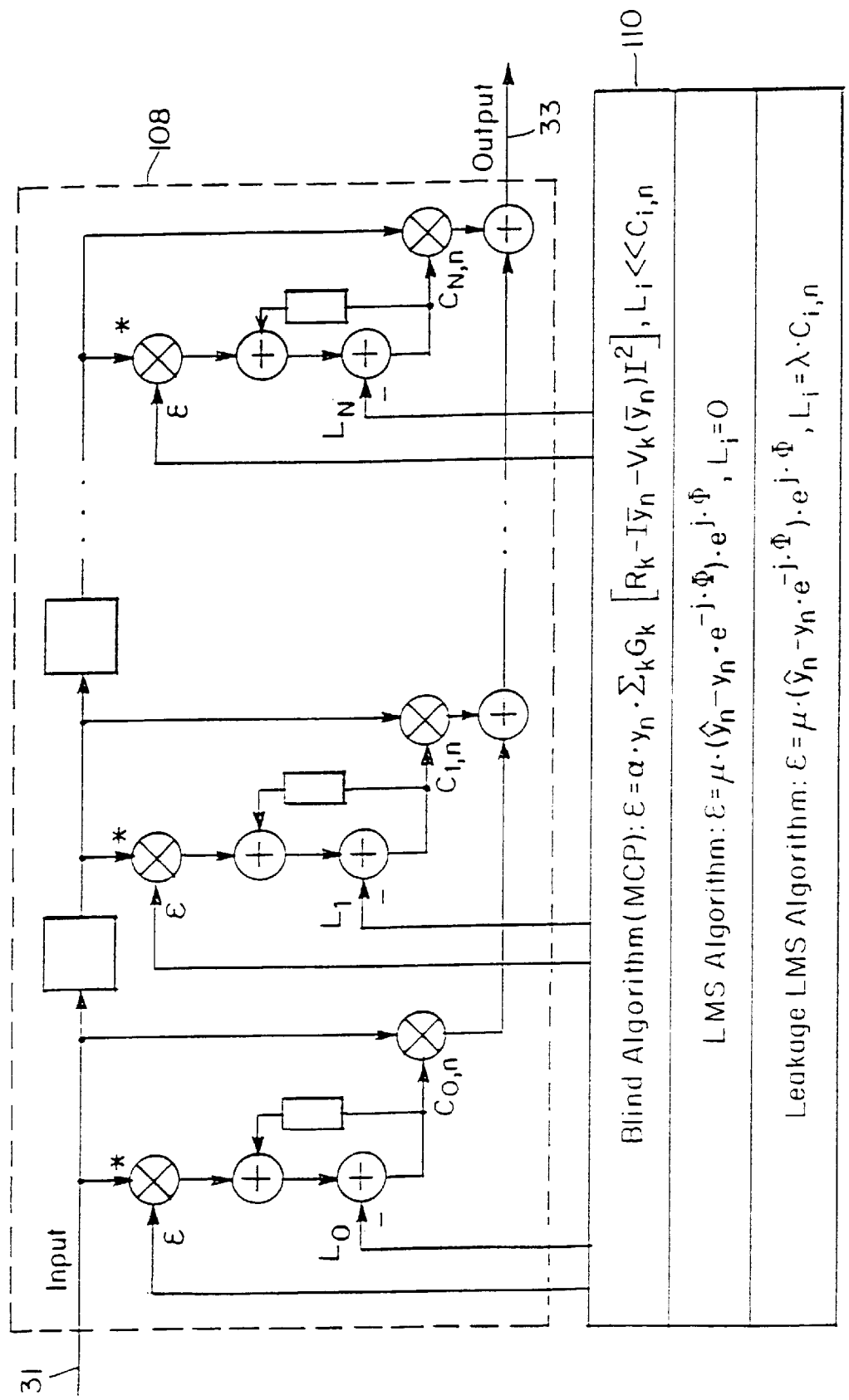
FIG. 3 is a schematic diagram of the self-recovering fractionally-spaced adaptive feedforward filter of the receiver of FIG. 1.

An embodiment of the self-recovering fractionally-spaced adaptive feedforward filter 32 is shown in FIG. 3. The filter 32 comprises an adaptive finite-impulse response (FIR) filter 108 with time-varying and adjustable coefficients $C_i$ driven by an adjustable adaptive algorithm 110. The output of the self-recovering fractionally-spaced adaptive feedforward filter 32 is sampled by data sample discriminator 40 at the exact symbol rate and exact symbol occurrence controlled by stochastic synchronizer 34 (FIG. 1).

When the receiver begins receiving data, the samples at the output of ISI canceller 46 are not yet filtered and equalized by the adaptive feedforward filter 32. Consequently, the difference between the detected symbols at the output of signal space slicer 50 and the symbols at the output of ISI canceller 46 can be large. In order to prevent this from happening at the beginning of data reception, the adaptive feedforward filter 32 is designed to be self-recovering. This is accomplished by the use of a "blind" algorithm which selects the coefficients of the adaptive feedforward filter 32 on the basis of the a priori statistical information available on the channel. It will remain blind until enough data has been received to modify the probability distribution in question.

When the samples at the output of the ISI canceller 46 have been appropriately filtered and equalized, it is then possible to estimate with a low probability of error the transmitted channel symbols at the output of the signal space slicer 50 which partitions the signal space into the appropriate decision regions. The residual error between the symbol decisions at the output of slicer 50 and the filtered and equalized samples at the output of ISI canceller 46 is computed in residual error estimator 52, and a Decision Directed (DD) algorithm such as the Least Mean Square (LMS) algorithm is then used to further minimize the residual error. This approach leads to channel symbol decisions having a much lower probability of error than would otherwise result with using only a blind algorithm.

In previous systems, a method of blind equalization commonly used is taught by Godard (See D. N. Godard, "Self-Recovering Equalization and Carrier Tracking in Two-Dimensional Data Communication Systems", IEEE transactions on Communications, Vol. Com.-28, No. 11, Nov. 1980 and U.S. Pat. No. 4,309,770). In that method, the filter coefficients, $C_{i,n}$, are updated with the recurrence relation $$C_{i,n+1} = C_{i,n} + \alpha \cdot y_n(|y_n|^2 - R) \cdot x_{n-i}^* \qquad (3)$$

in which $$R = \frac{E(|a_n|^4)}{E(|a_n|^2)} \qquad (4)$$

In Equation (4), $a_n$ is the transmitted QAM signal, $x_n$ is the input to the filter, $y_n$ is the output of the filter, $C_{i,n}$ is the ith complex filter coefficient at time n, $\alpha$ is a small real-valued step size parameter, $\|$ denotes the complex magnitude and * the complex conjugate.

The Godard algorithm requires some constraints on the shape of the signal constellation and the statistics of the signal:

$$E[a_n^2] = 0$$
$$2 \cdot E[|a_n|^2] > E[|a_n|^4] \qquad (5)$$
$$E[a_n^* \cdot a_m] = E[|a_n|^2] \cdot \delta_{nm}$$

These conditions imply certain symmetry properties and exclude one dimensional constellations. They also require that the signal be stationary and uncorrelated.

The Godard algorithm has a number of advantages:
  it is simple and its structure is similar to that of the LMS algorithm in which the conventional error is replaced by a function of the output of the equalizer;
  it is independent of the phase of the signal so it can be used even before the phase tracking has occurred;
  it can easily correct small gain differences between the quantizer dynamic range and the signal dynamic range.

However, it suffers from the following shortcomings:
  it does not perform a very accurate equalization for QAM constellations having more than 16 points;
  its convergence is affected by local minimums and the final solution depends on initialization conditions;
  it converges very slowly to the solution, approximately one order of magnitude slower than the LMS algorithm.

The first shortcoming is sufficiently important to rule out the use of the Godard algorithm since high order modulations such as 64-QAM and 256-QAM are of interest.

In this invention, a different algorithm called Multiple Constellation Partitions is used. It comprises a novel partitioning technique of the data constellation, and a novel coefficient update algorithm.

The algorithm comprises the following steps:
1. create K number of partitions of the initial constellation $\zeta$. Each partition $P_k$ ($1 \leq k \leq K$) of $\zeta_0$ creates a number of sub-constellations $\zeta_i^{(k)}$ having a same pattern modulo rotation and translation.
2. For each partition, translate the center of gravity of each sub-constellations $\zeta_i^{(k)}$ to the origin.
3. Update the filter coefficients so that the dispersion for all partitions is minimized simultaneously in all centered sub-constellations.

The new coefficient update algorithm proposed in this invention is $$C_{i,n+1} = C_{i,n} + \alpha \cdot y_n \left( \sum_k G_k (R_k - |\overline{y_n} - V_k(\overline{y_n})|^2) \right) x_{n-i}^* \qquad (6)$$

where $\overline{y}_n = y_n \cdot e^{-j\phi}$ is the output of the feedforward filter corrected by the carrier tracking system, $G_k$ is a scaling factor depending on the size of the sub-constellations of $\zeta_i^{(k)}$, $R_k$ is the Godard constant computed for the sub-constellation of $\zeta_i^{(k)}$, and $V_k(\overline{y}_n)$ is the vector which points to the center of the sub-constellation where the phase-corrected symbol $\overline{y}_n$ belongs.

Generally speaking, partitions of the original constellation can be divided into two categories. The partitions in the first category, called CLASS A, lead to a convergent algorithm even when used alone in equation (6). Partitions in the other category (CLASS B) cannot be used alone in equation (6) but provide a convergent algorithm when used in conjunction with at least one partition of CLASS A.

In order to illustrate the method, the case of a QAM modulation is now examined in detail.

The following two partitions are considered:

A first partition, $P_1$, splits the original constellation into 4 quadrants. The method considers each quadrant as a separate constellation of lower order and runs the coefficient update algorithm separately on each of the four quarter constellations. As indicated earlier, this procedure is accomplished by first performing a linear translation to center the reduced constellation on the origin.

The corresponding vector $V_k(\overline{y}_n)$ is given as $$V_1(\overline{y}_n) = H_1 \operatorname{csgn}(\overline{y}_n) \qquad (7)$$

where csgn() is the complex sign function, $H_1$ is a positive scaling factor. This partition is referred to as the "Quarter Constellation Partition" (QCP).

A second partition consisting of the original constellation split into minimal subconstellations of one point each. The received signal space is thus sliced into small square areas centered around each constellation point. Since this is precisely done in the signal space slicer 50 (as described later), the algorithm uses the signal space slicer output $\hat{y}_n$ to perform the linear translation which centers the point constellations on the origin:

$$V_2(\overline{y}_n) = \hat{y}_n \qquad (8)$$

where $\hat{y}_n$ is the output of the signal space slicer 50. Since there is only one point in the constellation and its coordinates are both zero, the $R_2$ constant is also zero. This partition is referred to as the "Single Point Constellation Partition" (SPCP).

With these two partitions of a QAM constellation, the coefficient update algorithm is given by:

$$C_{i,n+1} = C_{i,n} + \alpha y_n((G_1(R_1 - |\bar{y}_n - H_1 \text{csgn}(\bar{y}_n)|^2) - G_2|\bar{y}_n - \hat{y}_n|^2)x^*_{n-i}) \quad (9)$$

The preferred embodiment for a QAM signal set uses the two reduced constellations just described. However, it will be appreciated by those skilled in the art that other types of partial constellations can also be used without varying from the scope of this invention. The choice of the two above partitions can be justified by the following considerations:

(1) QCP is a partition of class A and the convergence of the algorithm is ensured.

(2) QCP gives better results than the Godard algorithm on the full constellation and the corresponding algorithm is available at practically no extra cost since the slicing and the translation operations only depend on the sign of the signal coordinates.

(3) SPCP gives maximum equalization and the corresponding slicing is given at no extra cost by the signal space slicer 50.

(4) SPCP is a partition of class B and cannot be used alone. This is due to the fact that, as for the LMS algorithm, the slicer 50 makes too many incorrect decisions when the channel is not equalized.

(5) Adding other partitions to equation (6) in this case does not give any significant improvement in convergence time nor error attenuation.

Compared to the Godard algorithm applied to QAM signals, the blind equalization method which is described in this invention has the following characteristics:

Its computational complexity is similar.

It has the same symmetry and probabilistic constraints on the signal (It is easily seen that SPCP does not require any particular symmetry property and that the constellation given by superposing the four sub-constellations of QCP has the same symmetry properties than the original constellation).

It opens the eye more widely, even without the SPCP.

Its convergence is less affected by local minimums.

It is more sensitive to the phase of the signal. This is due to the fact that SPCP is very dependent on the signal phase. It is thus preferable to turn the SPCP off when the system is still adjusting the phase.

It is slow to converge when trying to obtain maximum opening of the eye with a minimum $\alpha$. It is possible to considerably increase the convergence speed by starting the process with a large $\alpha$ and then progressively decreasing it.

Because of the last characteristic, the preferred embodiment of this invention switches to a Decision Directed algorithm, such as the conventional LMS algorithm, as soon as the output of the equalizer is reliable enough to be quantized.

The Least Mean Square (LMS) algorithm (see J. G. Proakis, "Digital Communications", Second edition, McGraw-Hill Book Company, pp 554–598 and B. Widrow and M. E. Hoff, Jr., "Adaptive Switching Circuits," IRE WESCON Conc. Rec., pt 4, pp 96–104, 1960) is described by the equation:

$$C_{i,n+1} = C_{i,n} + \mu(\hat{y}_n - y_n e^{-j\Phi})e^{j\Phi} x^*_{n-1} \quad (10)$$

where $\hat{y}_n$ is the demodulated signal at the output of the signal space slicer 50, $\Phi$ is the phase correction given by the carrier tracking system 44, and $\mu$ is a small real step size parameter.

What is thus described is a system in which the blind algorithm gives the appropriate gain to the signal and corrects the most severe distortion, and the conventional LMS algorithm performs the fine equalization of the channel.

It is important to understand that the self-recovering fractionally-spaced adaptive feedforward filter 32 is fed with signal samples at the twice the symbol rate, while its coefficients are updated at the symbol rate. The equalization implemented by the system, thus, belongs to the class of fractionally-spaced equalization techniques (see J. G. Proakis, "Digital Communications", Second edition, McGraw-Hill Book Company, pp 554–598, G. UngerBroeck, "Fractional Tap-spacing Equalizer and Consequences for Clock Recovery in Data Modems", IEEE Transactions on Communications, Vol. Com-24, No. 8, Aug. 1976 and J. D. Wang and J. J. Werner, "On The Transfer Function of Adaptive T/4 Equalizers", 22nd Silomar Conf. on Signals, Systems and Computers, Pacific Grove, Calif, Oct. 31, Nov. 2, 1988, pp. 260–264. These techniques are remarkable for the fact that they are able to compensate for the frequency response characteristics of the incoming signal before the signal suffers from the aliasing effects due to symbol rate sampling.

The adaptive feedforward filtering technique implemented by filter 32 derives many powerful advantages from the fact that it is fractionally-spaced. First, it has a built-in ability to compensate for incidental sampling misalignments, a very important advantage of the proposed design. More precisely, the self-recovering fractionally-spaced adaptive feedforward filter 32 performs two functions automatically: (1) adjusting its delay to cope with incidental sampling phase offsets, and (2) compensating for small sampling frequency offsets by progressively drifting its coefficients. This last property is extensively used in the timing recovery system described below. The technique filters the additive noise outside of the desired signal bandwidth and eliminates the need for a matched filter at the receiver. Finally, the technique out-performs the symbol-spaced equalizer in terms of average error in very noisy conditions.

Generally speaking, fractionally-spaced equalizers have the following disadvantages:

The equalizer converges to a solution which is not unique but depends on its initialization. The performance of the equalizer depends on the converged solution.

The equalizer performance outside the actual bandwidth of the signal is not fully controlled by the tap update algorithm, because the update rate is lower than the sampling rate.

In a low noise condition, the coefficients of the filter can progressively drift to high values and overflow.

In certain conditions (such as a slight sampling frequency offset), the main peak of the equalizer can split into multiple peaks (negative and positive) dispersed over the whole length of the filter. The dispersion of these peaks in the filter progressively degrades the equalizer performance.

The self-recovering fractionally-spaced adaptive feedforward filter 32 of FIG. 1 does not share these disadvantages because these problems are addressed through (1) a careful initialization sequence of filter 32, and (2) the use of a tap-leakage algorithm. We discuss these two mechanisms now.

Special care is taken with the initialization of the adaptive feedforward filter 32 before the blind tap update algorithm is run. To provide convergence to a good solution with high probability, the filter 32 is either loaded with the coefficients of the modulator shaping filter, or with one unique peak coefficient and all other taps set to zero. Initially, the peak of the filter is best placed near the center of the tap line, but its optimal position is also linked to the correct synchronization of the resampling at the output of the filter. This is done by the stochastic synchronizer 34 as discussed in a later section.

A tap-leakage algorithm (see R. D. Gitlin, H. C. Meadors, Jr., and S. B. Weinstein, "The Tap Leakage Algorithm for the Stable Operation of a Digitally Implemented, Fractionally Spaced Adaptive Equalizer", The Bell System Technical Journal, Volume 61, No. 8, October 1982) is used in the self-recovering fractionally-spaced adaptive feedforward filter 32 to prevent tap build-up and to provide out-of-band spectral shaping in order to reject the out-of-band noise and minimize adjacent channel interference. The tap-leakage algorithm used in this invention is a modification of the MCP or the LMS algorithm.

For the MCP algorithm, tap-leakage is described by the equation:

$$C_{i,n+1} = C_{i,n} + \alpha \cdot y_n \left[ \left( \sum_k G_k (R_k - |\overline{y_n} - V_k(\overline{y_n})|^2) x_{n-1}^* \right) - \lambda c_{i,n} \right] \quad (11)$$

Similarly, tap-leakage modifies the LMS algorithm as:

$$C_{i,n+1} = C_{i,n} + \mu[(\hat{y}_n - y_n e^{-j\Phi})e^{j\Phi} x_{n-i}^* - \lambda C_{i,n}] \quad (12)$$

The tap-leakage algorithm prevents tap build-up by systematically eroding the filter coefficients at each iteration, thereby erasing any slow accumulation effect. The efficiency of tap-leakage is easily proven in the presence of sampling frequency offset.

The effect of tap-leakage on spectral shaping outside the signal bandwidth is not as obvious to explain. When tap-leakage is used without distortion in the channel, the adaptive feedforward filter 32 converges to a filter matched to the signal shaping filter used by the modulator. Without leakage, the adaptive feedforward filter 32 converges to a filter which has the same behavior in the symbol bandwidth but almost no attenuation outside of it. With distortion in the channel, the same observation holds and, with leakage, the filter converges to a solution which is the convolution of the modulator matched filter and the inverse of the channel impulse response. One can conclude that tap-leakage forces the adaptive feedforward filter 32 to select among all of its solutions the one closest to the matched filter. All of the equalizer solutions are relatively equivalent in the pass band but the matched filter solution is the only one which is optimum in the stop band (maximum attenuation). The use of tap-leakage in this invention is therefore greatly valuable in that it gives the equalizer maximum out-of-band noise rejection and minimum adjacent channel interference.

Despite these advantages, the continuous use of tap leakage results in degradation of the performance of the system in terms of equalization accuracy. This is because the leaking term works against the adaptive term in the coefficient update formula equations (11) or (12). The present invention limits the extent of this degradation by a system which controls the amount of leakage injected in equations (11) and (12) in real time. This system relies on two principles:

1. Leakage is controlled in amplitude by the parameter $\lambda$. The system keeps this parameter proportional to the speed of convergence of the tap-update algorithm. Tap leakage will thus be very moderated when the blind MCP algorithm is run.

2. Leakage is controlled by the duration of application of the leakage algorithm. This control method uses the fact that the solutions of a fractionally spaced equalizer are locally stable until the noise forces the equalizer to converge to another local minimum. By turning the leakage alternatively on and off, it is thus possible to reduce the global amount of leakage and the degradation it causes while keeping the full benefit of a large magnitude leakage.

It must be apparent that an important aspect of the invention is the mechanism which controls tap leakage. This control is done by the error-directed digital receiver controller 30 which applies tap leakage just enough to avoid tap build-up and force the equalizer to the optimum solution, but not too much to prevent performance degradation.

In order to extract the transmitted symbol sequence from the signal, the data output from the self-recovering fractionally spaced equalizer 32 is resampled in the discriminator 40. The discriminator resampling rate and phase are given by the phase-controlled rate divider 38. This divider slows the sampling clock down to the symbol rate and is phase-synchronized by the stochastic synchronizer 34. This synchronizer 34 receives input samples from the dual mode AGC 28 and analyzes the statistical content of the sampled signal in order to extract the timing information necessary to find the phase of the symbols at the output of the adaptive feedforward filter 32.

The importance of synchronizing the discriminator phase for extracting the symbol sequence will now be described. As previously mentioned, the self-recovering fractionally-spaced adaptive feedforward filter 32 is able to compensate for any sampling clock phase offset. A sampling clock phase offset also results in a symbol timing offset when the data is down-sampled at the output of the adaptive feedforward filter 32, so theoretically it does not really matter at what time the discriminator 40 resamples the signal to extract the symbol sequence because the adaptive feedforward filter 32 should adjust its delay automatically. However, in the present invention, a problem would occur if the output of the adaptive feedforward filter 32 were resampled close to the middle of a transition between two symbols. In that case, the equalizer is not initialized properly and the adaptive algorithm has to move the main peak of the filter one tap to the left or one tap to the right. The adaptive feedforward filter 32 is indeed able to do so, but, because there is more than one solution, it will converge to a tap setting that is not the same as the one that would have been obtained if the filter had been initialized with the correct delay. Not only is the equalizer solution different, but also its performance is significantly lower than if the equalizer had been correctly initialized.

The present invention includes a method of determining which sampling time the output of the adaptive feedforward filter 32 should be resampled in the discriminator 40 in order to maximize the probability of convergence to a good solution. Since the signal rate before the discriminator 40 is twice the symbol rate after resampling, the system must only make a choice between odd or even samples. This choice is the main function of the stochastic synchronizer 34.

To make the best choice, the synchronizer 34 determines which sampling time the eye diagram is most widely open. This determination is performed by calculating separate estimates of the variance of the signal magnitude at even and odd sampling times. With reasonable and realistic noise and distortion levels in the channel, the variance of the signal sampled near the symbol is higher than the variance of the signal sampled in the middle of a transition between two symbols. To prove this assertion, the variances at the two different sampling times are computed next.

Let the sampling occur once at every symbol and once exactly in the middle of the transition between two consecutive symbols. Let the transmitted symbol sequence be denoted by $a_i$'s, and let the signal shaping and channel distortion be modeled by an equivalent FIR filter with coefficients $f_k$'s. Then, the received signal is:

$$x_n = \sum_k b_{n+k} f_k \quad (13)$$

with $$b_{2i} = a_i$$

$$b_{2i+1} = 0 \quad (14)$$

The variance of the received signal estimated at even sampling times is:

$$E[|x_{2n}|^2] = E\left[\left|\sum_k b_{2n+k} f_k\right|^2\right] = E\left[\sum_k \sum_l b_{2n+k} b^*_{2n+l} f_k f^*_l\right] \quad (15)$$

$$= \sum_k \sum_k f_k f_{*l} E[b_{2n+k} b_{*2n+l}]$$

If the input sequence is uncorrelated and uniformly distributed with zero mean, this expression reduces to:

$$E[|x_{2n}|^2] = E[|a_n|^2] \sum_{k'} |f_{2k'}|^2 \quad (16)$$

Similarly, the variance of the signal estimated at odd sampling times is:

$$E[|x_{2n+1}|^2] = E[|a_n|^2] \sum_{k'} |f_{2k'+1}|^2 \quad (17)$$

For example, if there is no distortion in the channel and if the signal shaping is done through an FIR filter with coefficients $f_0=0.5$, $f_1=1$, $f_2=0.5$, the variance of the signal sampled on the symbols is twice the variance of the signal sampled between two the symbols.

The next question to solve is where to estimate these two variances. Two methods are possible: before the linear filter 32 or after. The first method has the advantage of being independent of what happens in the adaptive feedforward filter 32, but requires knowledge of the delay in the filter. The second method eliminates this need but is very dependent of the fluctuations in the filter 32. For example, if there is a delay adjustment in the filter due to a sampling clock phase offset, the variance comparison result might suddenly change in the middle of the synchronization acquisition.

For that particular reason, the system of this invention estimates both variances before the adaptive feedforward filter 32, and performs synchronization with the result of the variance comparison according to Table 1.

TABLE 1

| Resampling Synchronization | | |
| --- | --- | --- |
| Comparison Result | Equalizer Delay | Resampling Time |
| $\sigma^2_{even} > \sigma^2_{odd}$ | even | even |
| $\sigma^2_{even} < \sigma^2_{odd}$ | even | odd |
| $\sigma^2_{even} > \sigma^2_{odd}$ | odd | odd |
| $\sigma^2_{even} < \sigma^2_{odd}$ | odd | even |

Figure 4:
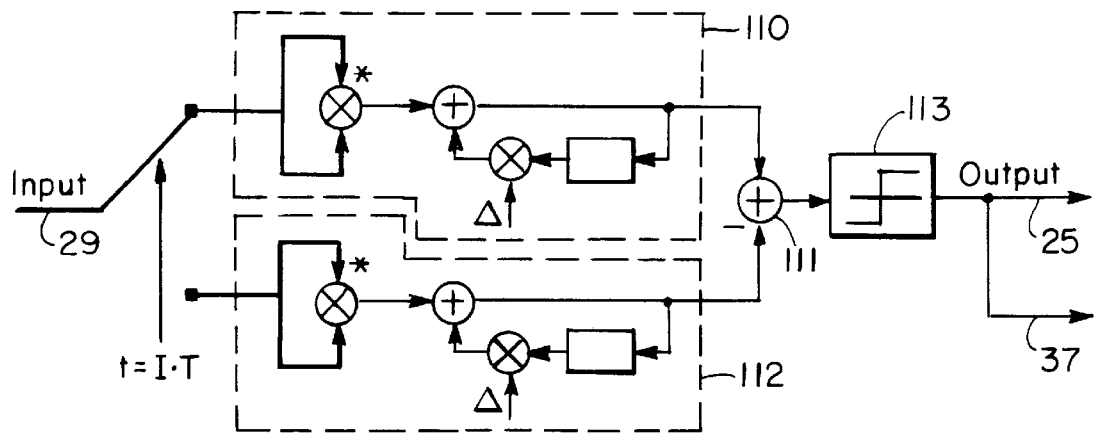
FIG. 4 is a schematic diagram of the stochastic synchronizer of the receiver of FIG. 1.

A preferred embodiment of the stochastic synchronizer 34 is shown in FIG. 4. The actual estimation of the variance is easily done by simply averaging the square magnitude of each sample received on line 29 in variance estimators 110, 112. The time constant of the averager is not a critical issue but should be chosen small enough to prevent estimation fluctuation that would cause a wrong decision at the comparison.

It is particularly useful to notice that in the presence of a sampling frequency offset, the result of the comparison of the two variances in the stochastic synchronizer 34 will periodically change. Therefore, the system of this invention freezes the resampling synchronization once the equalizer has converged. Indeed, if there is a sampling offset small enough to be absorbed by the adaptive feedforward filter 32, the stochastic synchronizer 34 must not be allowed to suddenly change the resampling time, because the adaptive filter is precisely adjusting its delay so that its output is still resampled at the right instant.

Furthermore, it can also been seen that the time between two periodic changes in the outcome of the variance comparisons is inversely proportional to the frequency offset between the sampling clock of the transmitter and the receiver. This observation is used to evaluate large sampling clock offsets before the equalizer converges, and it explains why the output of the stochastic synchronizer 34 is also directed to the polyphase timing controller 26 on line 35.

Two other elements are needed by the timing controller 26: the location of the central peak of the feedforward filter 32 and the direction of the filter coefficient drift. These two quantities are evaluated by the coefficient profiler 36.

The first coefficient profiler output is an index referring to the tap position closest to the actual peak of the feedforward filter 32. Note that the filter coefficient set is only the sampled version of the actual filter impulse response. The actual peak of the impulse response could very well be between two samples, i.e., between two coefficients.

Figure 5:
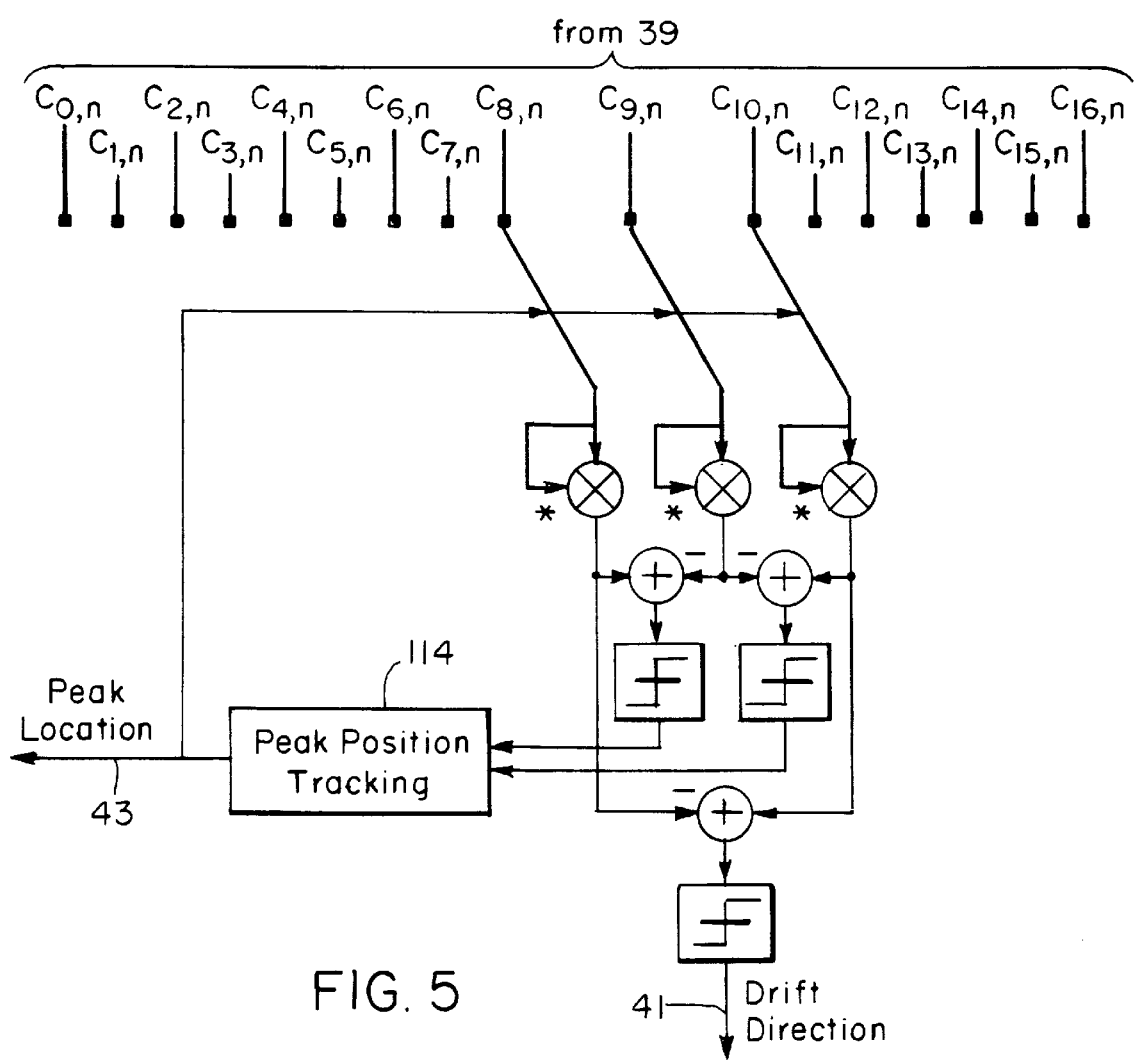
FIG. 5 is a schematic diagram of the coefficient profiler of the receiver of FIG. 1.

The system selects the coefficient of largest magnitude because it is the one which is the more likely to be nearest to the filter peak. When the peak moves, the peak location output of the coefficient profiler 36 changes when the actual peak is in the middle between two coefficients. Because the position of the peak is known at initialization and because the peak motion is continuous, it is only necessary to compare three coefficients of the filter at all times in order to track the position of the peak. The preferred embodiment of the coefficient profiler 36 is illustrated on FIG. 5. The profiler selects three consecutive coefficients $C_{i,n}$ in the tap line: the last known position of the peak and its two neighbors. The three coefficients are compared and when the peak is detected to have moved from the center coefficient to one of the neighbors in peak position tracking 114, the profiler selects three new coefficients centered on the position the peak has moved to, referenced at 43.

The second output of the coefficient profiler 36 is a binary signal 41 which gives an estimate of the direction of the coefficient drift. This direction is estimated by comparing the two coefficients next to the peak. The profiler uses the fact that when the peak cannot move freely because the equalizer has not totally converged, the coefficient in the direction of the drift is likely to have a larger magnitude than the other one.

It should be noted that the output rate of the coefficient profiler 36 is also the symbol rate since the coefficients of the filter 32 are only updated at every symbol occurrence. Coefficient comparisons in the profiler 36 are done on the magnitude since the coefficients are complex-valued and can have arbitrary phases.

The output of the stochastic synchronizer 34, and the drift direction and the peak location estimates from the coefficient profiler 36 are transferred to the polyphase timing controller 26. On the basis of these three signals, the polyphase timing controller 26 adjusts the timing of the variable-rate polyphase resampler 24 to compensate for sampling clock offsets between the transmitter and the receiver.

They are two types of time/frequency offsets which need to be compensated for: those offsets small enough to be automatically compensated for by the self-recovering fractionally-spaced adaptive feedforward filter 32, and large offsets that are too big for the adaptive feedforward filter 32 to handle, as is the case during the initialization period or after a reset event.

For the first category, the adaptive feedforward filter 32 automatically compensates for small offsets by progressively adjusting the delay of its impulse response (see R. D. Gitlin and H. C. Meadors, Jr., "Center-tap Tracking Algorithm For Timing Recovery", AT&T Tech. J., Vol. 66, No. 6, pp. 63–78, November/December 1987). In other words, the adaptive feedforward filter 32 drifts all its coefficients to the right if the clock is too slow, or to the left if the clock is too fast. Even compensated this way, the timing frequency offset still needs to be corrected because the continuous coefficient drift will soon lead the central peak to the end of the tap line. The system of this invention corrects a small sampling frequency offset by evaluating the corresponding coefficient drift speed. This speed is directly proportional to the sampling frequency offset and is estimated by simply measuring the time (in number of symbol periods) it takes for the peak to move from one tap position to the next, using the peak location output of the coefficient profiler 36. Once the timing controller 26 has computed an estimated of the drift speed, it corrects the sampling frequency in such a way that the peak will drift back to the center of the filter 32. When the peak has retrieved its center position, the timing controller 26 modifies the sampling frequency again in order to stop any coefficient drift.

Figure 6:
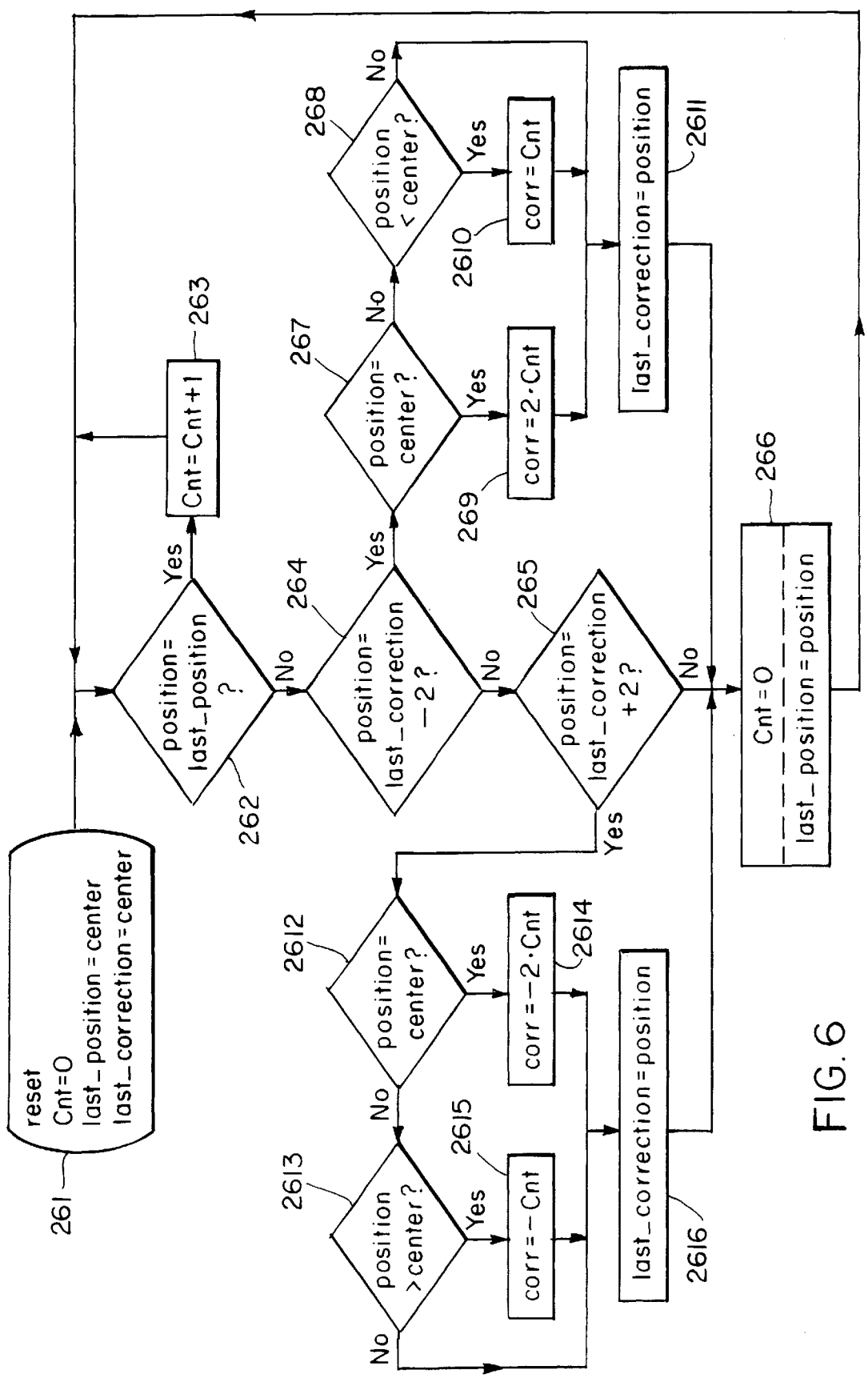
FIG. 6 is a flow diagram of the timing control procedure for small sampling frequency offsets.

The sampling clock corrections are done by adapting the phase selection process in the variable-rate polyphase resampler 24 before the adaptive feedforward filter 32. The drift detection and speed correction process is shown in FIG. 6.

To be more specific, the process performed in the polyphase timing controller 26 uses the following variables:

[last_correction] the position of the peak when the last clock adjustment was made.

[last_position] the last known position of the peak.

[position] the current position of the peak.

[Cnt] a counter which measures the time (in symbol periods) since the last detected transition of the peak location occurred.

At power-up or after a reset, the peak is in the middle of the tap line. [last_position] and [last_correction] are both initialized to the center position, and the counter [Cnt] is reset to zero (box 261). Because of the timing frequency offset, the peak starts drifting slowly and continuously to the left or to the right. As long as it has not reached the next tap position, the counter [Cnt] is incremented at each symbol occurrence (boxes 262 and 263). After a time inversely proportional to the timing frequency offset, the peak reaches the tap position directly to the left or directly to the right of the center tap. This first transition is ignored and no timing correction is made at this point (boxes 264 and 265). The counter [Cnt] is reset to start a new timing of the peak drift and the new position of the peak is memorized as the last known position of the peak (box 266). Since no correction has been made, the peak continues to drift in the same direction and with the same speed. Before it reaches the next position in the tap line, the counter [Cnt] is incremented at each symbol occurrence (boxes 262 and 263).

When the peak reaches the next tap position, it is two positions away from the center of the tap line. This is detected by box 264 if the peak moves to the left, or by box 265 if the peak moves to the right. It is then time to perform a timing frequency correction in order to send the peak back to the center of the tap line (boxes 267, 268 and 2610) or (boxes 2612, 2613 and 2615). The correction [Corr] is used to perform the timing adjustment in the variable-rate polyphase resampler 24. It is equal to the inverse of the fraction of sample to be added or removed from the sample period. Once the correction has been made, the peak position at the time of correction is recorded (boxes 2611 or 2616), and the counter [Cnt] is reset while the last known position of the peak is updated (box 266).

Because of the correction, the peak should now drift in the opposite direction. The system times the new drift with [Cnt] but no correction is made until the peak reaches the center of the tap line. Then a correction is performed in order to bring the peak to a complete stop (boxes 267 and 269 or 2612 and 2614). Note that if for one reason or another, the first correction was not sufficient to reverse the peak course, the peak drift will be corrected again when the peak is 4 tap positions away from the center of the tap line. If this is still not sufficient, it will be corrected to tap positions later, and so on. When the course is finally reversed, the peak returns all the way back to the center of the tap line before the drift is corrected again to stop the drift.

With this embodiment of the system, sampling frequency corrections are made only after the peak has traveled two tap positions in the filter. This is to prevent drift speed measurements to be affected by the changes that occur on the impulse response shape just after a sampling correction. Speed measurements are suspended during the first tap position shift in order to let the impulse response settle down.

Also note that the size of the counter [Cnt] determines the maximum timing accuracy of the system. When this accuracy is reached, no further improvement can be brought to the sampling clock. In this case [Cnt] must of course saturate and not overflow. The peak will then oscillate extremely slowly between the center tap and the two taps on the left or the two taps on the right.

The second type of offset to be compensated typically occurs after power-up or after re-initialization. The timing frequency offset is then too big for the adaptive feedforward filter 32 to converge—this occurs typically for frequency offsets higher than 50 parts per million. As discussed, the method used to evaluate the timing offset is to measure the time between two changes of the comparison of the variance estimated at even and odd sampling times, i.e., by timing the output changes of the stochastic synchronizer 34. The time between two consecutive changes is inversely proportional to the amplitude of the sampling frequency offset. The sign of the frequency offset is given by the drift direction signal at the output of the coefficient profiler 36.

Figure 7A:
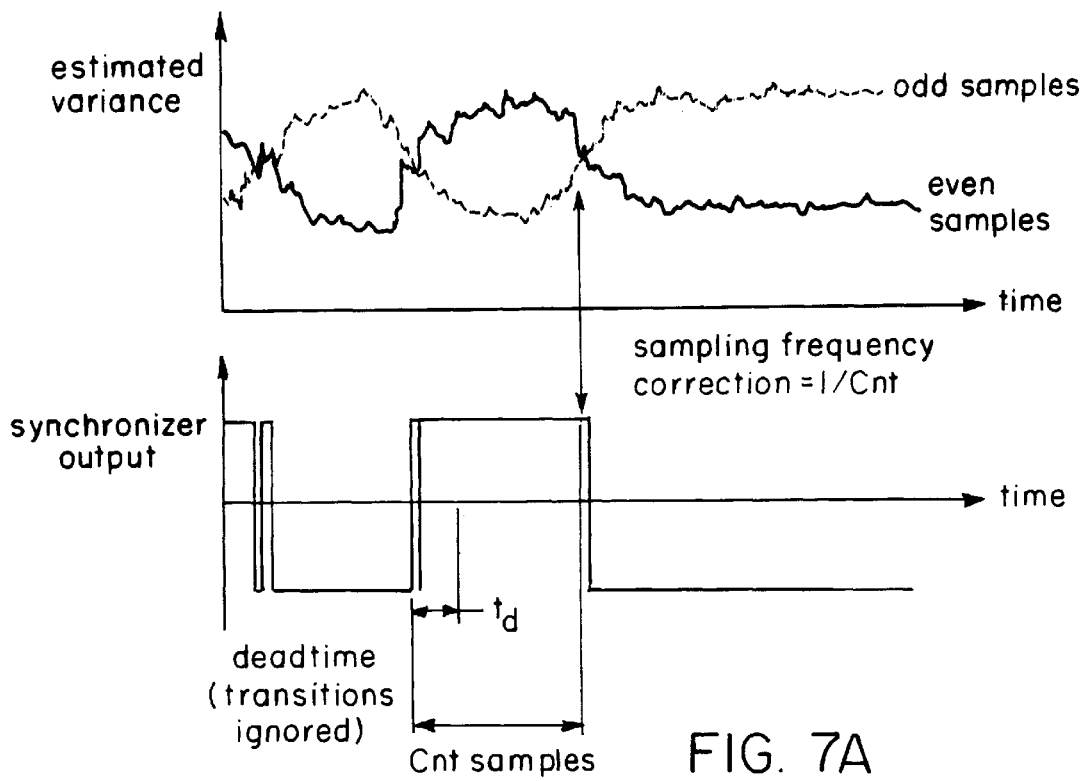
FIG. 7A is a timing diagram illustrating large timing offset measurement and correction in the present invention when no inversion occurs during the dead time; it includes a graphic representation of the variation of the estimated variance as a function of time, and of the synchronizer output as a function of time.
Figure 7B:
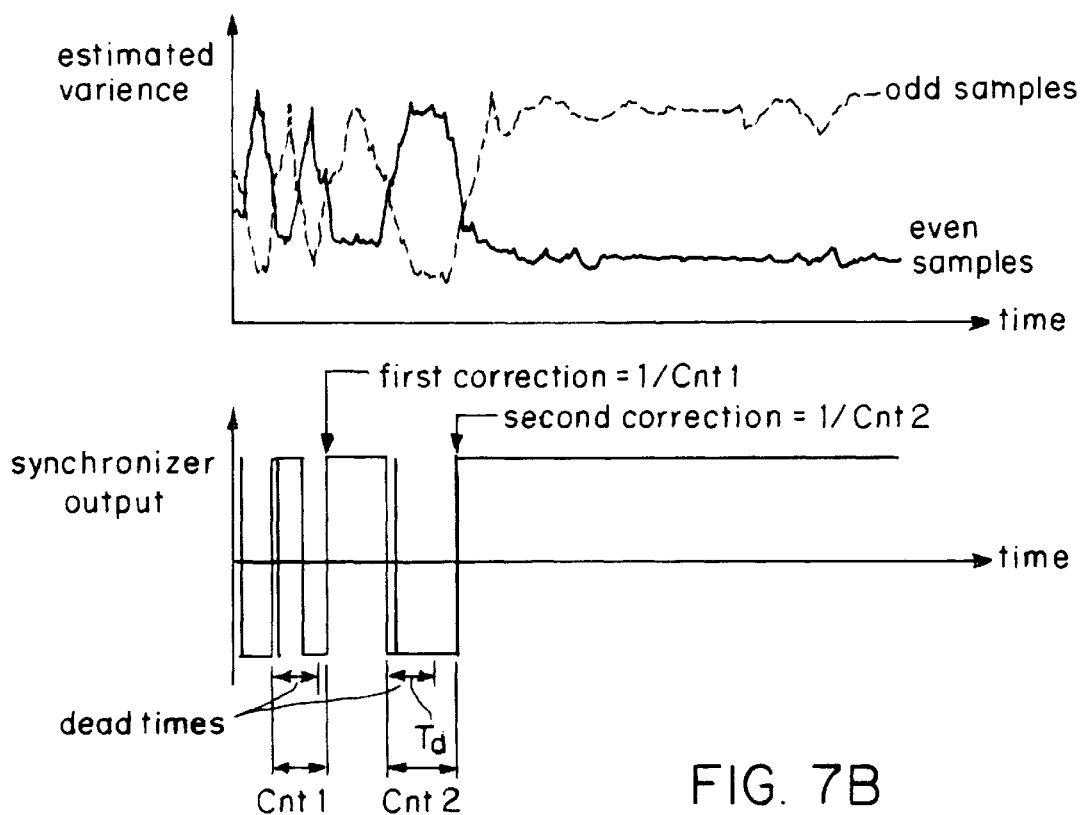
FIG. 7B is an illustration of timing offset measurement and correction in the case where inversions occur during the dead time. It includes a graphic representation of the variation of the estimated variance as a function of time, and of the synchronizer output as a function of time.

The polyphase timing controller 26 measures the time between two synchronizer output transitions with the counter [Cnt], in number of sample intervals. To avoid detecting incidental transitions because of the noise, the controller 26 ignores the transitions during a certain amount of time $t_d$ after the beginning of a measurement (FIG. 7A). This dead time $t_d$ could incidentally mask a real transition if the offset is very big, but this is all right because the resulting correction still reduces the offset which can be totally compensated by a second correction (FIG. 7B).

The timing controller 26 calculates the timing frequency correction from the value of the counter [Cnt] and the coefficient profiler signals with the formula:

| If (drift direction = left ) then | Corr = −Cnt | (18) |
|---|---|---|
| else | Corr = +Cnt | |

As previously discussed, the variable-rate polyphase resampler 24 sampling frequency is adjusted by the variables X and Y. For small corrections, X is 1 or −1 according to the direction of the adjustment, and Y is chosen to give the right frequency adjustment on average. After a correction, the new values of X and Y are computed from the previous values X' and Y' as follows:

If T is the sampling period before the variable-rate polyphase resampler 24, the sampling period after the resampler becomes after the timing correction, Corr=W.Cnt where W is the sample interval:

$$\frac{T}{M}\left(N + \frac{X}{Y}\right) = \frac{T}{M}\left(N + \frac{X'}{Y'}\right)\left(1 + \frac{1}{Corr}\right) = \frac{T}{M}\left(N + \frac{X'}{Y'}\right)\left(1 + \frac{1}{W \cdot Cnt}\right) \quad (19)$$

Thus, $$\frac{X}{Y} = \left(N + \frac{X'}{Y'}\right)\left(1 + \frac{1}{W \cdot Cnt}\right) - N = \left(N + \frac{X'}{Y'}\right) \cdot \frac{1}{W \cdot Cnt} + \frac{X'}{Y'} \quad (20)$$

$$Y = \text{abs}\left(\frac{Y' \cdot W \cdot Cnt}{Y'N + X' + X' \cdot W \cdot Cnt}\right) \quad (21)$$

$$X = \text{sgn}\left(\frac{Y' \cdot W \cdot Cnt}{Y'N + X' + X' \cdot W \cdot Cnt}\right)$$

It is then obvious why Y must be initialized with its maximum value.

The two timing recovery techniques used by the system of this invention have several major advantages in comparison to other systems in that they require minimum hardware, they involve almost no computation, and have great stability. In addition, they are totally independent of the phase of the signal.

Before entering the signal space slicer 50 where a decision is made to evaluate which signal was sent, the phase of the signal must first be adjusted in the phase compensator 42. The phase compensator 42 applies to the sampled data output from discriminator 40 the phase shift estimate provided by the carrier acquisition and tracking system 44. The phase correction done by the phase compensator 42 negates the rotation effects due to an incidental mismatch of the carrier frequency in the analog part of the receiver, for example mismatches due to frequency errors occurring in the tuner 10 and the QAM demodulator 20. The preferred embodiment of the phase compensator 42 is a complex rotator which multiplies the sampled signal by the complex exponential of the phase correction. As for timing offsets, the method for acquiring and tracking the carrier phase offset will be different depending on the size of this offset.

For small offsets as described in references J. G. Proakis, "Digital Communications", Second edition, McGraw-Hill Book Company, pp 554–598 and N. K. Jablon, "Joint Blind Equalization, Carrier Recovery, and Timing Recovery for High-Order QAM Signal Constellations", IEEE Transactions on Signal Processing, June 1992, carrier tracking is performed by evaluating two parameters at each iteration: the instantaneous phase error and the instantaneous phase velocity. Both use the comparison of input and output of the signal space slicer 50. When the channel is not yet equalized, the average of their relative angle gives an estimation of the phase error, allowing the system to progressively catch up with the signal phase. When the channel is equalized, the result of the angle comparison gives the actual phase error, and the phase is locked with precision. The relative angle between the input and the output of the slicer 50 is approximated by the imaginary part of their complex cross product:

$$F_{n+1} = F_n + \Delta_s \cdot Im(\bar{y}_n y^*_n e^{j\Phi_n}) \quad (22)$$

$$\Phi_{n+1} = \Phi_n - \Delta_p \cdot Im(\bar{y}_n y^*_n e^{j\Phi_n}) - F_n \quad (23)$$

$$\Delta_s << \Delta_p \quad (24)$$

where $F_n$ is the instantaneous phase velocity in rad/symbols, and $\Phi_n$ is the phase rotation of the carrier tracking system.

Phase velocity estimation is necessary when the phase vector rotates constantly. Without it, a phase bias would result between the tracked phase and the actual phase due to the fact that the correction term in the phase tracking formula equation (22) is not big enough to compensate for the phase increments. The problem with this bias is two-fold. First, in the presence of phase bias, the self-recovering fractionally-spaced adaptive feedforward filter 32, which is complex, would try to cancel the bias by rotating its coefficients. The tracking algorithm would try restore the bias and the coefficients would be constantly rotating. Second, the presence of a large bias would result in wrong quantizer decisions for the points at the periphery of the constellation.

By evaluating the instantaneous phase velocity, the system of the present invention avoids these problems and allows the use of a smaller parameter Δp which lowers the sensitivity to noise.

Without any modifications, this classical carrier tracking system only works for relatively small carrier frequency offsets (typically 0.36 degree/sample for 64 QAM or 0.072 degree/sample for 256 QAM). The tracking range can be enlarged by only updating the estimation of the phase and its velocity when the signal has a large magnitude. This is due to the fact that in this case the phase of the signal is less affected by the noise from the equalizer 32 or the channel. It is then necessary to measure the time between two updates in order to compute the estimation of the phase velocity. If we call $t_{last}$ the time (in symbols) since the last correction, the new estimation of the phase velocity is:

$$F_{n+1} = F_n + \Delta_s \cdot Im(\bar{y}_n y^*_n e^{j\Phi_n})/t_{last} \quad (25)$$

This velocity is used to increment the phase evaluation at every symbol period.

In modern cable communication systems for digital TV, phase rotation due to carrier mismatches can reach values as high as 4 degrees/sample. Even improved as described, the system above is unable to track this kind of frequency offset.

The present invention extends the tracking range of the carrier acquisition system 44 well beyond the need of modern cable communication systems thanks to a double estimate of the rotation velocity. The first estimate is given by the system just described and is very accurate as long as the velocity is within a limited tracking range. The second estimate is computed by observing the corners of the constellation. It is much less accurate but its tracking range is several orders of magnitude wider than the first method.

Corners are the only points of the constellation to be recognizable for any phase of the signal. They also have the advantage of having the largest magnitude in the constellation, so their phase is the least affected by equalization and channel noise. They are simply detected by comparing the magnitude of the signal with a threshold value. When a signal point is detected to have a larger magnitude than this threshold, it is assumed to be a corner and its position is memorized. When another corner is detected, the system estimates the angle by which the constellation has rotated between the two corner appearances. The system assumes that the constellation can rotate by a maximum 45 degrees between two corner appearances. When a corner $y_1$ is detected at time $t_1$, the system assumes that at the same time three other corners are located at $y_1 \cdot e^{j\pi/2}$, and $y_1 \cdot e^{j3\pi/2}$. When another corner $Y_2$ is detected at time $t_2$, the constellation rotation angle is computed by comparing $Y_2$ with the closest corner detected at time $t_1$. By approximating the angle by its tangent, the constellation rotation $\theta$ between the two corner appearances is estimated as:

$$\text{if } (|Re(y_1 y_2^*)| > |Im(y_1 y_2^*)|) \text{ then } \theta = \frac{Im(y_1 y_2^*)}{Re(y_1 y_2^*)} \quad (26)$$

$$\text{else } \theta = -\frac{Re(y_1 y_2^*)}{Im(y_1 y_2^*)}$$

The corresponding rotation velocity is then estimated iteratively as:

$$F_{n+1} = F_n - \Delta_s \frac{\theta}{t_2 - t_1} \quad (27)$$

The estimate equation (27) can track very large carrier mismatches, but it is usually not accurate enough to lock the phase of the constellation and stop its rotation. However, equation (27) is close enough to the actual rotation velocity for the other tracking system equations (22) or (25) to easily compensate the residual phase rotation. In order to let the two tracking methods work together, the system of this invention artificially forces the estimate equation (22) to be in the neighborhood of the estimate equation (27) and then lets equation (22) run freely to lock the phase with precision. This is summarized by the following equations:

$$\begin{aligned}
&\text{if } (F_{n-1} < F_n' - \varepsilon) & F_n &= F_n' - \varepsilon \\
&\text{if } (F_n' - \varepsilon < F_{n-1} < F_n' + \varepsilon) & F_n &= F_{n-1} + \Delta_s \cdot Im(\hat{y}_{n-1} y_{n-1}^* e^{j\phi_{n-1}}) \\
&\text{if } (F_{n-1} > F_n' + \varepsilon) & F_n &= F_n' + \varepsilon
\end{aligned} \quad (28)$$

where $F_n'$ is updated with equation (27) every time a corner is detected, and e is a velocity smaller than half the maximum tracking range of equation (22).

Once the signal phase is acquired and the system has converged, it is not necessary to keep equations (27) and (28) running since equations (22) or (25) are sufficient to keep the phase locked.

Figure 8A:
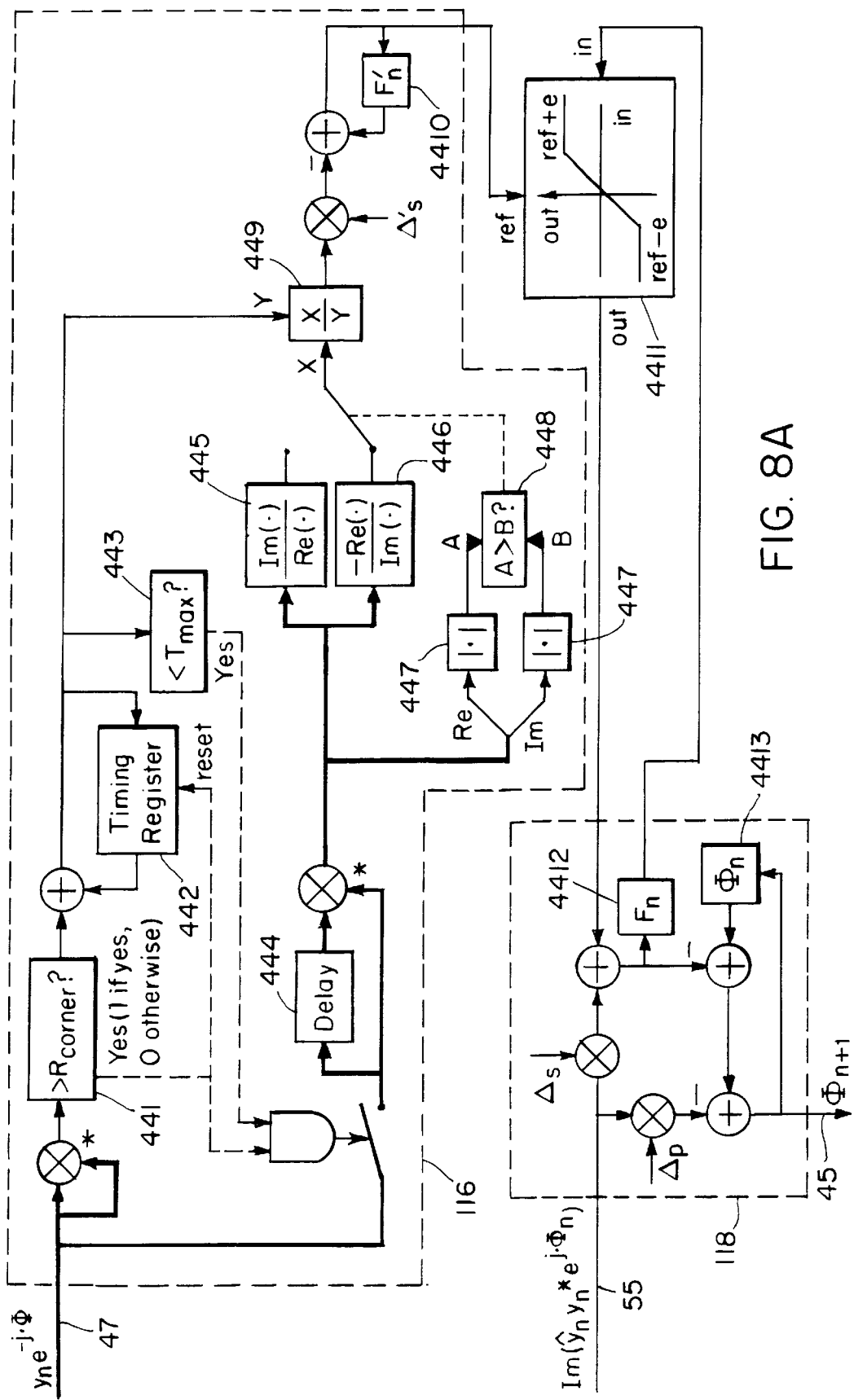
FIG. 8A is a schematic diagram of the carrier tracking system.

The corresponding embodiment of the carrier acquisition and tracking system 44 is shown in FIG. 8A. The lower section of the schematic illustrates the fine carrier tracking device 118 described by equations (22) and (23) and is self-explanatory. The input 55 of this subsystem 118 is the imaginary part of the complex product between the input and the output of the signal space slicer 50 and is the output of the phase-error estimator 54. The upper section of FIG. 8A shows the fast carrier tracking device 116 used to track large rotation velocities with equations (26) and (27). The signal magnitude is first compared with a threshold in 441. The threshold $R_{corner}$ determines whether or not the incoming signal is a corner. If the signal magnitude is smaller than this threshold, the timing register 442 is incremented in order to measure the time between two corner appearances. If the threshold is reached, the signal is assumed to be a corner but is further processed only if the time elapsed since the previous corner detection is small enough to be certain that the constellation has not rotated more than 45 degrees. This is why the content of the timing register 442 is compared with $t_{max}$ in comparator 443 wherein $t_{max}$ is equal to 45 degrees divided by the maximum rotation velocity that the system can track. If the result of the comparison in 443 is positive, the signal point is processed in order to update the rotation velocity estimate. The rotation angle is computed by elements 444 to 448 according to equation (26). The corresponding velocity is obtained by dividing this angle by the time elapsed in 449, and the result is averaged in 4410 according to equation (27). The two tracking subsystems 116, 118 are linked with the hardlimiter 4411 which implements equation (28).

Figure 8B:
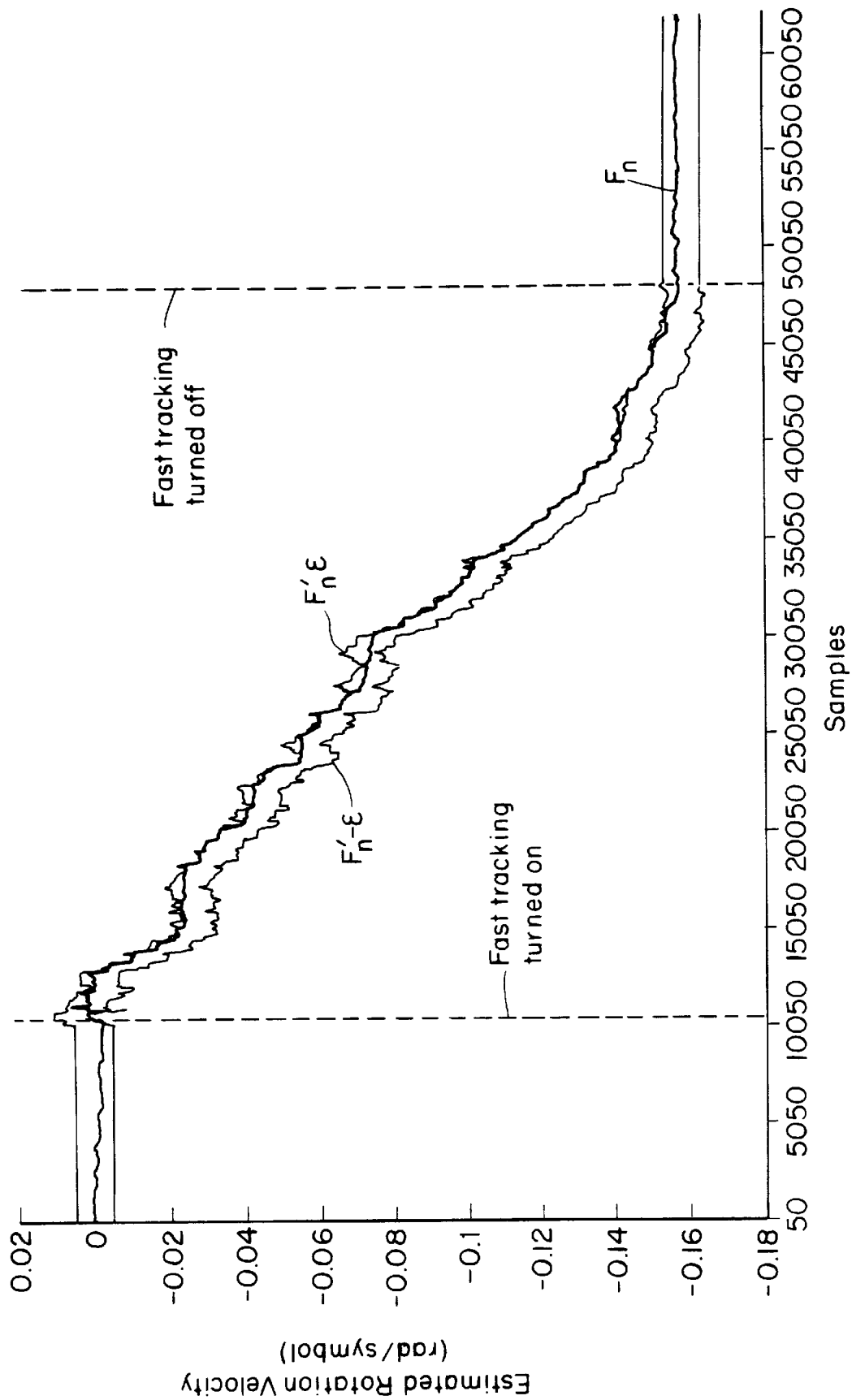
FIG. 8B is an illustration of the functioning of the carrier tracking system.

FIG. 8B illustrates the functioning of the carrier tracking system 44. It shows how the output of the fine carrier tracking $F_n$ (bold line) is forced to stay between the two boundaries (fine lines) produced by the fast carrier tracking system $F_n'$. Once the phase is roughly acquired, the fast carrier tracking system is turned off and the fine carrier tracking system is free to lock on the phase with great precision (see the bold line on the right of figure).

The signal space slicer 50 is the last stage of demodulation. It is the device which estimates which symbols have been transmitted. This information is used at four levels in the system to produce the demodulated data; evaluate transmission errors and update the coefficients of the feedforward filter and the feedback filter; evaluate transmission phase errors and correct incidental carrier frequency offsets in the carrier tracking system 44; and evaluate the average magnitude error of the transmission and control the different parts of the receiver.

Figure 9A:
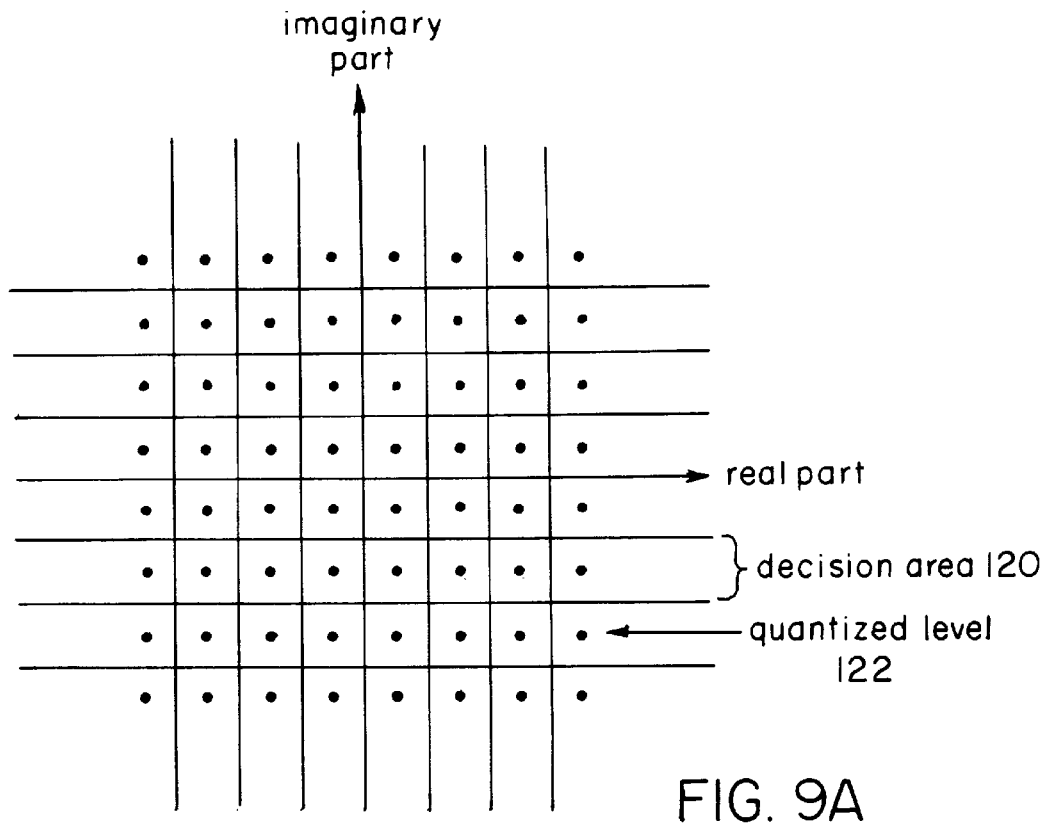
FIGS. 9A–9B illustrate the action of the signal space-slicer for a 64 QAM constellation.

Most of the time, the signal space slicer 50 is simply a quantizer along the real and the imaginary axes, as shown in FIG. 9A for 64-QAM modulation. The levels 122 of quantization correspond to the signal levels and are centered in the middle of each decision area 120, except for the perimeter points for which all the points falling out of the quantizer range are also mapped. This simplified slicer is adequate to demodulate the signal and deliver reliable decisions. However, in certain situations, a more elaborate signal space slicer is required for the adaptive algorithms and the carrier tracking system at hand.

In order for the LMS algorithm to converge, the exact error between the transmitted and the received signals must be known. If the signal space slicer 50 makes many incorrect decisions, the resulting computed errors do not reflect actual transmission errors and the adaptive feedforward filter 32 diverges. If the eye is already open when the LMS algorithm is turned on, most of the decisions are correct and a signal space slicer such as the one shown in FIG. 9A can be used. This slicer will be referred to as a hard signal space slicer. If the eye is a little bit closed as might be the case after blind equalization of high-order constellations, the decision error rate could be too high. The problem is thus to reduce the number of wrong decisions at the output of the signal space slicer 50.

Figure 9B:
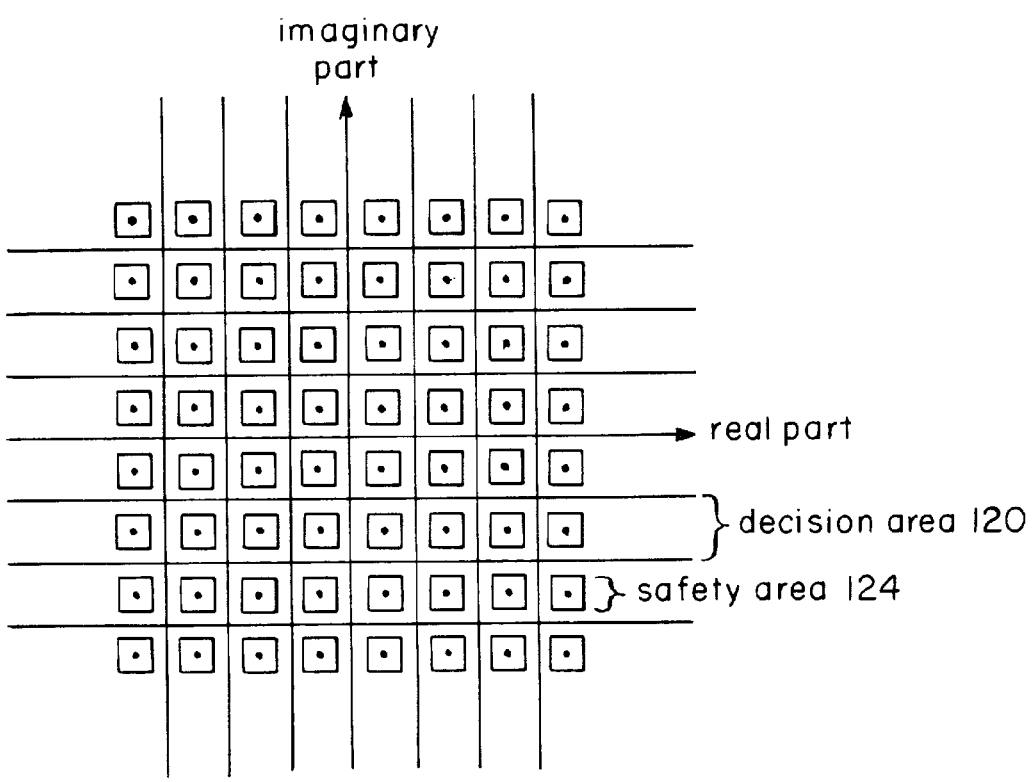

In the preferred embodiment of the invention, the number of wrong decisions is decreased by ignoring the points for which the corresponding transmitted symbol cannot be identified with certainty. The preferred embodiment of the signal space slicer is illustrated in FIG. 9B. Shaded areas 124 represent safe areas, i.e., areas where the probability of wrong decision is small. In this embodiment, the demodulated symbol delivered at the output of the signal space slicer 50 consists of the symbol decision produced by the hard signal space slicer shown in FIG. 9A and a confidence bit which indicates whether or not the symbol falls in the safe areas 124 or not. If the confidence bit is equal to 0, the decision is not reliable and no coefficient update is made. For this reason, the signal space slicer of FIG. 9B is referred to as a soft signal space slicer. The high confidence regions in the soft signal space slicer are illustrated in FIG. 9B at 124.

It will be appreciated by those skilled in the art that alternate methods of defining the confidence bit (or confidence word) other than the one specifically described in the preferred embodiment discussed herein are contemplated by the present invention. For instance, the confidence bit could be set to 1 if the received symbol falls within circular regions around each point or if the received symbol magnitude exceeds a threshold value. More generally, the confidence word (instead of a confidence bit) can represent a multiplicity of confidence levels with confidence regions attached to these levels. When a confidence word is used instead of a confidence bit, the updating of the filter coefficients uses the symbol decisions weighted by a confidence factor between 0 and 1. All of these additional definitions of the confidence bit or of the confidence word can be used without varying from the scope of the invention.

Figure 10:
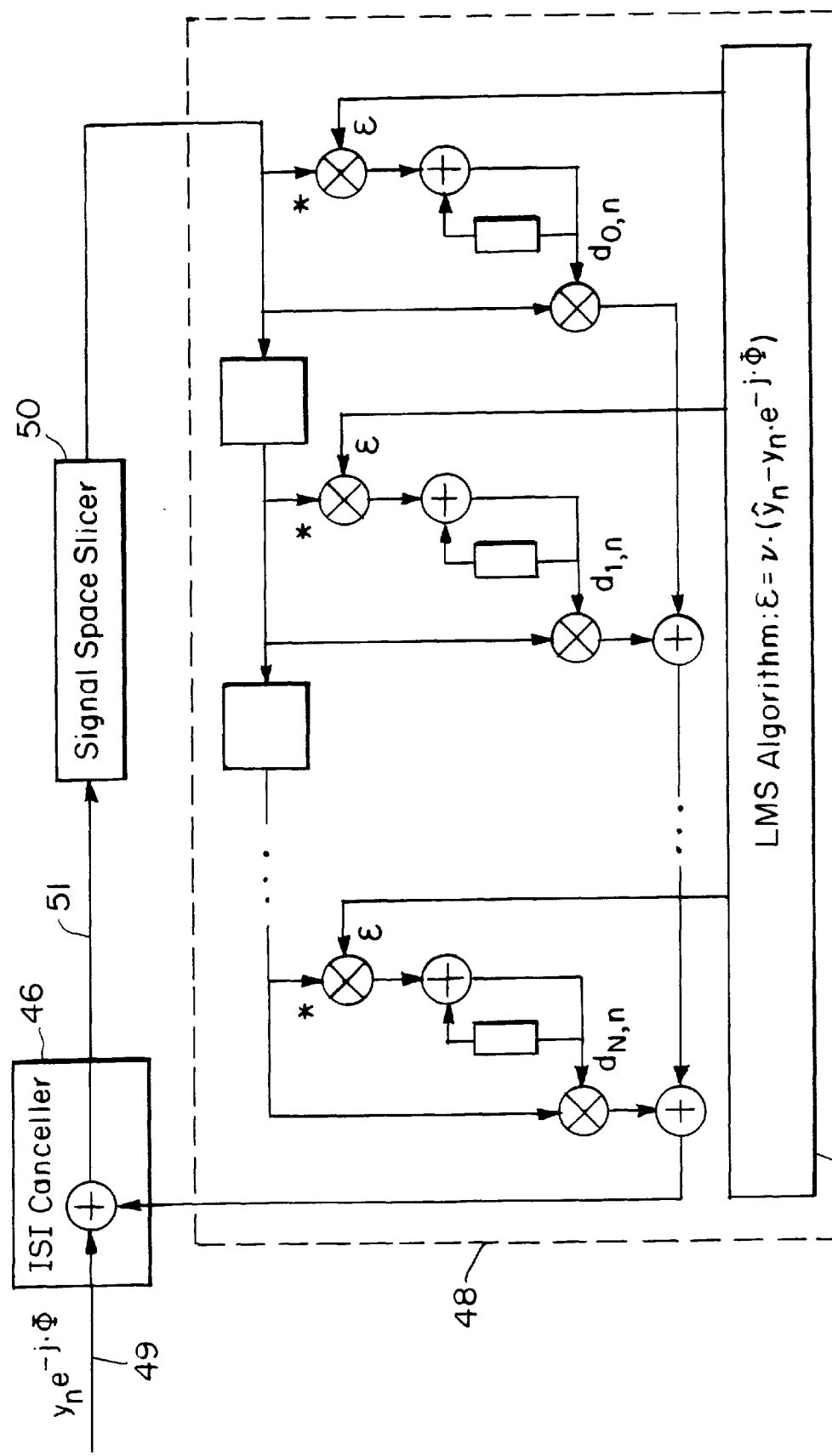
FIG. 10 is a schematic diagram of the decision directed adaptive feedback filter of the receiver of FIG. 1.

The adaptive decision-directed feedback filter 48 (FIG. 1) is a recursive adaptive filter implemented as an FIR filter with adjustable coefficients $d_{i,n}$ in the feedback path of a loop containing the signal space slicer 50 in the forward path, as illustrated in FIG. 10. The adaptive decision-directed feedback filter 48 is fed with quantized symbols produced by the signal space slicer 50, and it provides an estimate of the ISI to the ISI canceller 46. The preferred embodiment of the ISI canceller 46 is a complex adder which adds the estimate of the residual ISI provided by the adaptive feedback filter 48 to the phase compensated samples provided by compensator 42 on line 49. The resulting signal 51 is presented to the signal space slicer 50.

The coefficients of the adaptive feedback filter 48 are updated at the symbol rate with the LMS algorithm 126:

$$d_{i,n+1} = d_{i,n} + \alpha \cdot e_n \cdot \hat{y}_{n-1}^* \quad (29)$$

Since the feedback filter 48 uses as inputs the symbol decisions, the signal distortion must be small enough for the decisions made in the signal space slicer 50 to be correct. In other words, the adaptive decision-directed feedback filter 48 cannot be effective without the operation of the self-recovering fractionally-spaced adaptive feedforward filter 32 in front of it. If the signal space slicer 50 makes correct decisions, the noise does not reach the adaptive decision-directed feedback filter 48, and it is very efficient in canceling intersymbol interference.

The adaptive feedback filter 48 can be proven to be more efficient than a linear filter for an equivalent computation load. However, if the implementation of the adaptive decision-directed feedback filter 48 is too expensive or too complex for the application at hand, it is possible to achieve comparable performance with a longer linear filter.

The residual error estimator 52 (FIG. 1) provides an estimate of the residual error between the input and output of the signal space slicer 50. The preferred embodiment of the residual error estimator is a complex subtraction. The proposed invention uses the residual error first to feed the LMS algorithm 126 in the adaptive feedback filter 48 and the digital receiver controller 30. The residual error is also rotated in the phase compensator 56 before being used by the LMS algorithm of the adaptive feedforward filter 32. The preferred embodiment of the phase compensator 56 is the same as the phase compensator 42.

The residual error signal 53 at the output of error estimator 52 and the estimated symbols at the output of the signal space slicer 50 are presented to the error-directed digital receiver controller 30 which selects the timing method 58 of the polyphase timing controller 26 and the speed 60 of the AGC 28, controls the amount of leakage 62 in the self-recovering fractionally-spaced adaptive feedforward filter 32, and selects the equalization method 64 used in the self-recovering fractionally-spaced adaptive feedforward filter 32. The controller 30 is the brain of the receiver and is a finite state machine for which state transitions are directed by three parameters: an internal timer; the estimation of the variance of the equalization error; and the estimation of the variance of the demodulated signal.

The main idea is to trigger the controller state transitions according to the error between the transmitted and the demodulated signal. Unfortunately, there is no way to calculate the real error at the output of the demodulator since the transmitted signal is not known. The only information available is an estimation of the transmission error based on the average of the output 53 of the residual error estimator 52. But the result of this average might be significantly different from the real transmission error if the channel is not equalized enough or if carrier and timing have not been recovered with enough precision because the slicer 50 makes too many incorrect decisions. It is thus necessary to check the validity of the estimated error before triggering a state transition. This is done by also checking if the probability distribution of the demodulated signal is close to the one of the transmitted signal, and is easily implemented by comparing the estimation of the variance of the demodulated signal with the theoretical variance $E[|a_n|^2]$.

Depending on the value of the three parameters and the current operational state of the receiver, the controller 30 determines the next state of the receiver. Each state specifies which filters are updated, which equalization algorithm is used, which signal space slicing is performed, which timing recovery method is engaged, which carrier tracking system is in use, which AGC speed is applied, what amount of tap leakage is injected and eventually which parts of the receiver must be reinitialized.

There are 8 different states in total, each one with the operation characteristic given in Table 2.

TABLE 2

Operation Characteristics for the 8 System States

| | AGC | Synchronizer | Timing | Carrier | feedforward filter coefficient update | leakage | feedback filter coefficient update | timer internal timer |
|---|---|---|---|---|---|---|---|---|
| State 0 | RESET | RESET | RESET | RESET | RESET | OFF | RESET | RESET |
| State 1 | FAST | ON | OFF | OFF | OFF | OFF | OFF | ON |
| State 2 | SLOW | ON | FAST | FAST | BLIND with QCP | MODERATE | OFF | ON |
| State 3 | SLOW | ON | FAST | SLOW | BLIND with QCP and SPCP | MODERATE | OFF | ON |
| State 4 | SLOW | OFF | SLOW | SLOW | LMS | OFF | ON | ON |
| State 5 | SLOW | OFF | SLOW | SLOW | LMS | ON | ON | OFF |
| State 6 | SLOW | OFF | SLOW | SLOW | LMS | OFF | ON | OFF |
| State 7 | SLOW | OFF | SLOW | SLOW | LMS | ON | ON | ON |

Figure 11:
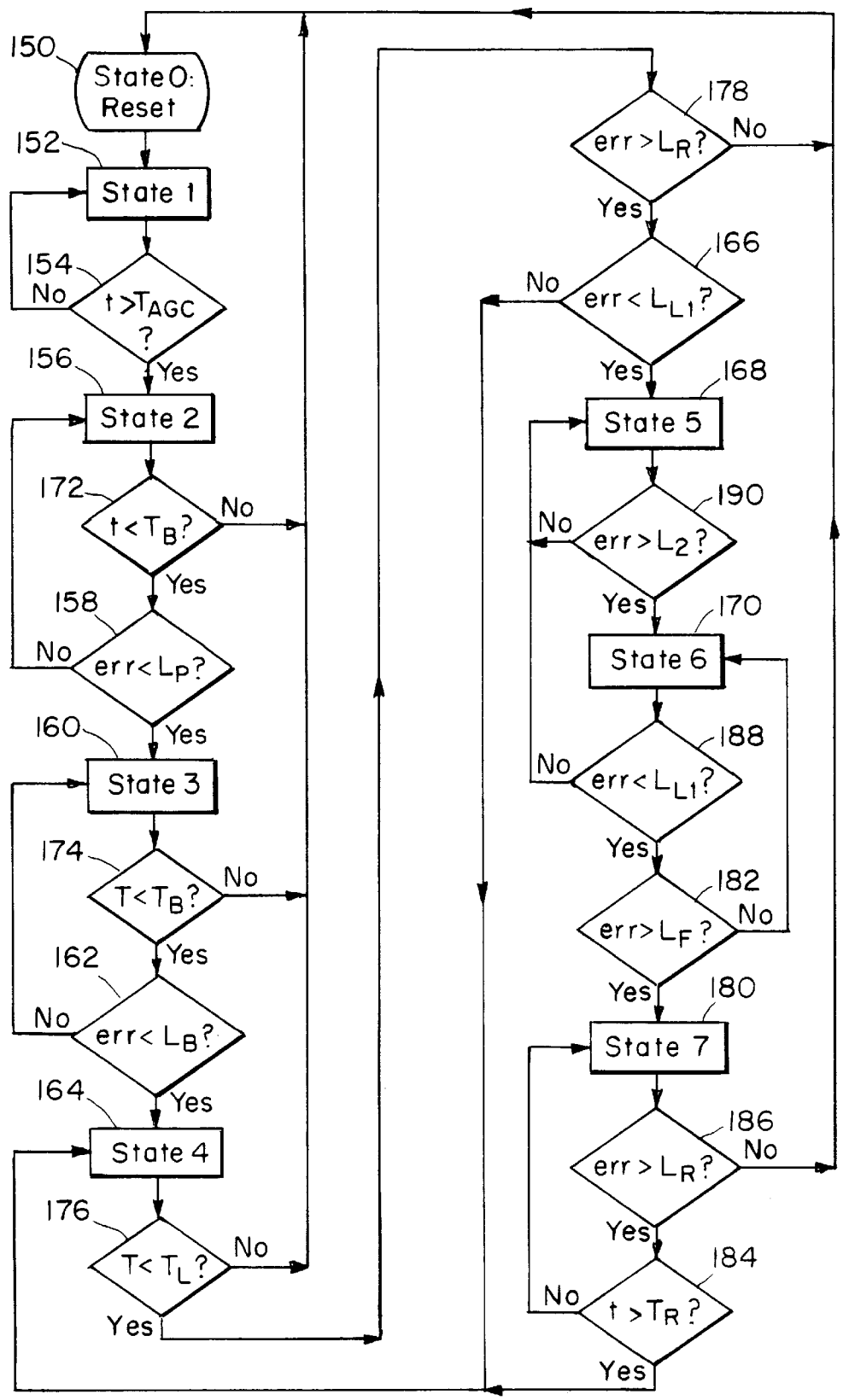
FIG. 11 is a flow diagram of the error-directed digital receiver controller decision process.

Transition events are summarized in FIG. 11. For normal convergence, the scenario is the following:

STATE 0: the controller 30 starts by resetting all the parameters at 150.

STATE 1: the fast AGC is run alone at 152 for a short period of time ($T_{AGC}$) determined at 154.

STATE 2: the feedforward filter coefficients are updated with the blind algorithm using only the QCP at 156. Phase and timing are corrected with fast methods. The system is maintained in this state until the error is low enough to assume the phase to be locked (error<$L_p$) determined at 158.

STATE 3: the feedforward filter coefficients are updated with the blind algorithm using QCP and SPCP at 160. Phase tracking is slow while timing correction still uses the fast method. The system is maintained in this state until the error is low enough to assume the eye to be open (error<$L_B$) determined at 162.

STATE 4: the LMS algorithm is engaged at 164 until the error reaches the desired level (error=$L_{L1}$) determined at 166. Timing and phase are now tracked with slow methods.

STATE 5<>STATE 6: the system switches back and forth between leaking and non leaking coefficient updates at 168, 170 in order to induce enough leaking without altering the overall performance.

Figure 12A:
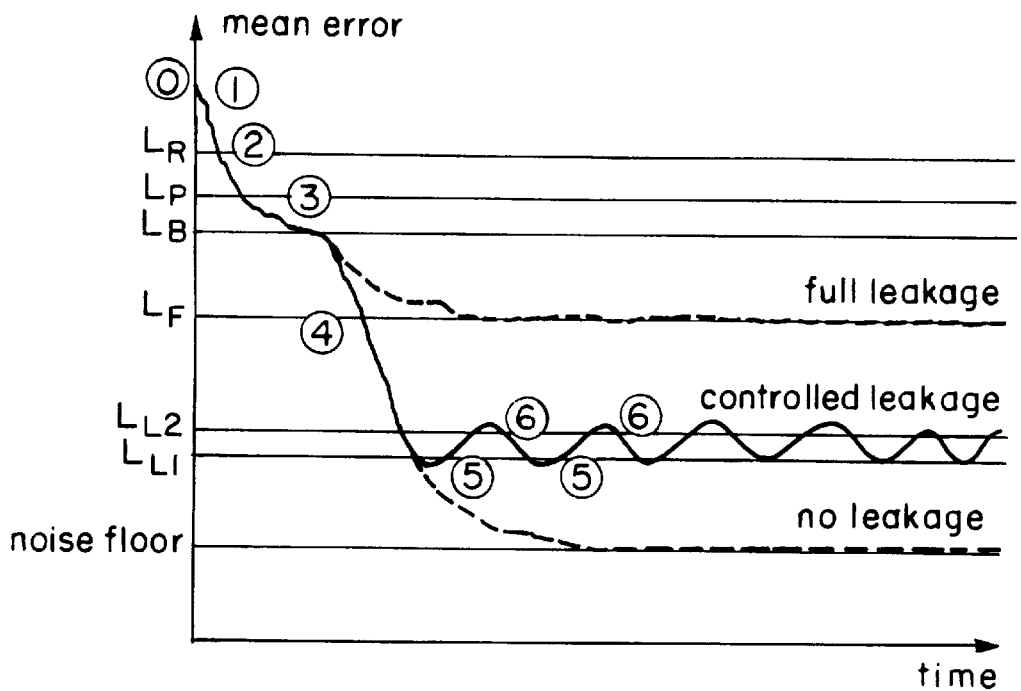
FIGS. 12A–12D are several typical error plots for different receiver convergence scenarios.
Figure 12B:
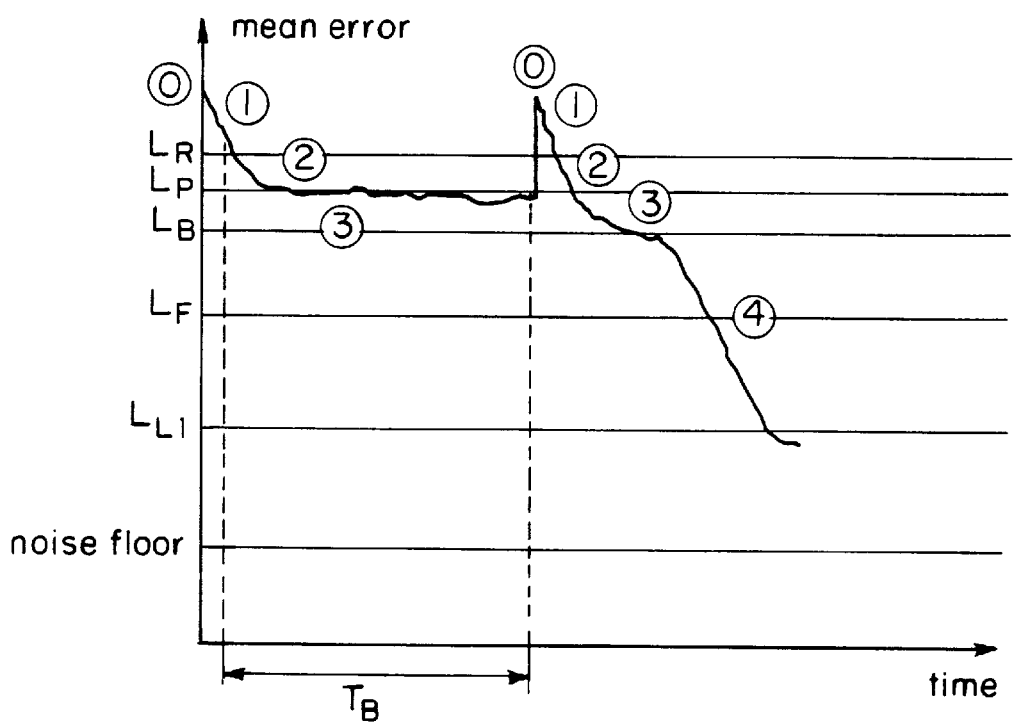
Figure 12C:
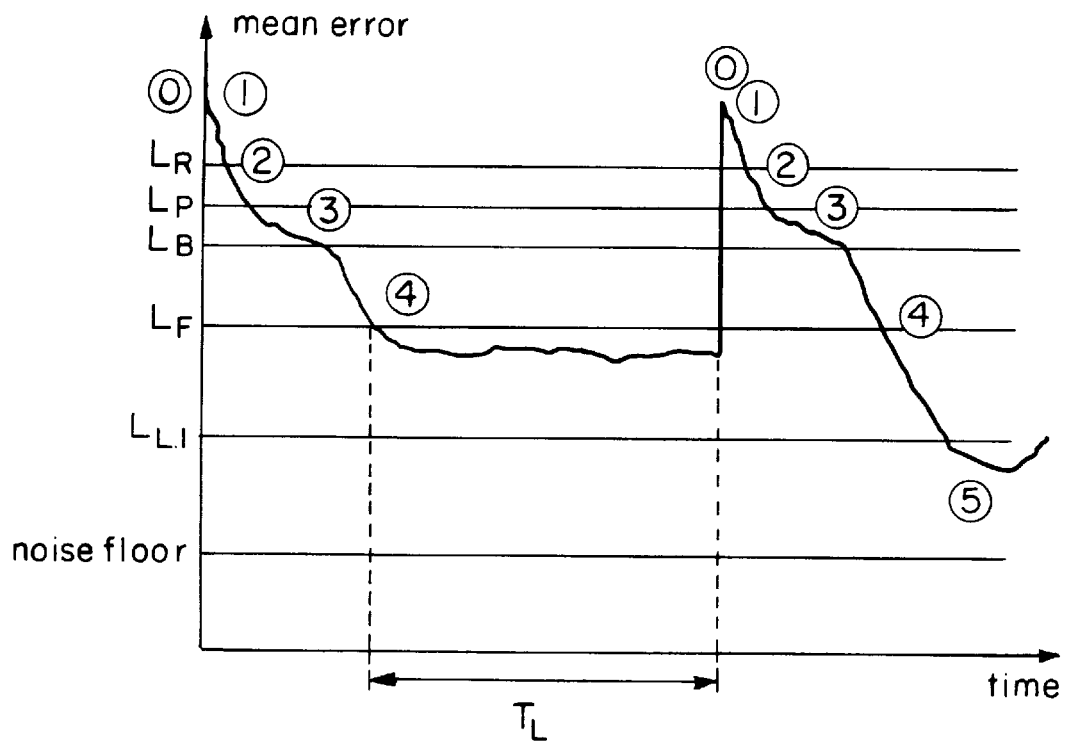

The corresponding evolution of the estimated error signal is represented in FIG. 12A wherein the circled references refer to the above states. Three situations may cause divergence from this perfect scenario:

either the blind algorithm or the carrier tracking or the timing recovery fails to converge and the system does not reach state 4. In this case, the timer will bring the system back to a complete reset after a preset lapse of time $T_B$ at 172, 174 (FIG. 12B).

the LMS algorithm does not converge in state 4 and the system never reaches state 5. The system will decide to reset if the error rises up to $L_R$ at 178, or if the timer reaches $T_L$ at 176 (FIG. 12C).

instead of oscillating between states 5 and 6, the system stays in state 6 and the error keeps growing.

Figure 12D:
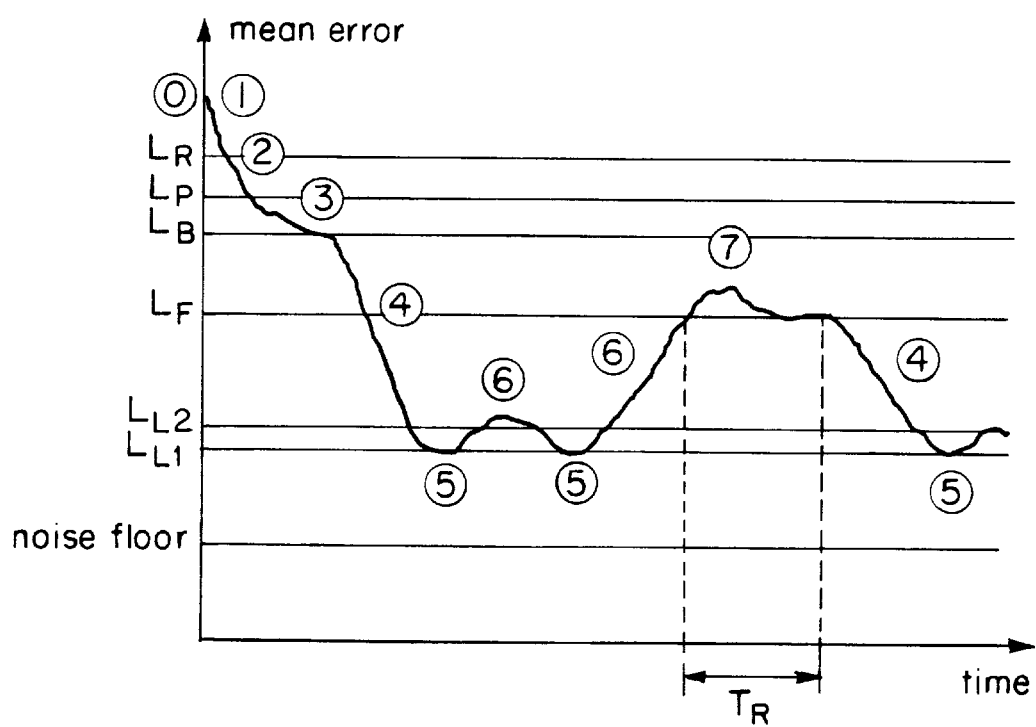

This situation is possible if the tap leakage is not sufficient to prevent coefficient build up. The system then enters state 7 at 180 when error reaches $L_F$ at 182 and leakage is applied for a fixed period of time $T_R$ determined at 184. If the error does not reach the reset level $L_R$ at 186 before the end of this time, the system will switch back to state 4 (FIG. 12D).

This architecture is usually sufficient to ensure convergence for constellations with less than 100 points.

State 3 might even be bypassed. For more complex constellations, it might be necessary to add the following modifications:

In states 2 and 3, start with a high α then reduce it progressively when the error level decreases. Adjust the leakage accordingly to make sure that it does not become stronger than the coefficient update when α becomes small.

double check the validity of the estimated error with the variance of the demodulated signal when passing from state 2 to state 3 or from state 3 to state 4.

add a state 3bis between states 3 and 4 and use a reduced quantizer for signal space slicing. Switch to state 4 (with the full slicer) only when sure that the eye is completely open.

The setting of the different thresholds is discussed in detail in the next section. parameter adjustment The equalizer design includes a wide variety of parameters and options. An essential aspect of this invention is the selection of the proper parameter values which is critical for the convergence, stability and performance of the digital receiver. This section intends to present all the parameters of the system and provide a method to adjust them efficiently. Table 3 provides a list of the parameters and describes their effect.

TABLE 3

| | description | effects | parameter adjustment if too small | if too big | typical value (QAM 64) |
|---|---|---|---|---|---|
| $\alpha$ | blind equalization step size parameter | regulates the convergence speed of the blind algorithm | initial convergence too slow | algorithm instability error attenuation not sufficient to engage the LMS algorithm | 0.01 |
| $\mu$ | LMS equalization step size parameter (feedforward filter) | regulates the convergence speed of the LMS algorithm | initial convergence too slow performance degradation due to leakage incapacity to equalize fast varying distortions incapacity to compensate large sampling clock offset | algorithm instability high sensitivity to noise | 0.01 |
| $\nu$ | LMS equalization step size parameter (feedback filter) | regulates the convergence speed of the LMS algorithm | initial convergence too slow incapacity to equalize fast varying distortions | algorithm instability high sensitivity to noise | 0.01 |
| $\lambda$ | leakage relative amount | determines the relative quantity to be removed from every equalizer coefficient at each symbol occurrence | progressive coefficient build-up poor out-of-band spectral shaping convergence to local minimum | coefficient collapsing | 0.1 |
| $\Delta_s$ | phase rotation tracking step size parameter | determines the mean time to compensate a phase rotation speed | long settling time of phase speed tracking | speed oscillations-instability | 0.001 |
| $\Delta_p$ | phase offset tracking step size parameter | determines the mean time to compensate a phase offset | long settling time of phase offset tracking phase offsets correction made mostly by speed adjustments, resulting in speed oscillations | instability | 0.1 |
| $L_P$ | error threshold for fine carrier tracking | determines when the signal phase is roughly locked and when the fine carrier tracking system is turned on | threshold never reached long convergence time | divergence of fine carrier tracking long convergence of blind equalizer (because of SPCC phase dependency) | <21 dB |
| $L_B$ | error threshold for blind equalization | determines when the equalizer switch from blind to LMS algorithm | threshold never reached long convergence time | eye closed: divergence of LMS | <22 dB |
| $L_{L1}$ | error threshold for leakage | determines when the coefficient leakage is turned on. | not enough leakage, resulting in coefficient build-up and poor out-of-band attenuation | high error level, resulting in many wrong slicer decisions | −35 dB |

TABLE 3-continued

| | description | effects | parameter adjustment if too small | if too big | typical value (QAM 64) |
|---|---|---|---|---|---|
| $L_{L2}$ | error threshold for no leakage | also determines the minimum error level. determines when the coefficient leakage is turned off. also determines the maximum error level. | not enough leakage, resulting in coefficient build-up and poor out-of-band attenuation | too much leakage, resulting in coefficient collapsing high error level, resulting in many wrong slicer decisions | −34 dB |
| $L_F$ | error threshold for build-up recovering procedure | determines when a coefficient build-up is detected and when leakage must be turned on to cancel this build-up | false alarms. Temporary increases of error level due to leakage recovering procedures | system failure due to late detection of coefficient build-up | −30 dB |
| $L_R$ | error threshold for reset | determines when the system is assumed to have failed and when to generate a total reset command | false alarms. Total resets interrupt converge procedure. | system failure due to lack of divergence detection | −20 dB |
| $T_{AGC}$ | duration of gain adjustment | determines how long the AGC runs by itself before turing on the equalizer | signal out of equalizer range when equalizer turned on | slow system convergence | 1000 samples |
| $T_B$ | time threshold for detection of non convergence of blind equalization | determines when the blind equalization is assumed to have failed and when the corresponding reset must be generated | system constantly reset before convergence | slow recovering from incidental convergence failure | 100,000 samples |
| $T_L$ | time threshold for detection of non convergence of LMS equalization | determines when the LMS algorithm is assumed to have failed and when the corresponding reset must be generated | system reset before end of convergence | slow recovering from incidental convergence failure | 20,000 samples |
| $T_F$ | duration of leakage recovering procedure | determines how long the leakage must be applied when a coefficient build-up is detected | not enough leakage: build-up resumes | long periods at high error rate | 10,000 samples |

An example of typical operational values is given in the last column of Table 3. It corresponds to a set of parameters to be used for a 64-QAM constellation in which the signal levels have been normalized between −1 and 1.

A few considerations can help the selection of the parameters:

1. The value of A, is always much smaller than (typically 100 times).
2. $L_B$ is easily found by letting the blind algorithm converge to its minimum error and choosing a value a little bit above.
3. λ is adjusted after α or μ has been selected. For the LMS algorithm, it should be adjusted in such a way that the leakage floor (i.e., the error level reached when leakage is constantly applied) corresponds to a level where most of the slicer decisions are still valid.
4. In order for the leakage control system to work, $L_{L1}$ and $L_{L2}$ must be between the floor noise, i.e. the level that the error would reach without leakage at all, and the leakage floor. If these limits are to close to the noise floor, the system will have almost no energy to push the error under $L_{L1}$, so leakage will not turned on often enough. Similarly, if the limits are too close to the leakage floor, the system will have little energy to pull the error above $LL_2$. The space between $L_L$ and $L_{L2}$ regulates the duration of leakage every time it is turned on. If leakage is enough to prevent tap build-up, the thresholds $L_{L1}$ and $L_{L2}$ can be equal (i.e., no hysteresis when alternating between states 5 and 6).
5. $L_F$ must be chosen at a level where slicer decisions are still mostly valid. It is usually chosen near the leakage floor.
6. $T_{AGC}$ must be adjusted to the settling time of the AGC running in fast mode.

To summarize this detailed description of the present invention, the essential subsystems in the digital receiver are the variable-rate polyphase sampler 24, the polyphase timing controller 26, the dual-mode AGC 28, the self-recovering fractionally-spaced adaptive feedforward filter 32, the stochastic synchronizer 34, the coefficient profiler 36, the carrier tracking system 44, the adaptive decision-directed feedback filter 48, the signal space slicer 50, and the error-directed digital receiver controller 30.

Performance Analysis

The present invention has been extensively simulated for 64 QAM and 256 QAM signals, with the embodiment described herein. Simulation clearly shows how the present invention meets all the needs of digital TV broadcasting in the modern cable environment. The simulation model is based on the worst conditions observed or predicted for this environment. It is summarized in Table 4.

TABLE 4

Digital TV Cable Environment Simulation Model

| | |
|---|---|
| Sampling frequency | 12 Msamples/sec |
| Carrier to Noise Ratio | 32 |
| First channel reflection | −10 dB at 400 nsec |
| Second channel reflection | −20 dB at 800 nsec |
| Carrier mismatch | +/−100 Khz |
| Clock accuracy | +/−100 ppm |
| Required convergence time | 100 msec |

Referring now to FIGS. 13A–13E through FIGS. 19A–19E, a set of example simulation results are shown. The simulations are based on the parameters included in Table 5.

TABLE 5

Simulation Parameters

| Parameter | SIMULATION | | | | | | |
|---|---|---|---|---|---|---|---|
| | 1 | 2 | 3 | 4 | 5 | 6 | 7 |
| QAM signal level | 64 | 64 | 64 | 256 | 256 | 64 | 256 |
| SNR (dB) | 25 | 32 | 40 | 32 | 40 | 25 | 32 |
| α | .005 | .01 | .01 | .002 | .002 | .002 | .002 |
| μ | .01 | .01 | .01 | .01 | .01 | .01 | .01 |
| λ (blind) | .01 | .01 | .01. | .01 | .01 | .005 | .002 |
| λ (LMS) | .02 | .02 | .02 | .02 | .02 | .07 | .02 |
| $A_{S1}$ | 0 | 0 | 0 | 0 | 0 | .005 | .003 |
| $A_{S2}$ | .0001 | .0001 | .0001 | .0001 | .0001 | .001 | .001 |
| $A_{p1}$ | 0 | 0 | 0 | 0 | 0 | 1.4 | 1.4 |
| $A_{p2}$ | 0.1 | 0.1 | 0.1 | 0.1 | 0.1 | 0.1 | 0.1 |
| $L_p$ (dB) | −22 | −22 | −22 | −26.5 | −26.5 | −21.5 | −26.5 |
| $L_B$ (dB) | −40 | −40 | −40 | −50 | −50 | −22.5 | −28 |
| $L_{L1}$ (dB) | −50 | −50 | −50 | −36.5 | −36.5 | −26.5 | −32.5 |
| $L_{L2}$ (dB) | −50 | −50 | −50 | −37 | −37 | −26.5 | −32.5 |
| Forward filter length (samples) | 64 | 64 | 64 | 64 | 64 | 64 | 64 |
| Backward filter length (symbols) | 0 | 0 | 0 | 0 | 0 | 10 | 0 |
| phase shift (degrees) | 0 | 0 | 0 | 0 | 0 | 0 | 44.98 |
| rotation per sample (degrees) | 4E − 05 | 4E − 05 | 4E − 05 | 4E − 05 | 4E − 05 | −3.6 | 3.6 |
| clock phase offset (T) | 0 | 0 | 0 | 0 | 0 | 0.6 | 0.3 |
| clock accuracy (%) | 0 | 0 | 0 | 0 | 0 | .05 | .01 |

Figure 13A:
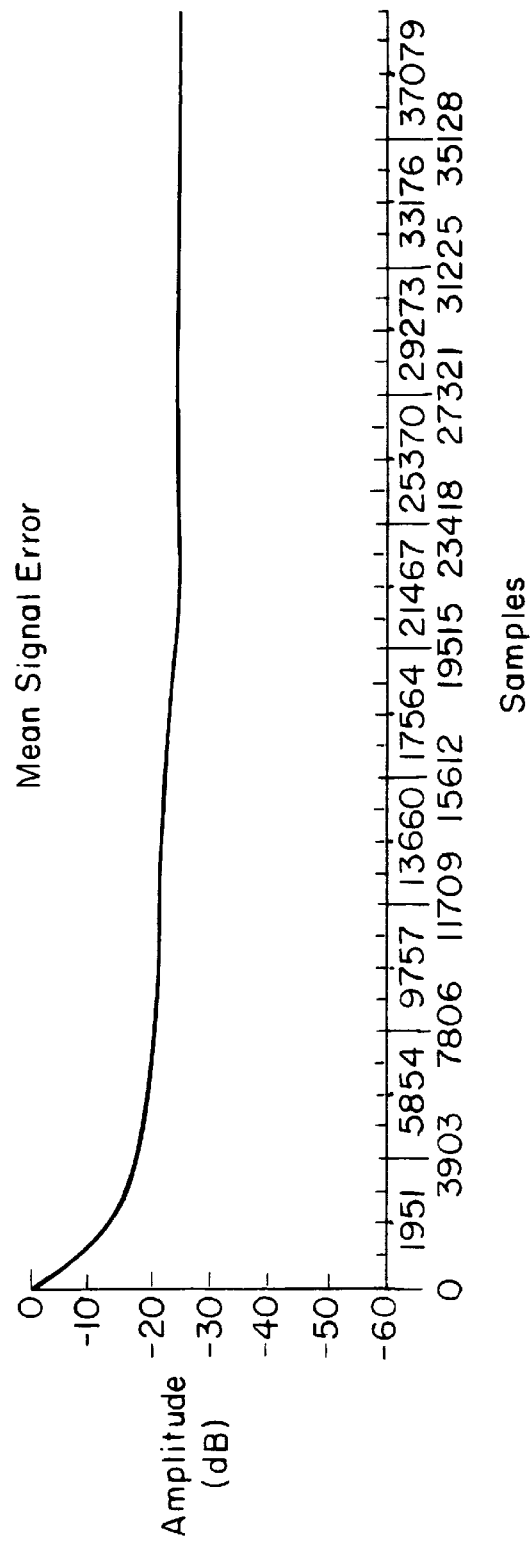
FIGS. 13A–13E to 19A–19E are a set of simulation results for 64 QAM and 256 QAM signals.
Figure 13B:
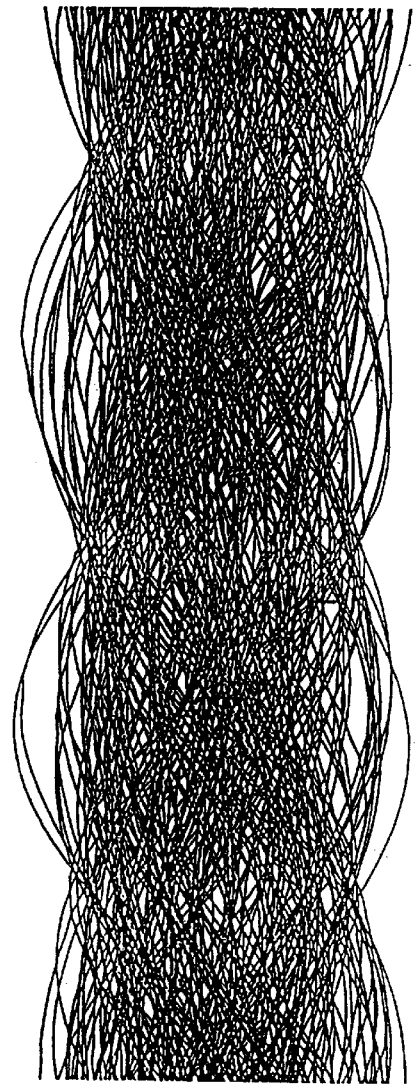
Figure 13C:
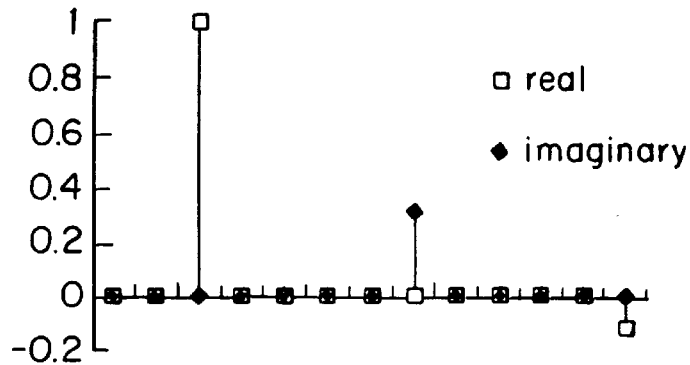
Figure 13D:
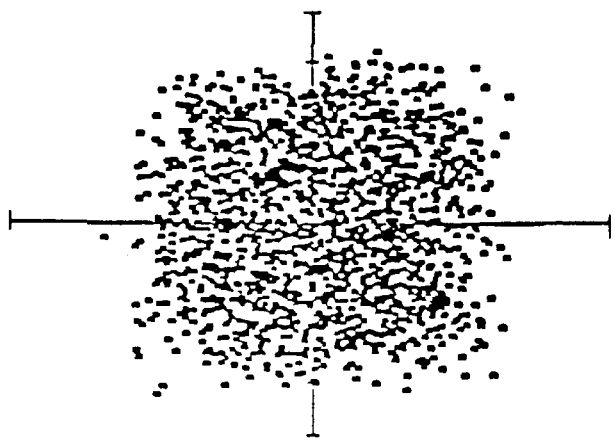
Figure 13E:
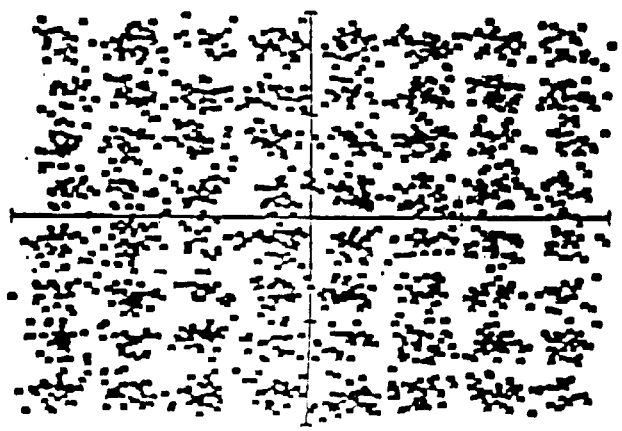
Figure 14A:
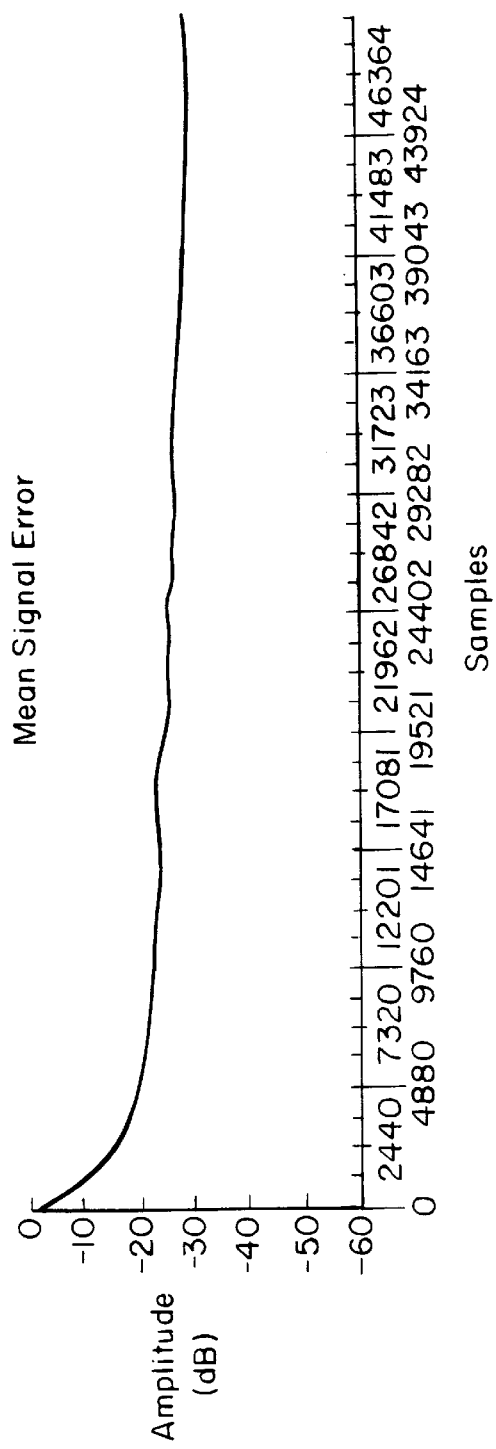
Figure 14B:
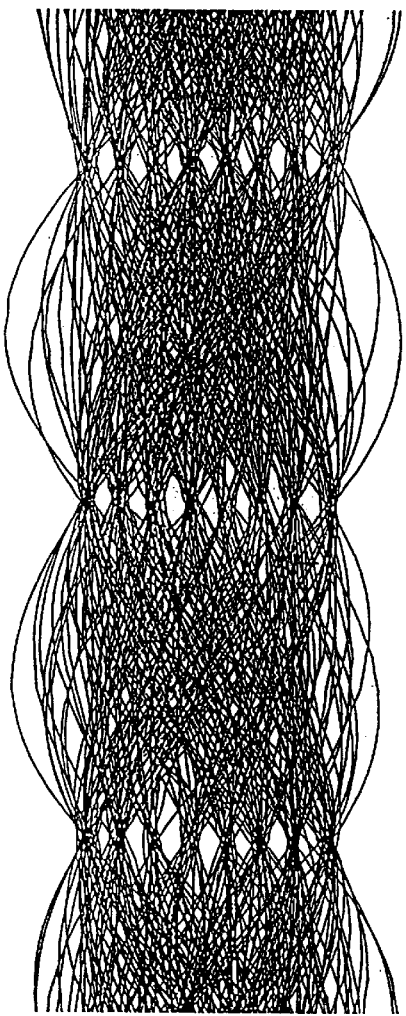
Figure 14C:
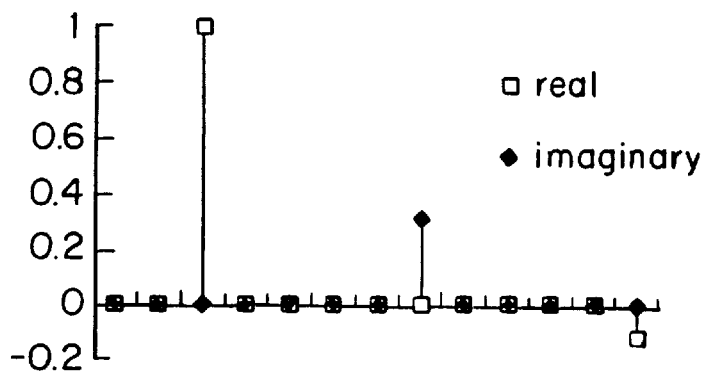
Figure 14D:
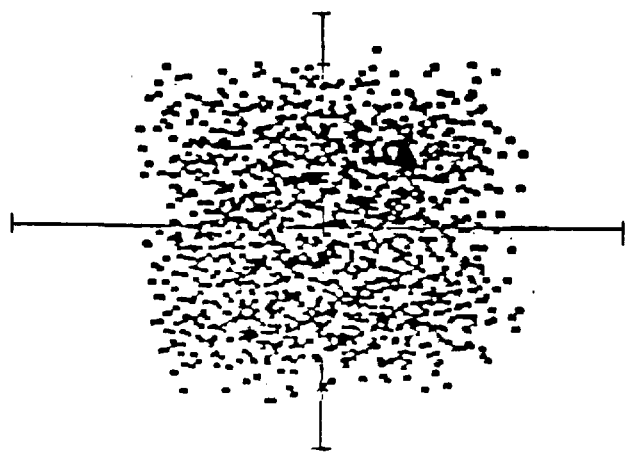
Figure 14E:
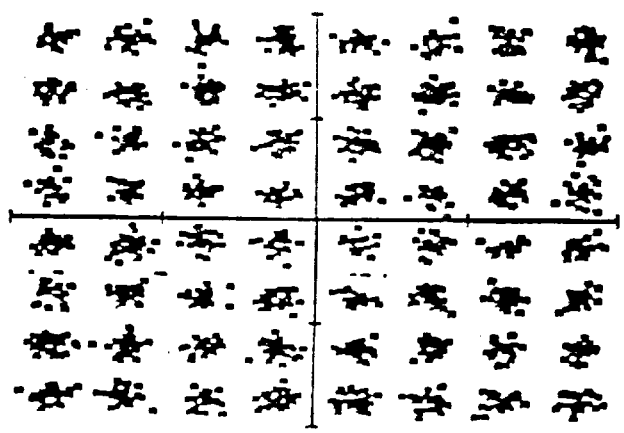
Figure 15A:
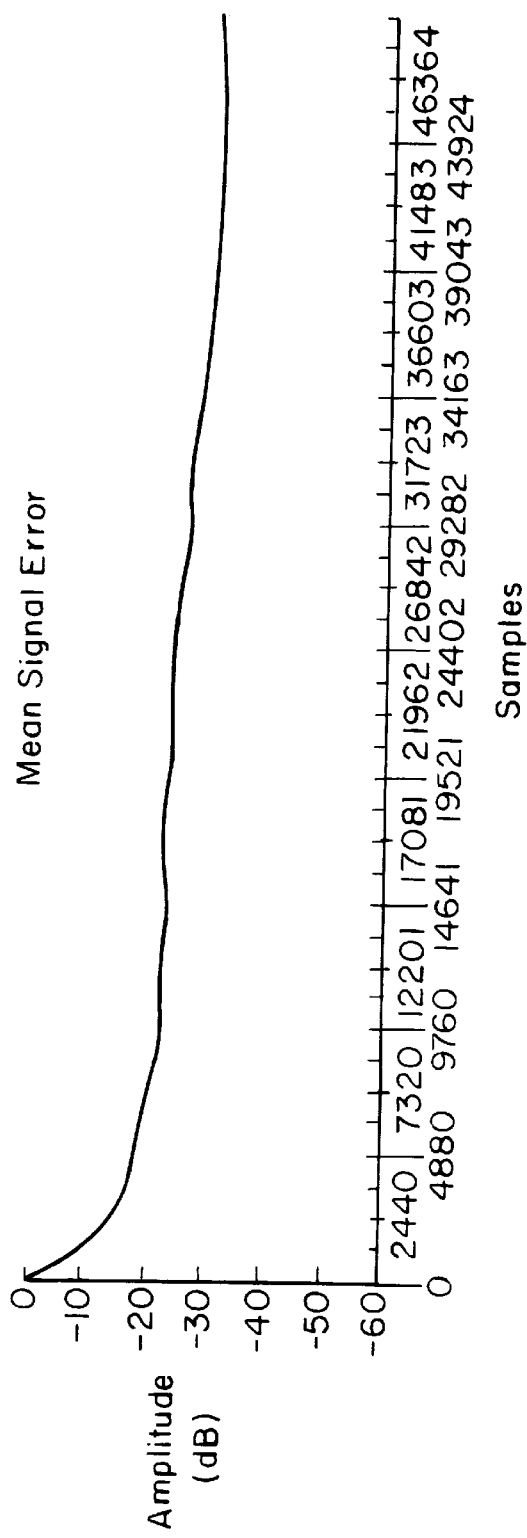
Figure 15B:
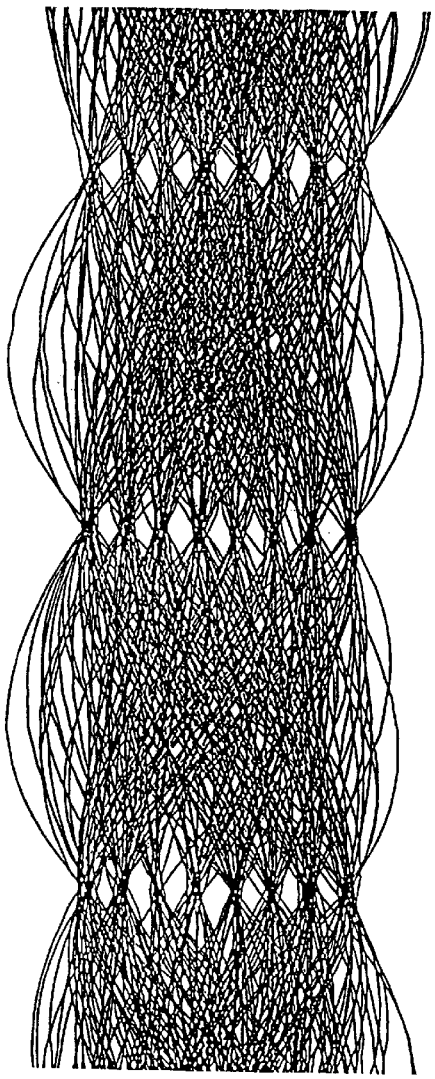
Figure 15C:
Figure 15D:
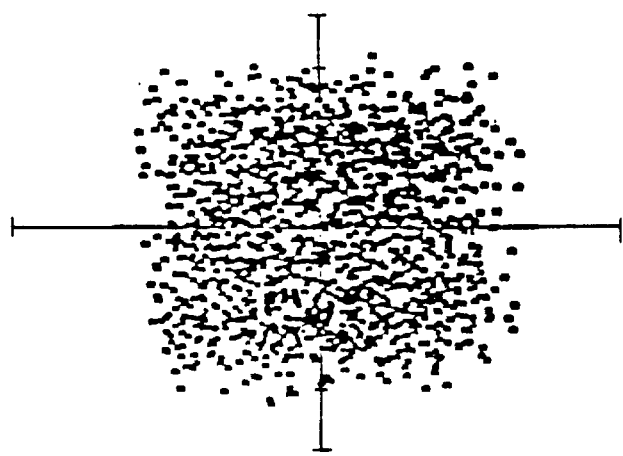
Figure 15E:
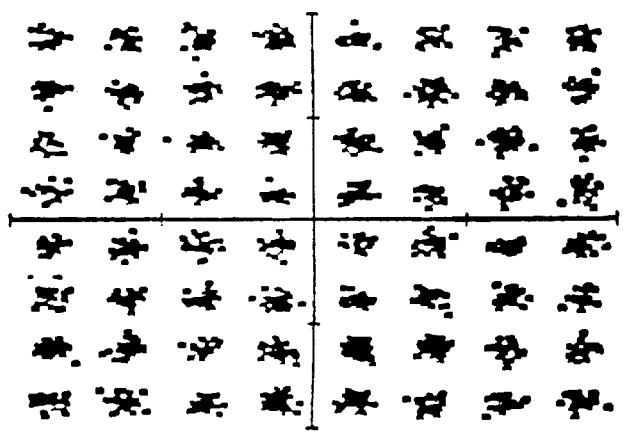
Figure 16A:
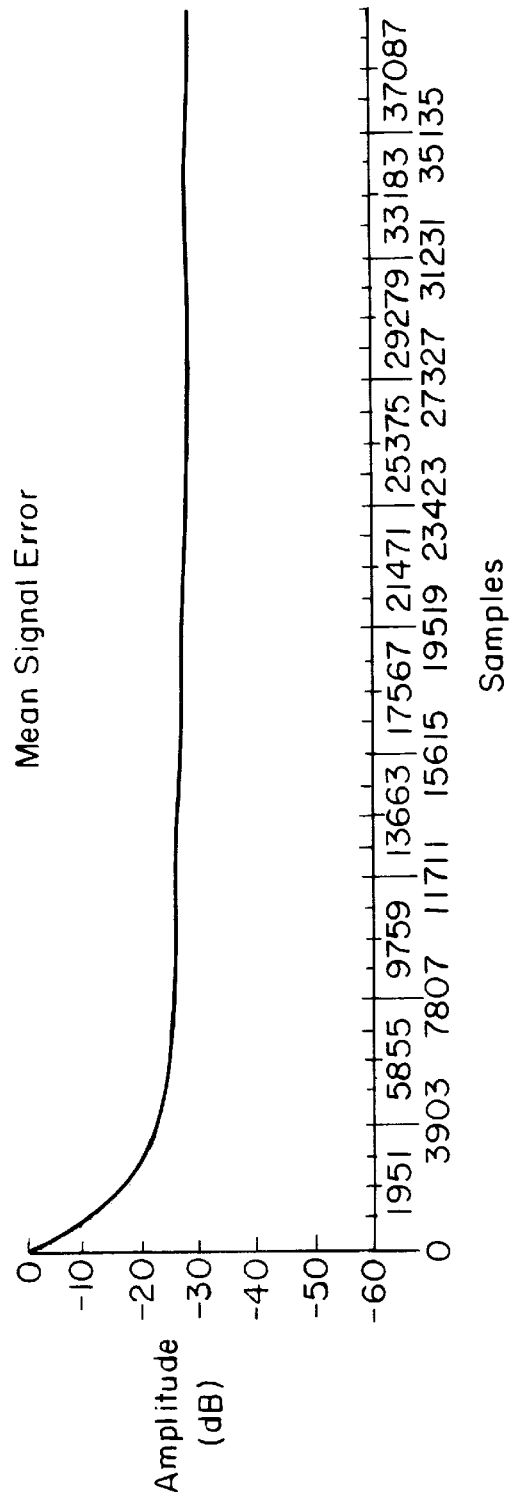
Figure 16B:
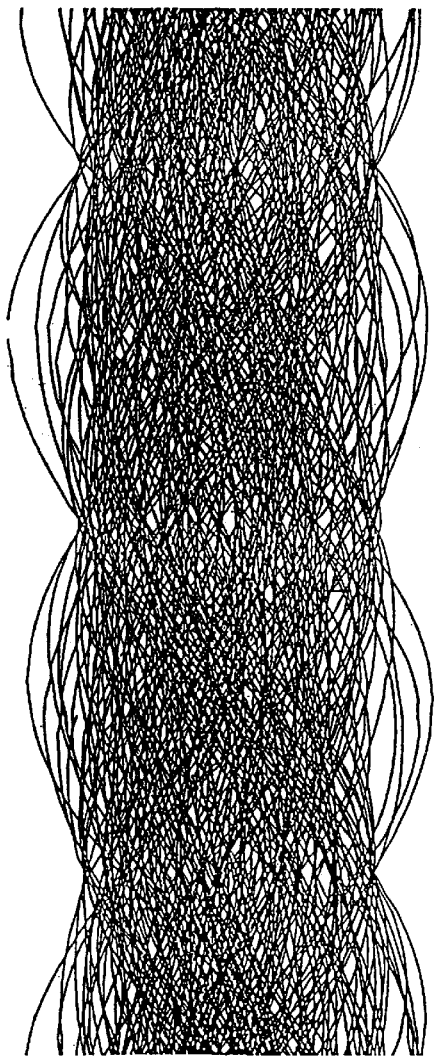
Figure 16C:
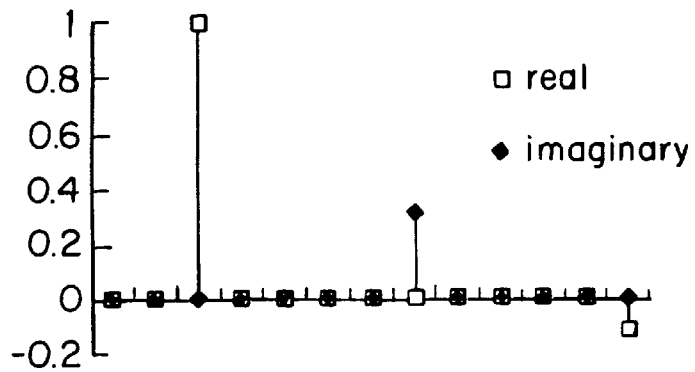
Figure 16D:
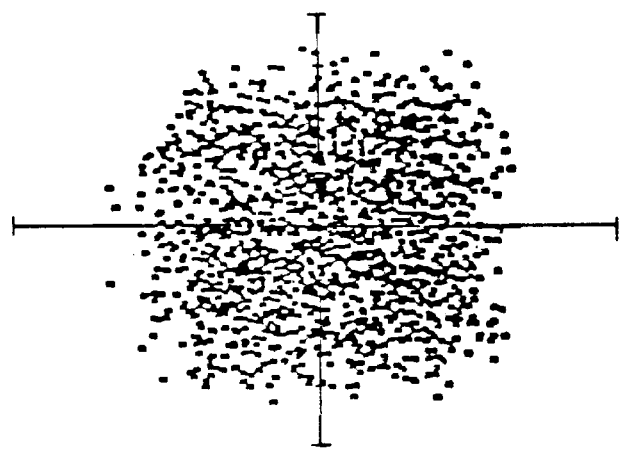
Figure 16E:
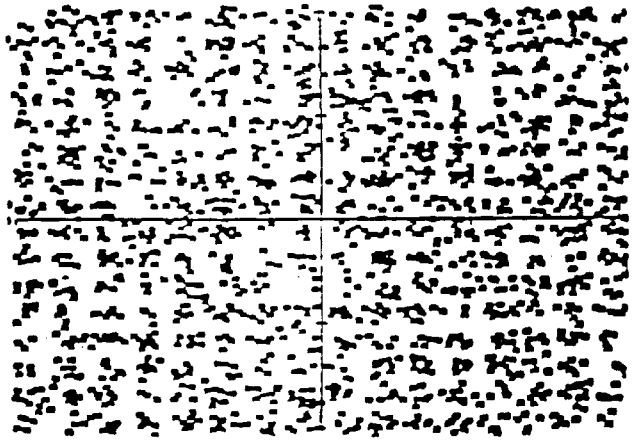
Figure 17A:
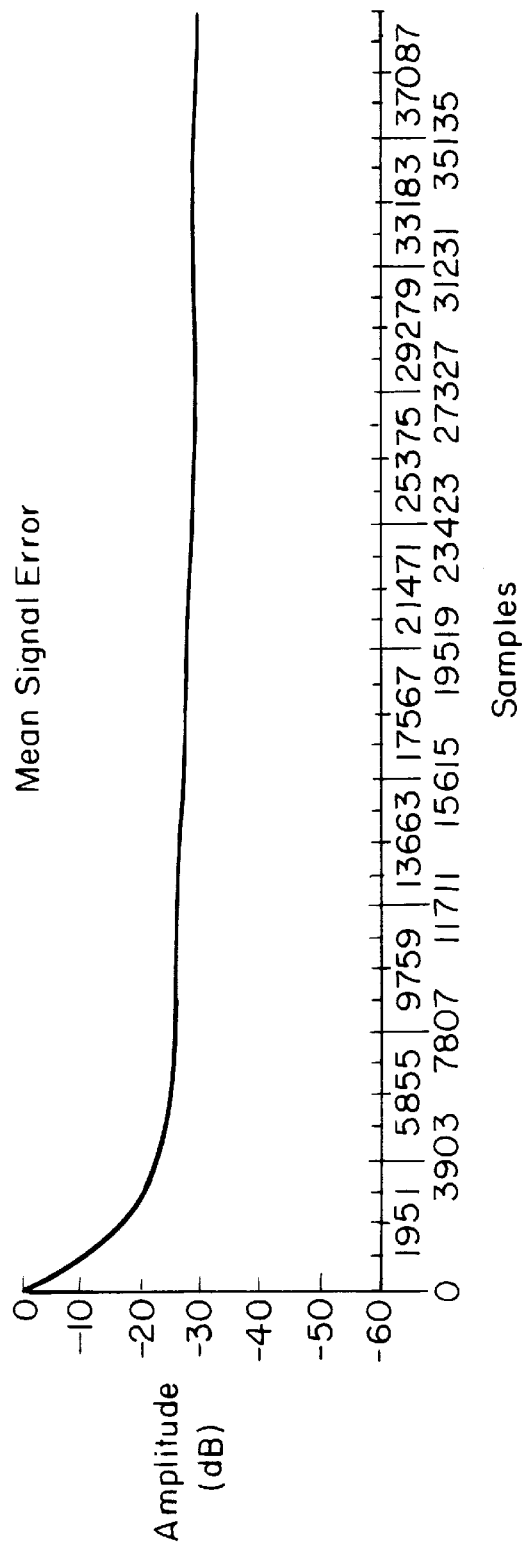
Figure 17B:
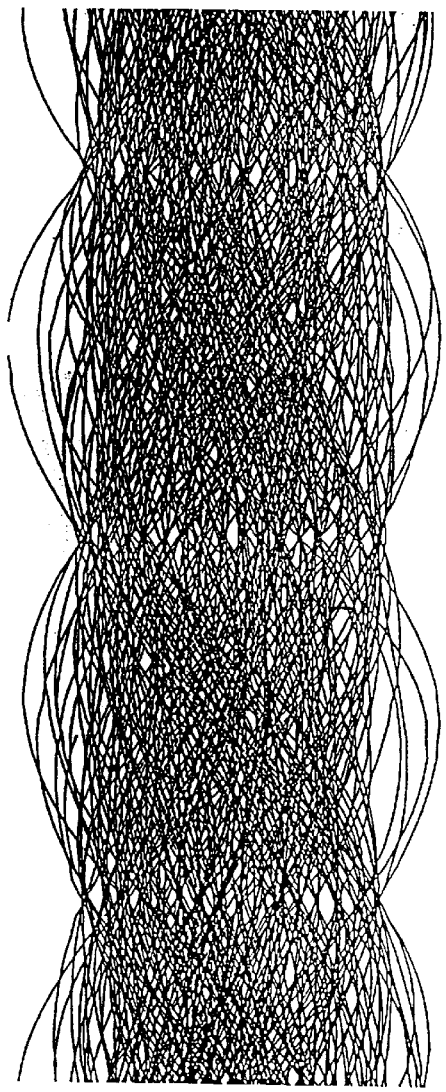
Figure 17C:
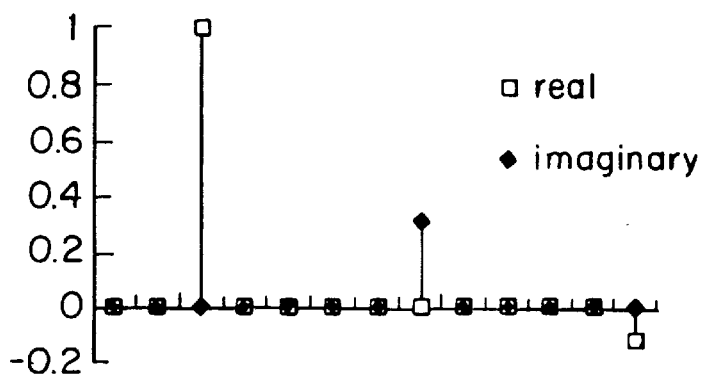
Figure 17D:
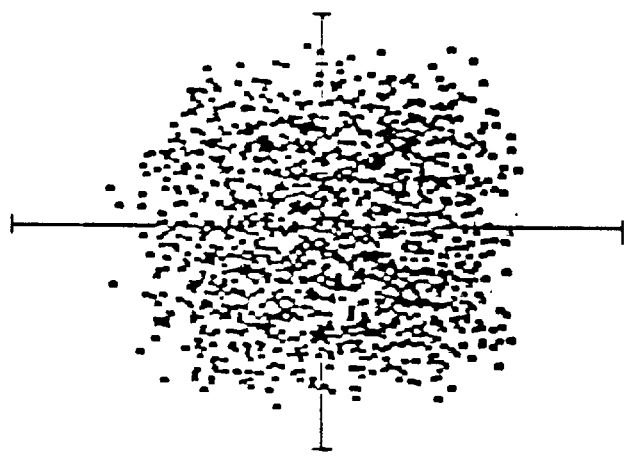
Figure 17E:
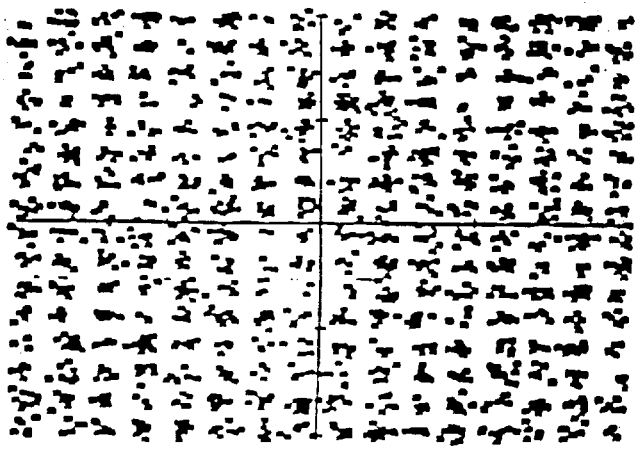
Figure 18A:
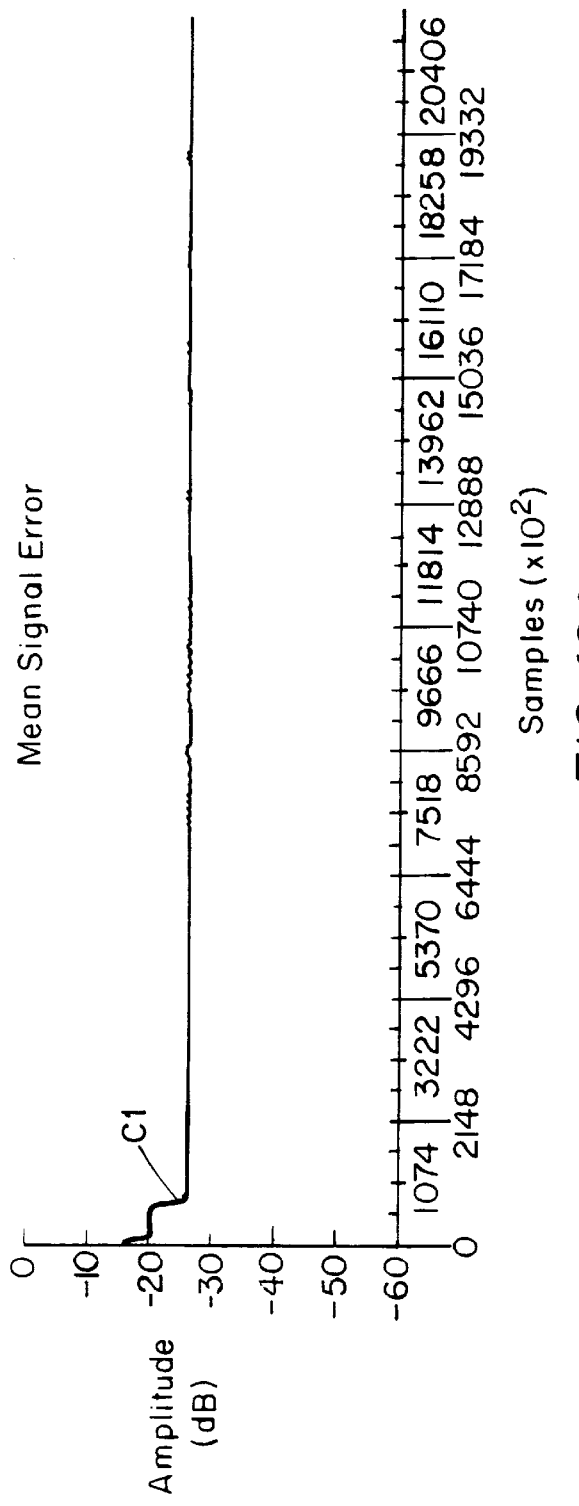
Figure 18B:
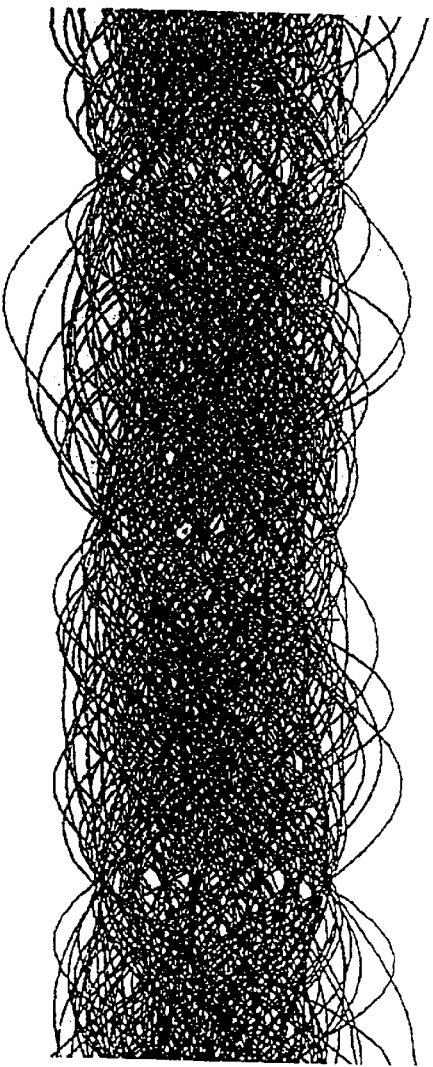
Figure 18C:
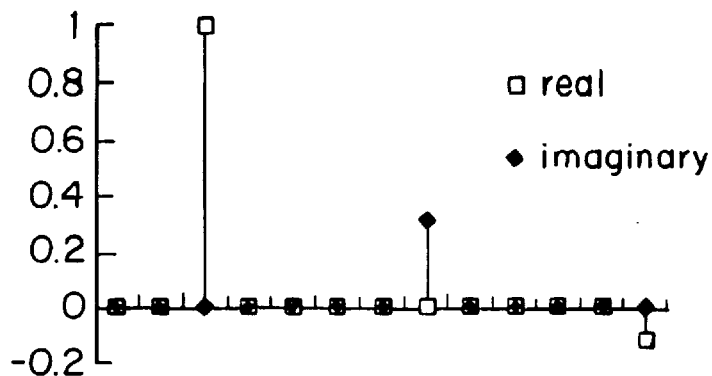
Figure 18D:
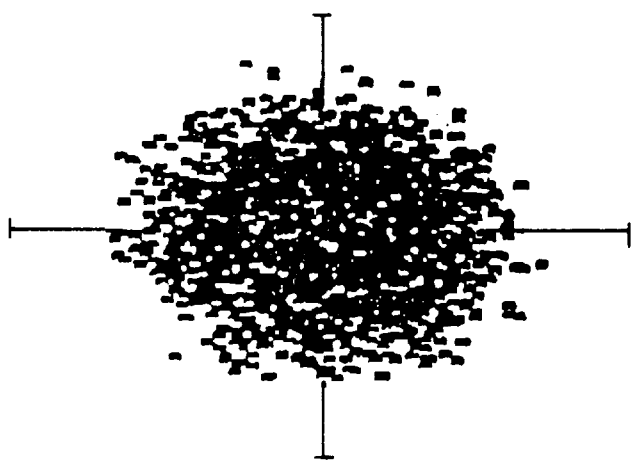
Figure 18E:
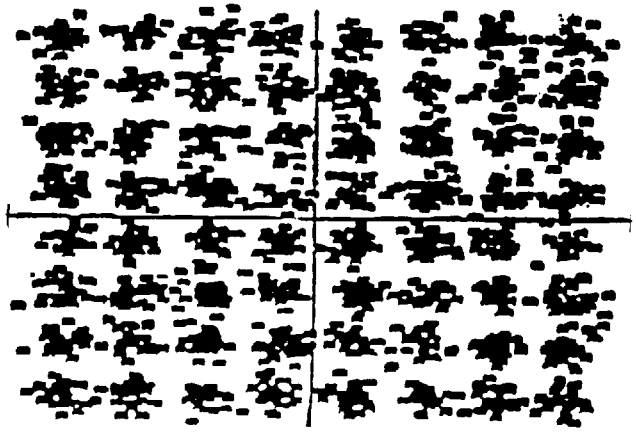
Figure 19A:
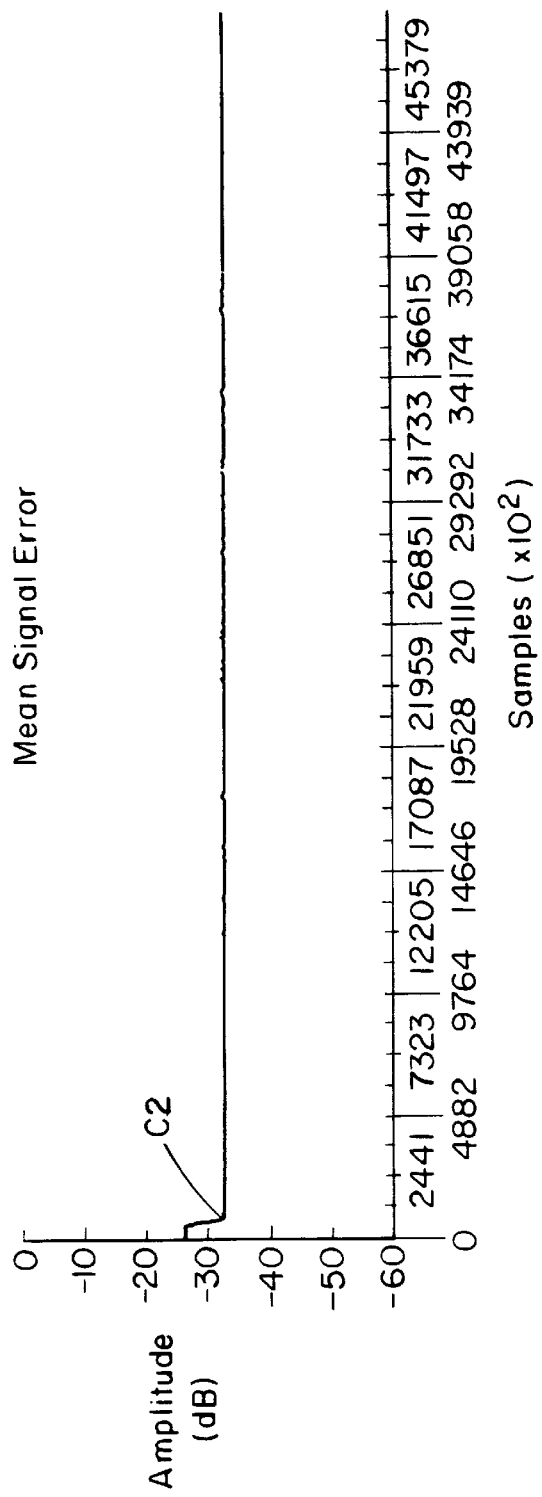
Figure 19B:
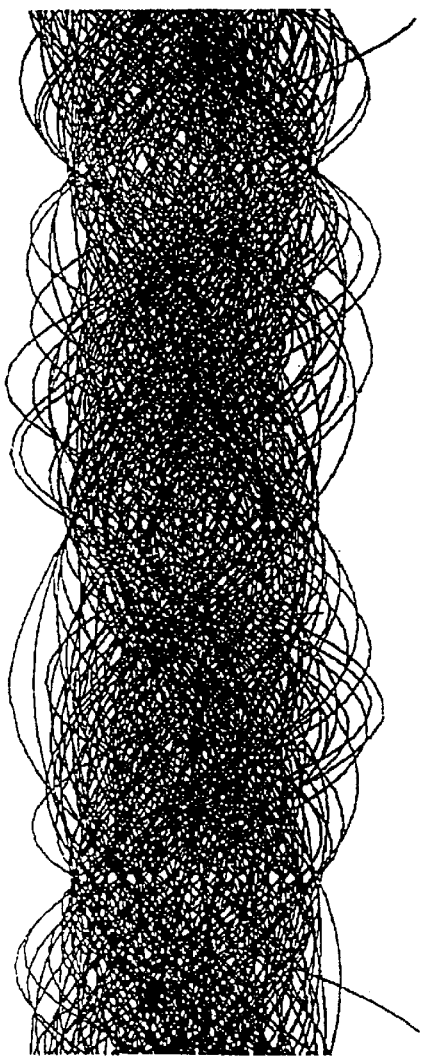
Figure 19C:
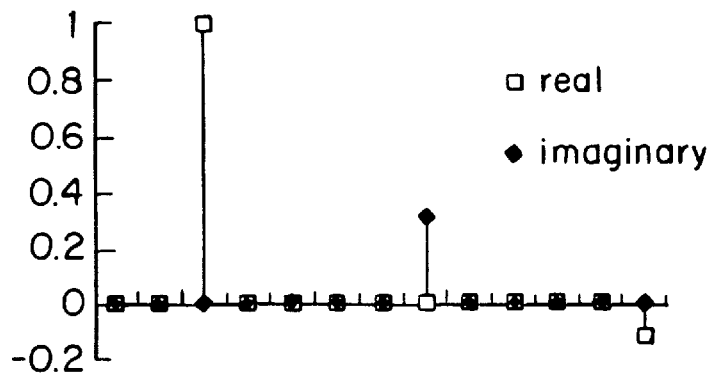
Figure 19D:
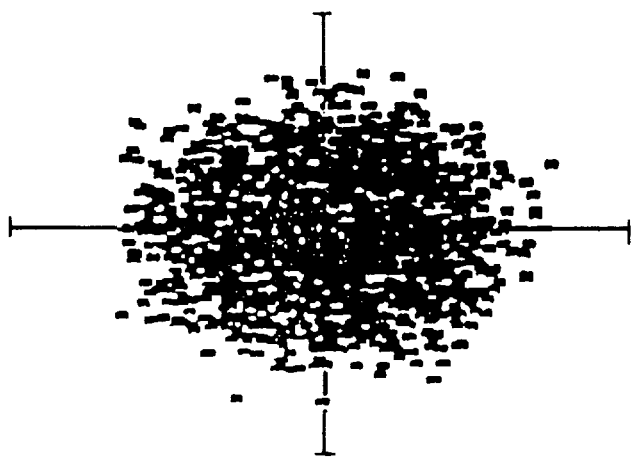
Figure 19E:
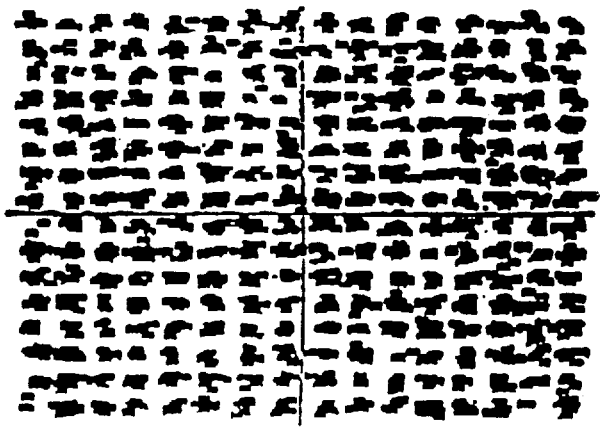

Since the blind equalization process is the key element of the system, it was first isolated and tested extensively. The main quality expected from the blind equalization algorithm is to open the eye diagram as widely as possible in such a way that when the LMS algorithm is engaged, the error rate at the output of the signal space slicer 50 is low enough to ensure convergence. FIGS. 13A-13E show simulation results (simulation 1) for 64 QAM for a Signal to Noise Ratio (SNR) of 25 dB. The phase of the signal was not rotating, and the sampling timing was perfectly adjusted. The MCP algorithm (using only the QCP and the SPCP partitions) was pushed to the maximum of its equalization ability and the system was prevented from engaging the LMS algorithm. FIG. 13B shows how the eye is effectively open. The results are even more remarkable for higher signal to noise ratios (FIGS. 14A–14E for 32 dB and FIGS. 15A–15E for 40 dB) (simulations 2 and 3, respectively) where it can be seen that the signal could be completely demodulated without error, using the blind algorithm only. FIGS. 16A–16E and 17A–17E show similar results for 256 QAM for SNR=32 and 40 dB, respectively (simulations 4 and 5). These results are quite remarkable in comparison to other existing self-recovering equalization methods.

The complete system was next tested under conditions worse or equal than those from Table 4. FIGS. 18A–18E show the simulation result (simulation 6) for 64 QAM. The length of simulation (2 million samples) shows the stability of the receiver even in this very noisy environment. The system converged in less than 75, 000 samples as shown at point C1 of FIG. 18A. With a typical sampling rate of 12 Mega-samples per second, this convergence time corresponds to 6.25 msec. This number is to be compared with the broadcasting requirement of Table 4 (100 msec). Similarly, FIGS. 19A–19E show the simulation results (simulation 7) for 256 QAM using 5 million samples in which convergence time was also smaller than 75,000 samples as shown at point C2 of FIG. 19A.

Other simulation have shown that the tracking range of the carrier acquisition and tracking system 44 exceeds +/−4.5 deg/sample (i.e. +/−150 Khz at 12 Msample/sec) and that the range of the timing recovery system 24, 26, 34, 36 is larger that +/−1000 parts per million (ppm).

Figure 20A:
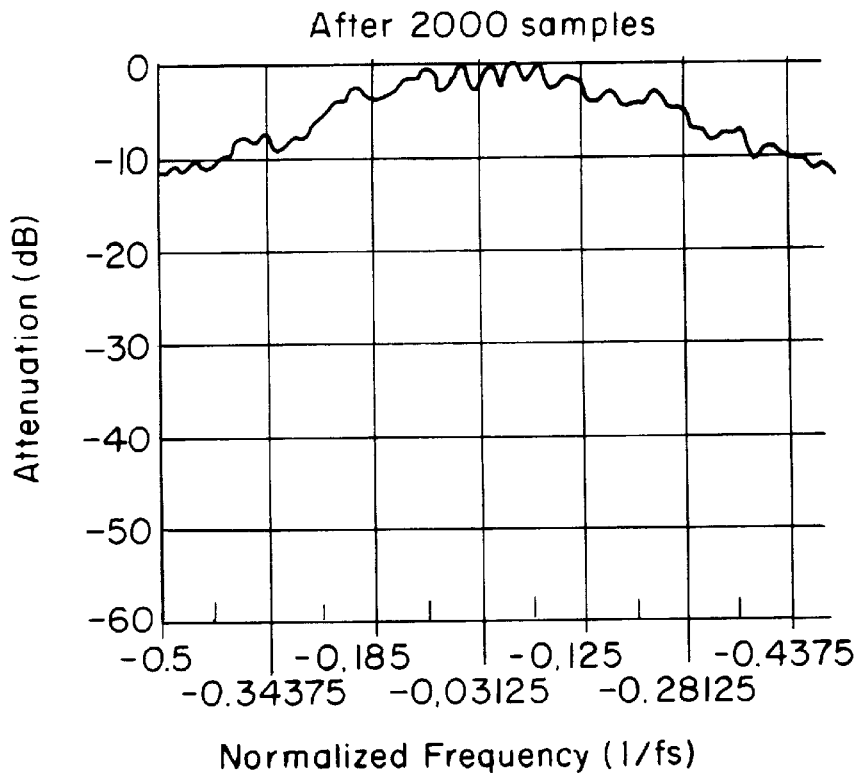
FIGS. 20A–20L show a typical evolution of the transfer function of the adaptive feedforward filter during the convergence process of the receiver.
Figure 20B:
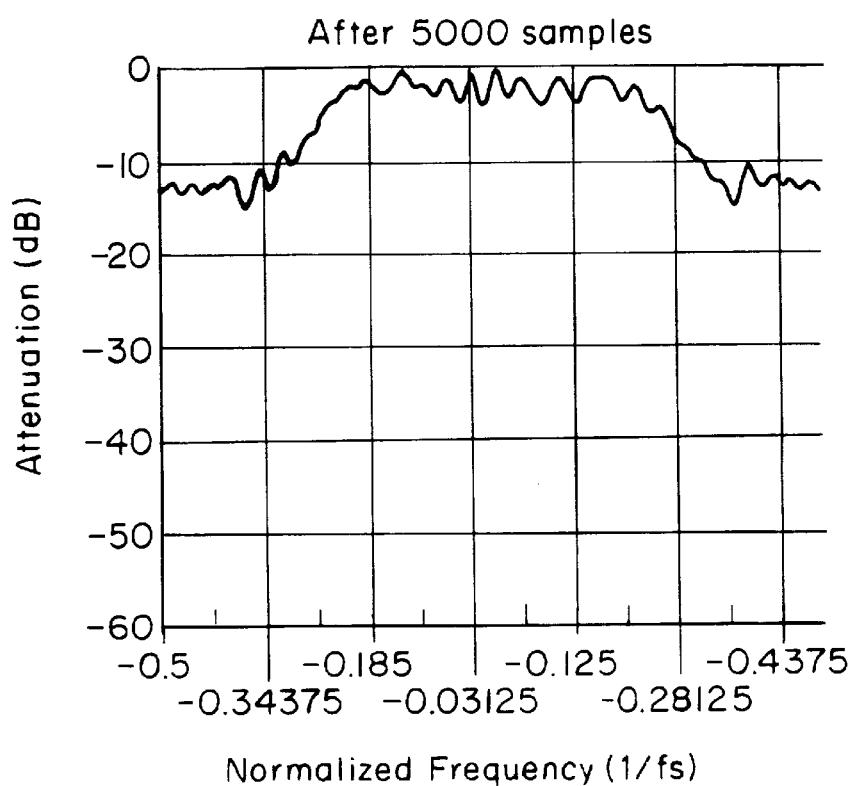
Figure 20C:
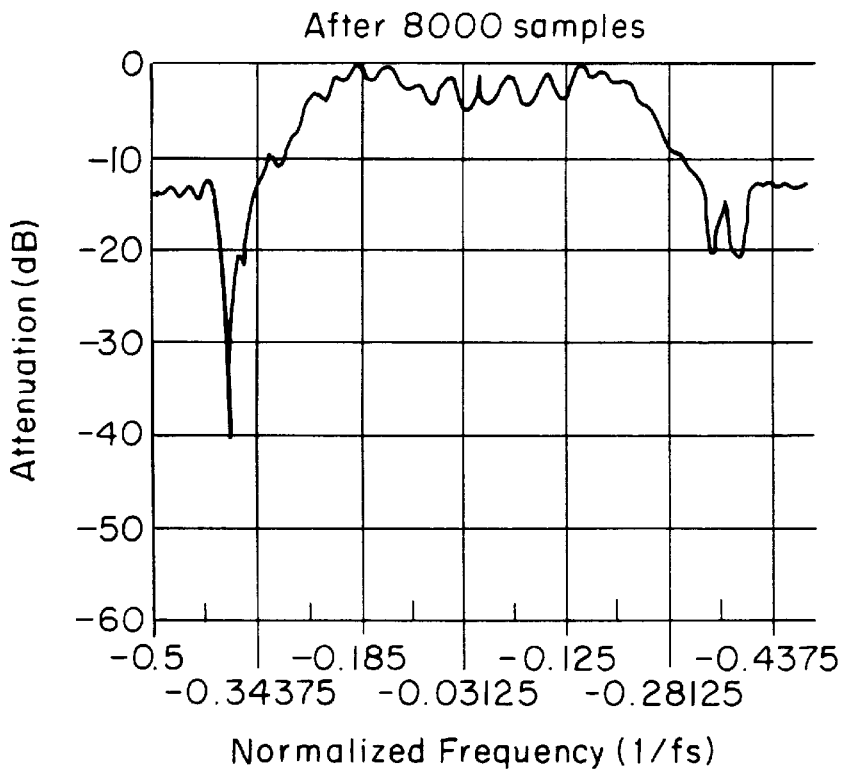
Figure 20D:
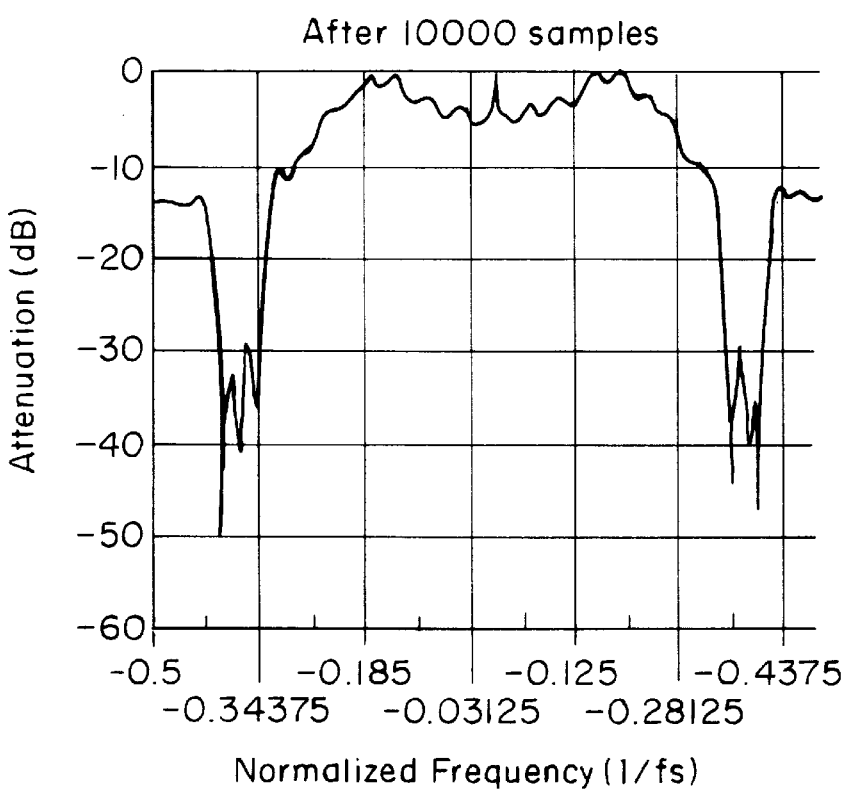
Figure 20E:
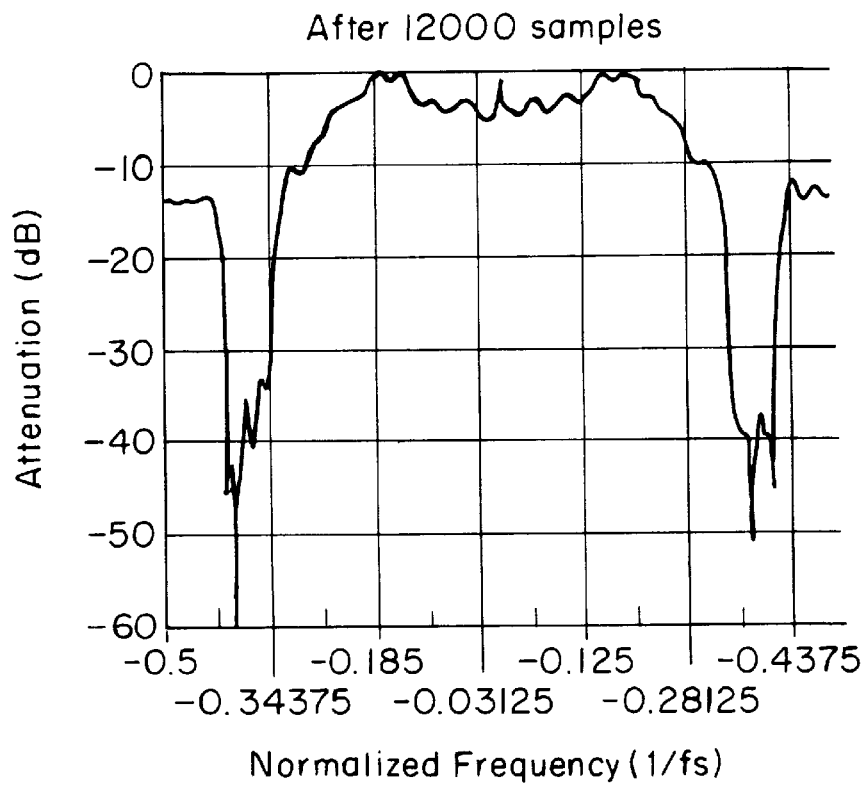
Figure 20F:
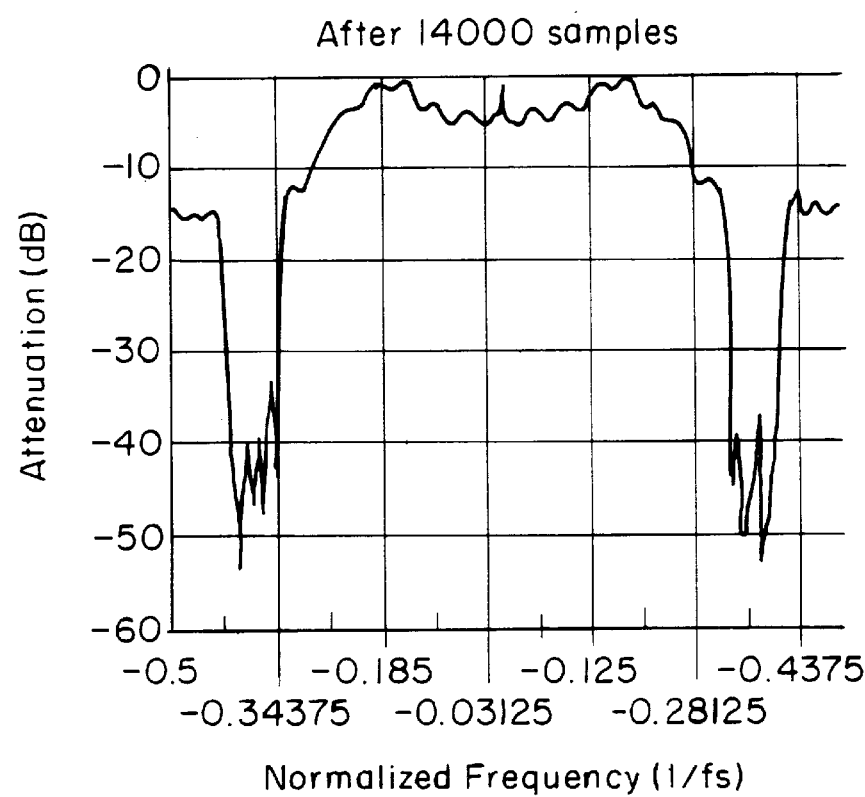
Figure 20G:
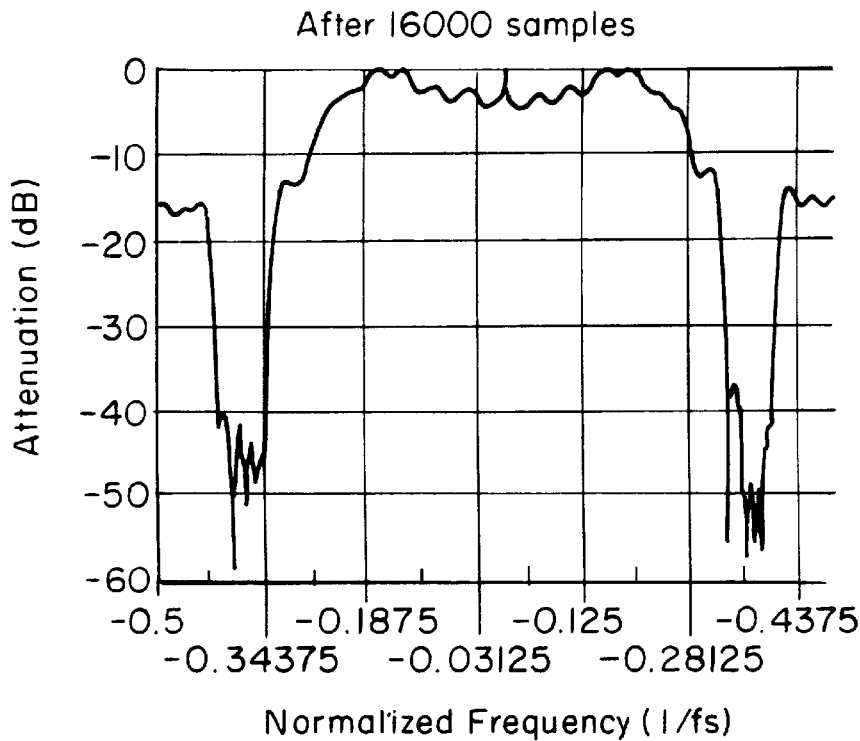
Figure 20H:
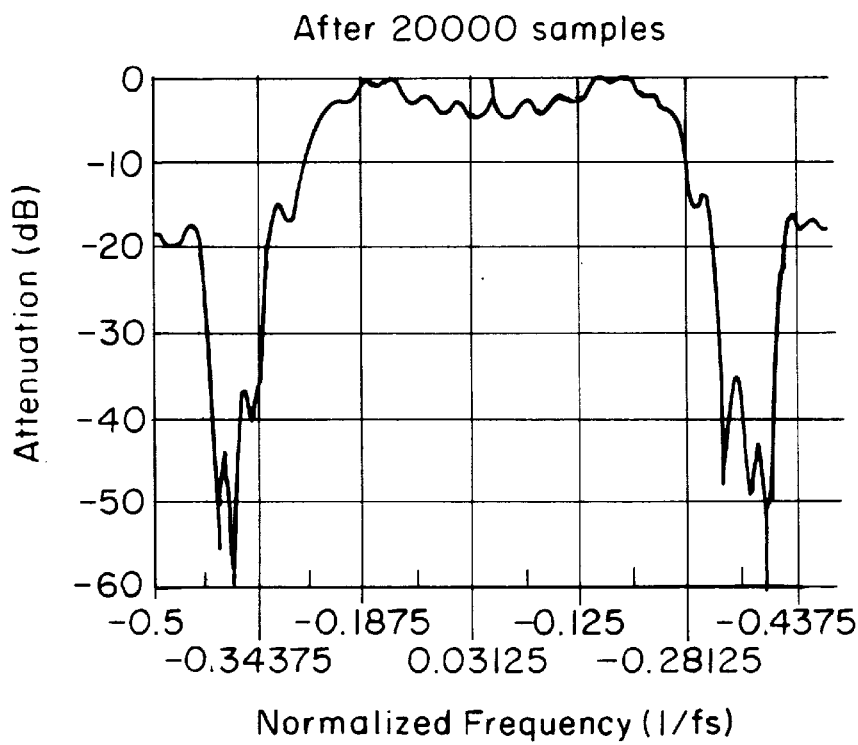
Figure 20I:
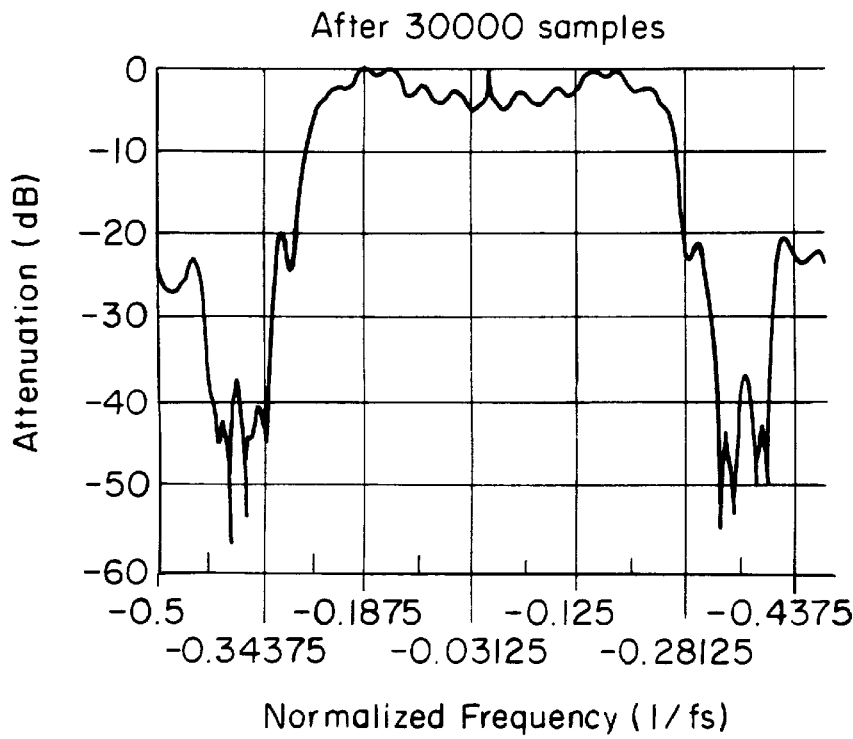
Figure 20J:
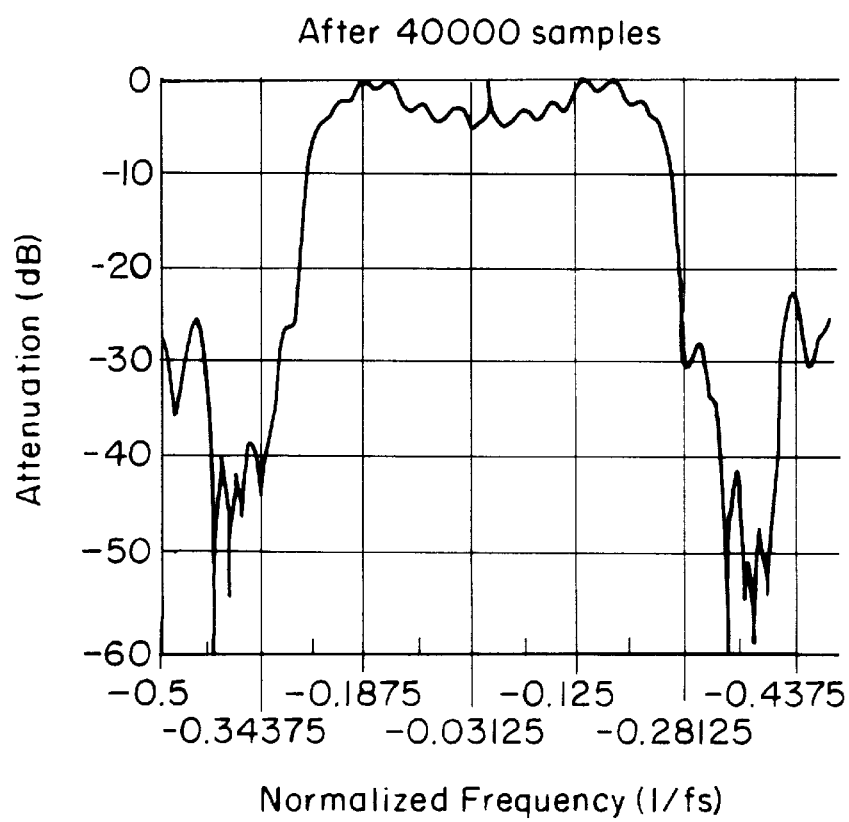
Figure 20K:
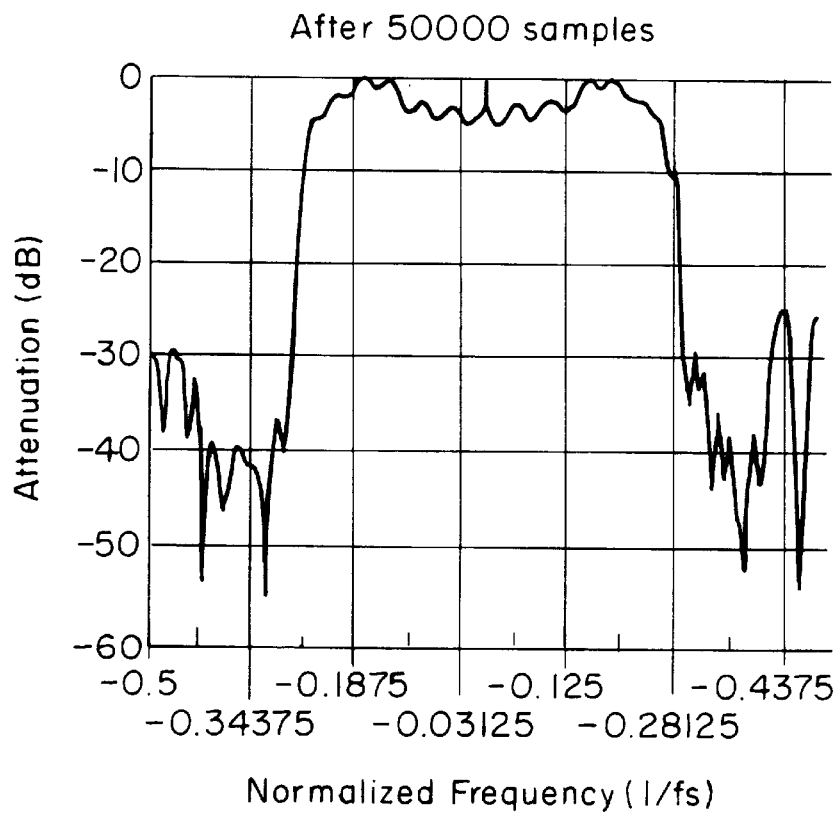
Figure 20L:
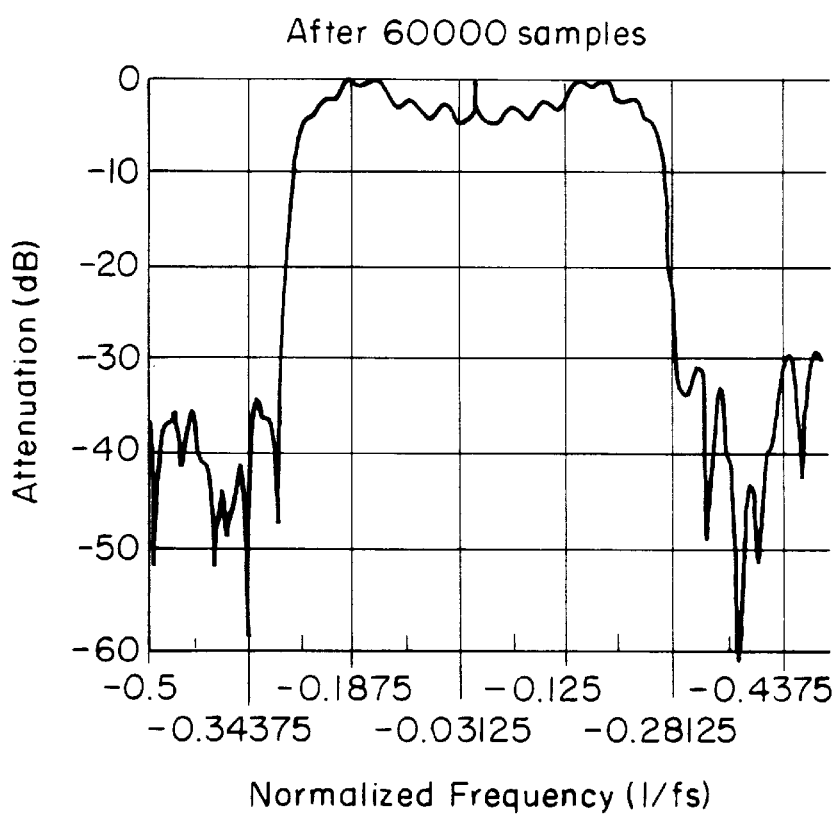

FIGS. 20A–20L provide the history of the transfer function of the adaptive feedforward filter 32 during the convergence process of the digital receiver. These figures also show the important role played by the leakage control system to optimize the out-of-band attenuation. In this simulation, the signal to be demodulated was combined with another random signal occupying an adjacent bandwidth. For the first 5000 samples, the filter coefficients are updated with the blind algorithm only. The transfer function within the passband of the signal is slowly shaped in order to equalize the distortion of the channel, but the transfer function outside this bandwidth shows almost no attenuation (−12 dB) as shown in FIG. 20B. At 8000 samples, the system switches to the LMS algorithm without leakage. Equalization within the bandwidth becomes very accurate and the transfer function progressively shows a deep attenuation (−40 dB) where the adjacent signal is present as shown in FIG. 20C. Outside of the bandwidths of the signal to be demodulated and the adjacent signal, the attenuation stays very small (−12 dB) because there is almost no power to force down the equalizer transfer function. At 16,000 samples as shown in FIG. 20G, the leakage is turned on and the transfer function is progressively forced to the maximum attenuation (−40 dB) over the entire spectrum outside the signal bandwidth as shown in FIGS. 20H–20L.

It will be appreciated by those skilled in the art that additional implementations of the present system of digital reception demodulation with automatic equalization and blind recovery are contemplated here.

The foregoing description of preferred embodiments has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. In a data receiver for a data transmission system wherein data symbols are transmitted over a transmission channel at a symbol rate, the receiver including an adaptive equalizer having several tap coefficients, a method of synchronization, comprising the steps of:

sampling a signal received from the transmission channel at a sampling rate twice the symbol rate, the signal samples including even and odd samples taken at even and odd sampling times, respectively;

applying the signal samples to the equalizer; and resampling the equalized signal at a resampling rate equal to the symbol rate, wherein the phase of the resampling rate is determined by the steps of:

determining separate estimates of the signal magnitude variance for even and odd sampling times, respectively;

comparing the variance estimates; and adjusting the phase based on the variance comparison.

2. The method of claim 1 wherein the step of determining variance estimates includes determining a sample delay in the equalizer and wherein the step of adjusting includes adjusting the phase based on the variance comparison and the sample delay.

3. The method of claim 1 wherein the step of determining separate variance estimates includes averaging the square magnitude of the even and odd samples, respectively.

4. The method of claim 1 further comprising the step of freezing the phase of the resampling rate upon the equalizer reaching a convergence condition.

5. The method of claim 1 wherein the step of comparing includes comparing the variance estimates for successive even and odd sampling times, wherein an even sample variance estimate greater than an odd sample variance estimate has a first sign and an odd sample variance estimate greater than an even sample variance estimate has a second sign, and further comprising the steps of:

measuring a time between successive changes from a first sign to a second sign or a second sign to a first sign to provide a timing offset;

determining a drift direction from a comparison of the magnitudes of the tap coefficients; and adjusting the sampling rate based upon the timing offset and the drift direction.

6. In a data receiver for a data transmission system wherein data symbols are transmitted over a transmission channel at a symbol rate, the receiver including an adaptive equalizer having several tap coefficients each having an associated tap position including a center tap coefficient having a center tap position, a method of timing control, comprising the steps of:

sampling a signal received from the transmission channel at a sampling rate at least twice the symbol rate;

applying the signal samples to the equalizer, with the equalizer providing an equalized signal;

generating an error signal derived from the equalized signal and adjusting the tap coefficients based upon the error signal;

determining a peak tap coefficient and a peak tap position, with the peak tap coefficient being the tap coefficient having the largest magnitude and the peak tap position being the tap position of the peak tap coefficient;

measuring the number of symbol periods for the peak tap coefficient to move to a neighboring tap position to provide an estimate of drift speed and determining a drift direction from a difference between the neighboring tap position and the prior peak tap position; and adjusting the sampling rate based upon the drift speed estimate and the drift direction such that the peak tap coefficient tends to move toward the center tap position of the equalizer.

7. The method of claim 6 wherein a correction position is the tap position at the time the sampling rate is adjusted and further comprising the steps of:

measuring the number of symbol periods for the peak tap coefficient to move from the correction position to the center tap position to provide a second estimate of the drift speed and determining a second drift direction from a difference between the center tap position and the correction position; and adjusting the sampling rate based upon the second estimate of the drift speed and the second drift direction such that the peak tap coefficient tends to remain at the center tap position.

8. The method of claim 6 wherein the neighboring tap position is at least two tap positions away from the prior peak tap position.

9. In a data receiver for a data transmission system wherein data symbols are transmitted over a transmission channel at a symbol rate, the receiver including an adaptive equalizer having several tap coefficients, a method of timing control, comprising the steps of:

sampling a signal received from the transmission channel at twice the symbol rate, the signal samples including even and odd samples taken at even and odd sampling times, respectively;

applying the signal samples to the equalizer, with the equalizer providing an equalized signal;

generating an error signal derived from the equalized signal and adjusting the tap coefficients based upon the error signal;

determining separate estimates of the signal magnitude variance for even and odd sampling times, respectively;

comparing the variance estimates for successive even and odd sampling times, wherein an even sample variance estimate greater than an odd sample variance estimate has a first sign and an odd sample variance estimate greater than an even sample variance estimate has a second sign;

measuring a time between successive sign changes from a first sign to a second sign or a second sign to a first sign to provide a timing offset;

determining a drift direction from a comparison of the magnitudes of the tap coefficients; and adjusting the sampling rate based upon the timing offset and the drift direction.

10. The method of claim 9 wherein the step of determining separate variance estimates includes averaging the square magnitude of the even and odd samples, respectively.

11. The method of claim 9 wherein the step of measuring includes measuring the number of sample periods between successive sign changes.

12. The method of claim 9 wherein the step of measuring includes ignoring at least one successive sign change during an initial period from a start of the measurement to avoid detecting noise as a sign change.

13. A data receiver for a data transmission system wherein data symbols are transmitted over a transmission channel at a symbol rate, the receiver comprising:

an adaptive equalizer having several tap coefficients;

means for sampling a signal received from the transmission channel at a sampling rate twice the symbol rate, the signal samples including even and odd samples taken at even and odd sampling times, respectively;

means for applying the signal samples to the equalizer;

a polyphase resampler for resampling the equalized signal at a resampling rate equal to the symbol rate; and a synchronizer including means for determining separate estimates of the signal magnitude variance for even and odd sampling times, respectively;

means for comparing the variance estimates; and means for adjusting the phase of the resampling rate based on the variance comparison.

14. The receiver of claim 13 wherein the means for determining variance estimates includes means for determining a sample delay in the equalizer and wherein the means for adjusting includes means for adjusting the phase based on the variance comparison and the sample delay.

15. The receiver of claim 13 wherein the means for determining separate variance estimates includes means for averaging the square magnitude of the even and odd samples, respectively.

16. The receiver of claim 13 further comprising means for freezing the phase of the resampling rate upon the equalizer reaching a convergence condition.

17. The receiver of claim 13 wherein the means for comparing includes means for comparing the variance estimates for successive even and odd sampling times, wherein an even sample variance estimate greater than an odd sample variance estimate has a first sign and an odd sample variance estimate greater than an even sample variance estimate has a second sign, and further comprising:

a coefficient profiler having means for measuring a time between successive changes from a first sign to a second sign or a second sign to a first sign to provide a timing offset and means for determining a drift direction from a comparison of the magnitudes of the tap coefficients; and a timing controller for adjusting the sampling rate based upon the timing offset and the drift direction.

18. A data receiver for a data transmission system wherein data symbols are transmitted over a transmission channel at a symbol rate, the receiver comprizing:

an adaptive equalizer having several tap coefficients each having an associated tap position including a center tap coefficient having a center tap position;

means for sampling a signal received from the transmission channel at a sampling rate at least twice the symbol rate;

means for applying the signal samples to the equalizer, with the equalizer providing an equalized signal;

means for generating an error signal derived from the equalized signal and adjusting the tap coefficients based upon the error signal;

means for determining a peak tap coefficient and a peak tap position, with the peak tap coefficient being the tap coefficient having the largest magnitude means for determining a peak tap coefficient and a peak tap position, with the peak tap coefficient being the tap coefficient having the largest magnitude and the peak tap position being the tap position of the peak tap coefficient;

means for measuring the number of symbol periods for the peak tap coefficient to move to a neighboring tap position to provide an estimate of drift speed and determining a drift direction from a difference between the neighboring tap position and the prior peak tap position; and means for adjusting the sampling rate based upon the drift speed estimate and the drift direction such that the peak tap coefficient tends to move toward the center tap position of the equalizer.

19. The receiver of claim 18 wherein a correction position is the tap position at the time the sampling rate is adjusted and further comprising:

means for measuring the number of symbol periods for the peak tap coefficient to move from the correction position to the center tap position to provide a second estimate of the drift speed and determining a second drift direction from a difference between the center tap position and the correction position; and means for adjusting the sampling rate based upon the second estimate of the drift speed and the second drift direction such that the peak tap coefficient tends to remain at the center tap position.

20. The receiver of claim 18 wherein the neighboring tap position is at least two tap positions away from the prior peak tap position.

21. A data receiver for a data transmission system wherein data symbols are transmitted over a transmission channel at a symbol rate, the receiver comprising:

an adaptive equalizer having several tap coefficients;

means for sampling a signal received from the transmission channel at twice the symbol rate, the signal samples including even and odd samples taken at even and odd sampling times, respectively;

means for applying the signal samples to the equalizer, with the equalizer providing an equalized signal;

means for generating an error signal derived from the equalized signal and adjusting the tap coefficients based upon the error signal;

means for determining separate estimates of the signal magnitude variance for even and odd sampling times, respectively;

means for comparing the variance estimates for successive even and odd sampling times, wherein an even sample variance estimate greater than an odd sample variance estimate has a first sign and an odd sample variance estimate greater than an even sample variance estimate has a second sign;

means for measuring a time between successive sign changes from a first sign to a second sign or a second sign to a first sign to provide a timing offset;

means for determining a drift direction from a comparison of the magnitudes of the tap coefficients; and means for adjusting the sampling rate based upon the timing offset and the drift direction.

22. The receiver of claim 21 wherein the means for determining separate variance estimates includes averaging the square magnitude of the even and odd samples, respectively.

23. The receiver of claim 21 wherein the means for measuring includes measuring the number of sample periods between successive sign changes.

24. The receiver of claim 21 wherein the means for measuring includes ignoring at least one successive sign change during an initial period from a start of the measurement to avoid detecting noise as a sign change.

* * * * *